US012377005B2

(12) United States Patent
Bhimavarapu et al.

(10) Patent No.: US 12,377,005 B2
(45) **Date of Patent: *Aug. 5, 2025**

(54) PATIENT SUPPORT APPARATUS CONTROL SYSTEMS

(71) Applicant: Stryker Corporation, Kalamazoo, MI (US)

(72) Inventors: Krishna S. Bhimavarapu, Kalamazoo, MI (US); Madhu Thomas, London (CA); Christopher A. George, St. Thomas (CA); Sujay Sukumaran, Portage, MI (US); Ammon K. Wright, Kalamazoo, MI (US); Marko N. Kostic, Johnson City, TN (US); William Dwight Childs, Plainwell, MI (US); Richard A. Derenne, Portage, MI (US)

(73) Assignee: Stryker Corporation, Portage, MI (US)

( * ) Notice: Subject to any disclaimer, the term of this patent is extended or adjusted under 35 U.S.C. 154(b) by 1050 days.

This patent is subject to a terminal disclaimer.

(21) Appl. No.: 17/381,502

(22) Filed: Jul. 21, 2021

(65) Prior Publication Data

US 2021/0346220 A1 Nov. 11, 2021

Related U.S. Application Data

(63) Continuation of application No. 16/019,973, filed on Jun. 27, 2018, now Pat. No. 11,096,850.

(Continued)

(51) Int. Cl.

| | |
|---|---|
| ***A61G 7/018*** | (2006.01) |
| ***A61G 7/008*** | (2006.01) |

(Continued)

(52) U.S. Cl.

CPC .............. *A61G 7/018* (2013.01); *A61G 7/008* (2013.01); *A61G 7/012* (2013.01); *A61G 7/015* (2013.01);

(Continued)

(58) Field of Classification Search

CPC ........ A61G 7/008; A61G 7/012; A61G 7/015; A61G 7/018; A61G 2203/16;

(Continued)

(56) References Cited

U.S. PATENT DOCUMENTS

| | | |
|---|---|---|
| 5,113,214 A | 5/1992 | Nagata et al. |
| 5,276,432 A | 1/1994 | Travis |

(Continued)

FOREIGN PATENT DOCUMENTS

| | | |
|---|---|---|
| CN | 101789230 A | 7/2010 |
| DE | 19505162 C1 | 3/1996 |

(Continued)

OTHER PUBLICATIONS

Apple, “Adjust the Brightness on you iPhone, IPad, or IPod Touch”, https://support.apple.com/en-us/HT202613, 2018, 2 pages.

(Continued)

*Primary Examiner* — David R Hare
(74) *Attorney, Agent, or Firm* — Howard & Howard Attorneys PLLC

(57) ABSTRACT

A patient support apparatus including a support deck with a support surface and a deck section configured to move between a first position and a second position, a barrier to limit egress from the support surface operatively attached to the deck section for concurrent movement, and a user interface coupled to the barrier and configured to receive input from a user. The user interface includes a screen to display visual content to the user, and an input device to generate an input signal in response to receiving user input.

(Continued)

An orientation sensor determines an orientation of the screen based on movement of the deck section between the first position and the second position. A controller is configured to perform a function in response to receiving the input signal, and maintain a predetermined orientation of the visual content displayed on the screen as the screen moves with the deck section.

14 Claims, 38 Drawing Sheets

Related U.S. Application Data

(60) Provisional application No. 62/525,368, filed on Jun. 27, 2017.

(51) Int. Cl.
*A61G 7/012* (2006.01)
*A61G 7/015* (2006.01)

(52) U.S. Cl.
CPC ...... *A61G 2203/16* (2013.01); *A61G 2203/20* (2013.01); *A61G 2203/30* (2013.01); *A61G 2203/32* (2013.01); *A61G 2203/40* (2013.01); *A61G 2203/42* (2013.01)

(58) Field of Classification Search
CPC ............ A61G 2203/20; A61G 2203/30; A61G 2203/40; A61G 2203/42
USPC ...................................................... 5/425, 600
See application file for complete search history.

(56) References Cited

U.S. PATENT DOCUMENTS 5,434,621 A 7/1995 Yu
5,559,301 A 9/1996 Bryan, Jr. et al.
5,640,953 A 6/1997 Bishop et al.
5,645,667 A 7/1997 Kusen
5,664,270 A 9/1997 Bell et al.
5,971,913 A 10/1999 Newkirk et al.
6,146,523 A 11/2000 Kenley et al.
6,320,510 B2 11/2001 Menkedick et al.
6,340,977 B1 1/2002 Lui et al.
6,362,725 B1 3/2002 Ulrich et al.
6,702,314 B1 3/2004 Crose
6,822,640 B2 11/2004 Derocher
6,876,303 B2 4/2005 Reeder et al.
6,948,592 B2 9/2005 Kavounas
7,154,397 B2 12/2006 Zerhusen et al.
7,296,312 B2 11/2007 Menkedick et al.
7,319,386 B2 1/2008 Collins, Jr. et al.
7,336,187 B2 2/2008 Hubbard, Jr. et al.
7,389,552 B1 6/2008 Reed et al.
7,443,302 B2 10/2008 Reeder et al.
7,472,439 B2 1/2009 Lemire et al.
7,487,562 B2 2/2009 Frondorf et al.
7,490,021 B2 2/2009 Holland et al.
7,570,152 B2 8/2009 Smith et al.
7,690,059 B2 4/2010 Lemire et al.
7,747,644 B1 6/2010 Reihl et al.
7,888,901 B2 2/2011 Larson et al.
7,895,519 B1 2/2011 Allegrezza et al.
8,069,157 B2 11/2011 Jam
8,117,701 B2 2/2012 Bobey et al.
8,121,856 B2 2/2012 Huster et al.
8,143,846 B2 3/2012 Herman et al.
8,165,908 B2 4/2012 Bolle et al.
8,209,608 B1 6/2012 Linyard et al.
8,266,742 B2 9/2012 Andrienko
8,308,237 B2 11/2012 Kunou
8,319,633 B2 11/2012 Becker et al.
8,334,779 B2 12/2012 Zerhusen et al.
8,341,777 B2 1/2013 Hensley et al.
8,344,860 B2 1/2013 Collins, Jr. et al.
8,410,943 B2 4/2013 Metz et al.
8,413,270 B2 4/2013 Turner et al.
8,413,271 B2 4/2013 Blanchard et al.
8,432,287 B2 4/2013 O'Keefe et al.
8,442,738 B2 5/2013 Patmore
8,464,380 B2 6/2013 Bobey et al.
8,525,682 B2 9/2013 Dixon et al.
8,537,132 B2 * 9/2013 Ng ........................ G06F 3/0416 345/173
8,544,126 B2 10/2013 Elliott et al.
8,552,880 B2 10/2013 Kopp et al.
8,604,917 B2 12/2013 Collins et al.
8,641,301 B2 2/2014 Yang et al.
8,650,682 B2 2/2014 Herman
8,674,839 B2 3/2014 Zerhusen et al.
8,716,941 B2 5/2014 Kim
8,756,078 B2 6/2014 Collins, Jr. et al.
8,768,520 B2 7/2014 Oexman et al.
8,789,102 B2 7/2014 Pickelsimer et al.
8,847,756 B2 9/2014 Tallent et al.
8,868,542 B2 10/2014 Kimball et al.
8,870,812 B2 10/2014 Alberti et al.
8,896,524 B2 11/2014 Birnbaum et al.
8,923,994 B2 12/2014 Laikari et al.
8,924,218 B2 12/2014 Corpier et al.
8,926,535 B2 1/2015 Rawls-Meehan
8,984,685 B2 3/2015 Robertson et al.
9,001,038 B2 4/2015 Kasahara
9,032,510 B2 5/2015 Sampathkumaran et al.
9,038,217 B2 5/2015 Elliot et al.
9,088,282 B2 * 7/2015 Holenarsipur ........... G01V 8/00
9,126,571 B2 9/2015 Lemire et al.
9,138,173 B2 9/2015 Penninger et al.
9,173,792 B2 11/2015 Goffer
9,204,823 B2 12/2015 Derenne et al.
9,220,650 B2 12/2015 Bobey et al.
9,230,421 B2 1/2016 Reeder et al.
9,233,033 B2 1/2016 Valentino et al.
9,239,677 B2 1/2016 Ording
9,259,369 B2 2/2016 Derenne et al.
9,262,876 B2 2/2016 Wood et al.
9,320,664 B2 4/2016 Newkirk et al.
9,342,677 B2 5/2016 Ali et al.
9,381,125 B2 7/2016 Herbst et al.
9,424,699 B2 8/2016 Kusens et al.
9,456,938 B2 10/2016 Blickensderfer et al.
9,463,126 B2 10/2016 Zerhusen et al.
9,466,163 B2 10/2016 Kusens et al.
9,486,084 B2 11/2016 Connell et al.
9,569,591 B2 2/2017 Vanderpohl, III
9,593,833 B2 3/2017 McMannon et al.
9,655,798 B2 5/2017 Zerhusen et al.
9,691,206 B2 6/2017 Kusens et al.
9,774,991 B2 9/2017 Kusens
9,814,410 B2 11/2017 Kostic et al.
9,838,849 B2 12/2017 Kusens
9,844,275 B2 12/2017 Nunn et al.
9,849,051 B2 12/2017 Newkirk et al.
9,858,741 B2 1/2018 Kusens et al.
9,892,310 B2 2/2018 Kusens et al.
9,892,311 B2 2/2018 Kusens et al.
9,916,649 B1 3/2018 Kusens
9,934,427 B2 4/2018 Derenne et al.
9,940,810 B2 4/2018 Derenne et al.
9,984,521 B1 5/2018 Kusens et al.
9,998,857 B2 6/2018 Kusens
9,999,555 B2 6/2018 Magill et al.
10,004,654 B2 6/2018 Zerhusen et al.
10,034,979 B2 7/2018 Bechtel et al.
10,052,249 B2 8/2018 Elliott et al.
10,098,796 B2 10/2018 Valentino et al.
10,136,841 B2 11/2018 Alghazi
10,172,752 B2 1/2019 Goffer
10,188,569 B2 1/2019 Elku et al.
10,410,500 B2 9/2019 Derenne et al.
11,096,850 B2 * 8/2021 Bhimavarapu ........ A61G 7/018
2002/0014951 A1 2/2002 Kramer et al.

(56) References Cited

U.S. PATENT DOCUMENTS

| | | | | |
|---|---|---|---|---|
| 2003/0183427 | A1 | 10/2003 | Tojo et al. | |
| 2004/0083394 | A1 | 4/2004 | Brebner et al. | |
| 2004/0227737 | A1 | 11/2004 | Novak et al. | |
| 2006/0077186 | A1 | 4/2006 | Park et al. | |
| 2006/0101581 | A1* | 5/2006 | Blanchard | A61G 7/00 5/713 |
| 2006/0102392 | A1 | 5/2006 | Johnson et al. | |
| 2006/0117482 | A1 | 6/2006 | Branson | |
| 2006/0277683 | A1* | 12/2006 | Lamire | A61G 7/0507 5/425 |
| 2007/0163045 | A1 | 7/2007 | Becker et al. | |
| 2007/0219950 | A1 | 9/2007 | Crawford | |
| 2008/0141459 | A1 | 6/2008 | Hamberg et al. | |
| 2008/0172789 | A1 | 7/2008 | Elliot et al. | |
| 2008/0235872 | A1 | 10/2008 | Newkirk et al. | |
| 2009/0153370 | A1 | 6/2009 | Cooper et al. | |
| 2009/0262098 | A1 | 10/2009 | Yamada | |
| 2009/0273573 | A1 | 11/2009 | Hotelling | |
| 2010/0039414 | A1 | 2/2010 | Bell | |
| 2010/0154124 | A1 | 6/2010 | Zerhusen et al. | |
| 2010/0212087 | A1 | 8/2010 | Leib et al. | |
| 2011/0080421 | A1 | 4/2011 | Capener | |
| 2011/0162067 | A1 | 6/2011 | Shuart et al. | |
| 2011/0169653 | A1 | 7/2011 | Wang et al. | |
| 2011/0214234 | A1* | 9/2011 | Herman | A61G 7/0514 5/425 |
| 2012/0023670 | A1 | 2/2012 | Zerhusen et al. | |
| 2012/0025991 | A1 | 2/2012 | O'Keefe et al. | |
| 2012/0089419 | A1 | 4/2012 | Huster et al. | |
| 2012/0137436 | A1 | 6/2012 | Andrienko | |
| 2012/0215360 | A1 | 8/2012 | Zerhusen et al. | |
| 2012/0239173 | A1 | 9/2012 | Laikari et al. | |
| 2013/0138452 | A1 | 5/2013 | Cork et al. | |
| 2013/0142367 | A1 | 6/2013 | Berry et al. | |
| 2013/0227787 | A1 | 9/2013 | Herbst et al. | |
| 2013/0238991 | A1 | 9/2013 | Jung et al. | |
| 2013/0300867 | A1 | 11/2013 | Yoder | |
| 2013/0318716 | A1 | 12/2013 | Vanderpohl, III | |
| 2014/0076644 | A1 | 3/2014 | Derenne et al. | |
| 2014/0259410 | A1 | 9/2014 | Zerhusen et al. | |
| 2014/0265181 | A1 | 9/2014 | Lambarth et al. | |
| 2014/0297327 | A1 | 10/2014 | Heil et al. | |
| 2014/0313700 | A1 | 10/2014 | Connell et al. | |
| 2014/0342330 | A1 | 11/2014 | Freeman et al. | |
| 2015/0002393 | A1 | 1/2015 | Cohen et al. | |
| 2015/0060162 | A1 | 3/2015 | Goffer | |
| 2015/0077534 | A1 | 3/2015 | Derenne et al. | |
| 2015/0109442 | A1 | 4/2015 | Derenne et al. | |
| 2015/0154002 | A1 | 6/2015 | Weinstein et al. | |
| 2015/0250669 | A1 | 9/2015 | Elliott et al. | |
| 2015/0317068 | A1 | 11/2015 | Marka et al. | |
| 2016/0012218 | A1 | 1/2016 | Perna et al. | |
| 2016/0022039 | A1 | 1/2016 | Paul et al. | |
| 2016/0038361 | A1 | 2/2016 | Bhimavarapu et al. | |
| 2016/0045382 | A1 | 2/2016 | Goffer | |
| 2016/0049028 | A1 | 2/2016 | Kusens et al. | |
| 2016/0050217 | A1 | 2/2016 | Mare et al. | |
| 2016/0065909 | A1 | 3/2016 | Derenne et al. | |
| 2016/0095774 | A1 | 4/2016 | Bobey et al. | |
| 2016/0140307 | A1 | 5/2016 | Brosnan et al. | |
| 2016/0180668 | A1 | 6/2016 | Kusens et al. | |
| 2016/0183864 | A1 | 6/2016 | Kusens et al. | |
| 2016/0193095 | A1 | 7/2016 | Roussy et al. | |
| 2016/0199240 | A1 | 7/2016 | Newkirk et al. | |
| 2016/0247342 | A1 | 8/2016 | Kusens et al. | |
| 2016/0296396 | A1 | 10/2016 | Kolar et al. | |
| 2016/0324705 | A1 | 11/2016 | Bach Castillo | |
| 2016/0338891 | A1 | 11/2016 | Agdeppa et al. | |
| 2016/0366327 | A1 | 12/2016 | Kusens | |
| 2016/0367420 | A1 | 12/2016 | Zerhusen et al. | |
| 2016/0371786 | A1 | 12/2016 | Kusens et al. | |
| 2017/0027789 | A1 | 2/2017 | St.John et al. | |
| 2017/0049642 | A9 | 2/2017 | Valentino et al. | |
| 2017/0055113 | A1 | 2/2017 | Kusens | |
| 2017/0076526 | A1 | 3/2017 | Kusens et al. | |
| 2017/0094477 | A1 | 3/2017 | Kusens et al. | |
| 2017/0097800 | A1 | 4/2017 | Vanderpohl, III | |
| 2017/0098048 | A1 | 4/2017 | Brosnan et al. | |
| 2017/0109770 | A1 | 4/2017 | Kusens et al. | |
| 2017/0111770 | A1 | 4/2017 | Kusens | |
| 2017/0116790 | A1 | 4/2017 | Kusens et al. | |
| 2017/0124844 | A1 | 5/2017 | Huster et al. | |
| 2017/0128296 | A1 | 5/2017 | Kostic et al. | |
| 2017/0143565 | A1 | 5/2017 | Childs et al. | |
| 2017/0193177 | A1 | 7/2017 | Kusens | |
| 2017/0193180 | A1 | 7/2017 | Kusens et al. | |
| 2017/0193279 | A1 | 7/2017 | Kusens et al. | |
| 2017/0193772 | A1 | 7/2017 | Kusens et al. | |
| 2017/0195637 | A1 | 7/2017 | Kusens et al. | |
| 2017/0213445 | A1 | 7/2017 | Kusens | |
| 2017/0224562 | A1 | 8/2017 | Zerhusen et al. | |
| 2017/0229009 | A1 | 8/2017 | Foster et al. | |
| 2017/0259811 | A1 | 9/2017 | Coulter et al. | |
| 2017/0281440 | A1 | 10/2017 | Puvogel et al. | |
| 2017/0352212 | A1 | 12/2017 | Kusens et al. | |
| 2018/0017945 | A1 | 1/2018 | Sidhu et al. | |
| 2018/0039743 | A1 | 2/2018 | Dixon et al. | |
| 2018/0040091 | A1 | 2/2018 | Kusens | |
| 2018/0041864 | A1 | 2/2018 | Kusens | |
| 2018/0055418 | A1 | 3/2018 | Kostic et al. | |
| 2018/0056985 | A1 | 3/2018 | Coulter et al. | |
| 2018/0084390 | A1 | 3/2018 | Kusens | |
| 2018/0096550 | A1 | 4/2018 | Kusens et al. | |
| 2018/0110445 | A1 | 4/2018 | Bhimavarapu et al. | |
| 2018/0114053 | A1 | 4/2018 | Kusens et al. | |
| 2018/0137340 | A1 | 5/2018 | Kusens et al. | |
| 2018/0151010 | A1 | 5/2018 | Kusens et al. | |
| 2018/0161225 | A1 | 6/2018 | Zerhusen et al. | |
| 2018/0167816 | A1 | 6/2018 | Kusens et al. | |
| 2018/0184984 | A1 | 7/2018 | Zerhusen et al. | |
| 2018/0189946 | A1 | 7/2018 | Kusens et al. | |
| 2018/0211464 | A1 | 7/2018 | Kusens et al. | |
| 2018/0218489 | A1 | 8/2018 | Kusens | |
| 2018/0250177 | A1 | 9/2018 | Magill et al. | |
| 2018/0271286 | A1 | 9/2018 | Jacobs et al. | |
| 2018/0271287 | A1 | 9/2018 | Jacobs et al. | |
| 2018/0303687 | A1 | 10/2018 | Moreno et al. | |
| 2018/0369035 | A1 | 12/2018 | Bhimavarapu et al. | |
| 2018/0369037 | A1 | 12/2018 | Desaulniers et al. | |
| 2018/0369038 | A1 | 12/2018 | Bhimavarapu et al. | |
| 2018/0369039 | A1 | 12/2018 | Bhimavarapu et al. | |
| 2018/0374573 | A1 | 12/2018 | Bhimavarapu et al. | |
| 2018/0374577 | A1 | 12/2018 | Bhimavarapu | |
| 2019/0008708 | A1 | 1/2019 | Moreno et al. | |
| 2019/0024882 | A1 | 1/2019 | Jonsson et al. | |
| 2019/0046373 | A1 | 2/2019 | Coulter et al. | |
| 2019/0122838 | A1 | 4/2019 | Holas | |

FOREIGN PATENT DOCUMENTS

| | | | |
|---|---|---|---|
| EP | 0727298 | A1 | 8/1996 |
| EP | 0727298 | B1 | 8/1999 |
| EP | 2489341 | A2 | 8/2012 |
| EP | 2531159 | A2 | 12/2012 |
| EP | 2619724 | A2 | 7/2013 |
| EP | 2918255 | A1 | 9/2015 |
| JP | 2003140631 | A | 5/2003 |
| KR | 20130076922 | A | 7/2013 |
| WO | 0101913 | A1 | 1/2001 |
| WO | 2006089399 | A2 | 8/2006 |
| WO | 2011097569 | A2 | 8/2011 |
| WO | 2012040554 | A2 | 3/2012 |
| WO | 2014021873 | A1 | 2/2014 |
| WO | 2015148578 | A2 | 10/2015 |
| WO | 2015157402 | A1 | 10/2015 |
| WO | 2015171365 | A1 | 11/2015 |
| WO | 2016123595 | A1 | 8/2016 |
| WO | 2016196403 | A1 | 12/2016 |
| WO | 2016200556 | A1 | 12/2016 |
| WO | 2017027427 | A1 | 2/2017 |
| WO | 2017031111 | A1 | 2/2017 |
| WO | 2017061471 | A1 | 4/2017 |
| WO | 2017124056 | A1 | 7/2017 |
| WO | 2017201513 | A1 | 11/2017 |

(56) References Cited

FOREIGN PATENT DOCUMENTS

| | | | |
|---|---|---|---|
| WO | 2018026979 | A1 | 2/2018 |
| WO | 2018154819 | A1 | 8/2018 |
| WO | 2018203476 | A1 | 11/2018 |
| WO | 2018216387 | A1 | 11/2018 |

OTHER PUBLICATIONS

Astral Healthcare, "Opthalmology Day Surgery Chair Webpage", Apr. 2018, http://astralhealthcare.com/?product=opthalmology-day-surgery-chair, 6 pages.
Campbell, Mikey, "Apple Expected to Replace Touch ID With Two-Step Facial, Fingerprint Bio-Recognition Tech", Apple Insider, Jan. 21, 2017, http://iphone.appleinsider.com/articles/17/01/21/apple-expected-to-replace-touch-id-with-two-step-facial-fingerprint-bio-recognition-tech, 4 pages.
Doge Medical, "DOC Classic- DOC Surgery Chairs Webpage", 2014, 2 pages, https://web.archive.org/web/20140214203605/http://www.dogemedical.com/pages/en/products/surgery-chairs/doc-classic.php?lang=EN.
English language abstract and machine-assisted English translation for CN 101789230 extracted from espacenet.com database on Aug. 30, 2018, 31 pages.
English language abstract and machine-assisted English translation for JP 2003-140631 extracted from espacenet.com database on Aug. 30, 2018, 19 pages.
English language abstract and machine-assisted English translation for KR 2013-0076922 A extracted from espacenet. com database on Aug. 16, 2018, 8 pages.
English language abstract and machine-assisted English translation for WO 2017/061471 extracted from espacenet. com database on Mar. 25, 2019, 26 pages.
English language abstract and machine-assisted English translation for WO 2018/154819 extracted from espacenet.com database on Mar. 25, 2019, 35 pages.
English language abstract and machine-assisted English translation for WO 2018/203476 extracted from espacenet.com database on Mar. 25, 2019, 37 pages.
English language abstract and machine-assisted English translation for WO 2018/216387 extracted from espacenet.com database on Mar. 25, 2019, 43 pages.
English language abstract for DE 195 05 162 C1 extracted from espacenet.com database on Aug. 16, 2018, 1 page.
English language abstract for EP 0 727 298 A1 extracted from espacenet.com database on Aug. 16, 2018, 1 page.
English language abstract for EP 0 727 298 B1 extracted from espacenet.com database on Aug. 16, 2018, 1 page.
Hall, Stephen, "Nest's 3rd Generation Thermostat Gets Some New Views for Its Farsight Feature", 9 to 5 Google, Jun. 14, 2016, https://9to5google.com/2016/06/14/nest-3rd-gen-thermostat-views-farsight/, 4 pages.
Hill-Rom, "Centrella Smart+Bed Brochure" 2017, 11 pages.
More, "How to Use Night Shift on your iPhone or iPad", video also found at https://www.imore.com/night-shift, Nov. 1, 2017, 12 pages.
Recliners.la "Stellar 550 Large Lift Chair Recliner Webpage", Apr. 2018, https://www.recliners.la/products/ultra-comfort-stellar-550-large-lift-chair, 4 pages.
Stryker Medical, "InTouch Critical Care Bed Operations Manual", Aug. 2014, 125 pages.
Stryker, "InTouch Critical Care Bed Model FL27 (2130/2140) Operations Manual—Optional Pendant Control", 2130-009-001 Rev C, Apr. 2008, p. 25.
Supportec-Trade, "Portfolilio Webpage", 2017, https://supportec-trade.nl/en, 2 pages.
U.S. Appl. No. 16/019,973, filed Jun. 27, 2018, 90 pages.
U.S. Appl. No. 16/019,986, filed Jun. 27, 2018, 57 pages.
U.S. Appl. No. 16/020,003, filed Jun. 27, 2018, 37 pages.
U.S. Appl. No. 16/020,052, filed Jun. 27, 2018, 48 pages.
U.S. Appl. No. 16/020,068, filed Jun. 27, 2018, 125 pages.
U.S. Appl. No. 16/020,085, filed Jun. 27, 2018, 67 pages.
U.S. Appl. No. 62/525,359, filed Jun. 27, 2017.
U.S. Appl. No. 62/525,363, filed Jun. 27, 2017.
U.S. Appl. No. 62/525,368, filed Jun. 27, 2017.
U.S. Appl. No. 62/525,373, filed Jun. 27, 2017.
U.S. Appl. No. 62/525,377, filed Jun. 27, 2017.
Youtube, "Memory Seat Escape Video", Nov. 4, 2013, https://www.youtube.com/watch?v=xlghNmAK-7A, 1 page.
Youtube, "Microsoft HoloLens: Partner Spotlight with Stryker Communications Video", Feb. 21, 2017, https://www.youtube.com/watch?v=FTPxUGRGpnA, 3 pages.

* cited by examiner

PATIENT SUPPORT APPARATUS CONTROL SYSTEMS

CROSS-REFERENCE TO RELATED APPLICATIONS

The subject patent application is a Continuation of U.S. patent application Ser. No. 16/019,973, filed on Jun. 27, 2018, which claims priority to and all the benefits of U.S. Provisional Patent Application No. 62/525,368 filed on Jun. 27, 2017, the disclosures of each of which are hereby incorporated by reference in their entirety.

TECHNICAL FIELD

The present disclosure relates, generally, to patient support apparatuses and, more specifically, to patient support apparatus control systems.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more powered devices with motors to perform one or more functions, such as lifting and lowering the patient support surface, articulating one or more deck sections, raising a patient from a slouched position, turning a patient, centering a patient, extending a length or width of the patient support apparatus, and the like. Furthermore, these patient support apparatuses typically employ one or more sensors arranged to detect patient movement, monitor patient vital signs, and the like.

When a caregiver wishes to perform an operational function, such as operating a powered device that adjusts the patient support surface relative to the base, the caregiver actuates an input device of a user interface, often in the form of a touchscreen or a button on a control panel. Here, the user interface may also employ a screen to display visual content to the caregiver, such as patient data and operating or status conditions of the patient support apparatus. The visual content may further comprise various graphical menus, buttons, indicators, and the like, which may be navigated via the input device. Certain operational functions or features of the patient support apparatus may also be accessible to and adjustable by the patient. Here, the user interface may allow the patient to adjust the patient support surface between various positions or configurations, view and navigate visual content displayed on a screen (for example, a television program), adjust audio output (for example, volume), and the like.

As the number and complexity of functions integrated into conventional patient support apparatuses has increased, the associated user interfaces have also become more complex and expensive to manufacture. While conventional patient support apparatuses have generally performed well for their intended purpose, there remains a need in the art for a patient support apparatus which overcomes the disadvantages in the prior art and which affords caregivers and patients with improved usability and functionality in a number of different operating conditions.

DETAILED DESCRIPTION OF THE EMBODIMENTS

Figure 1:
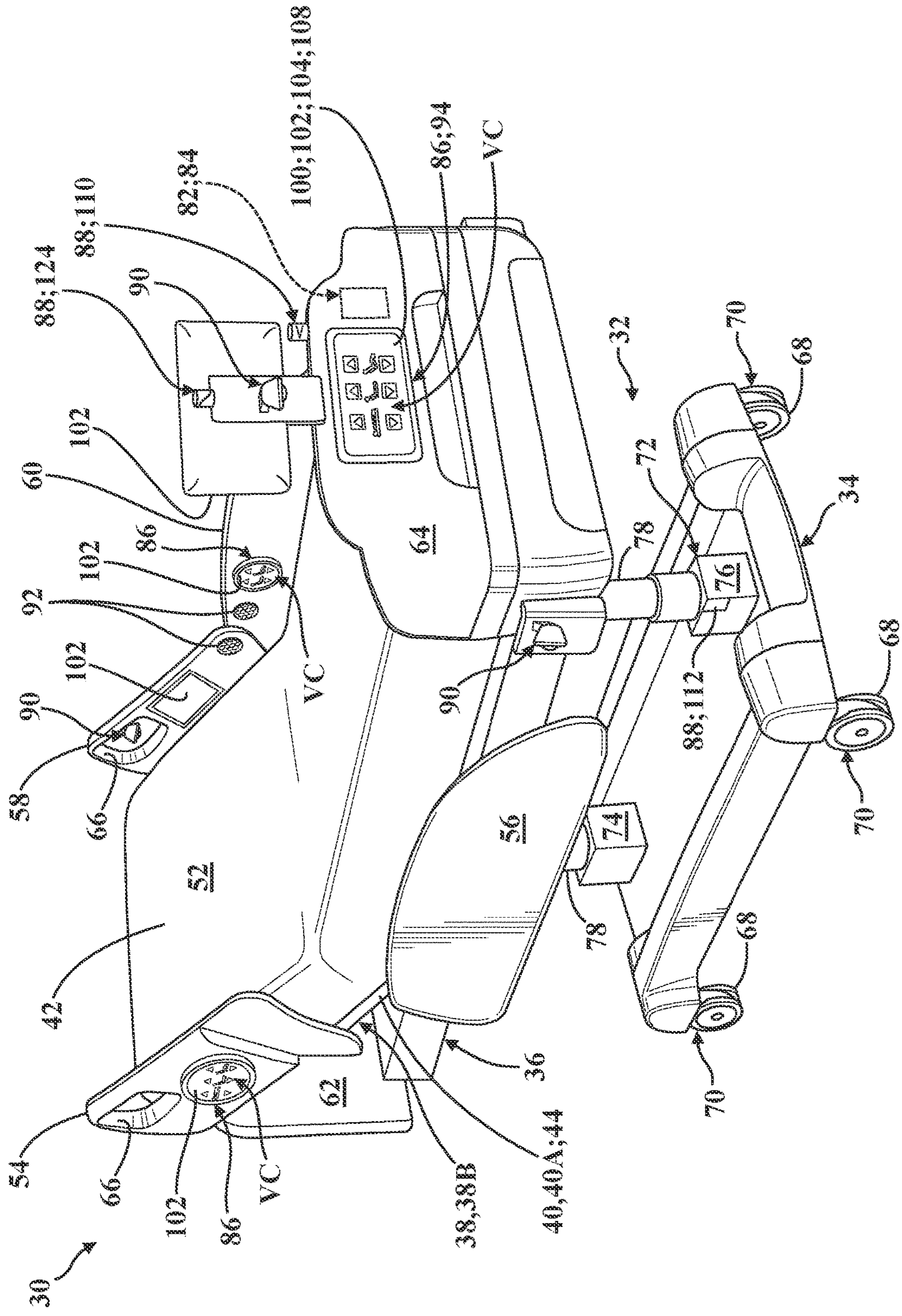
FIG. 1 is perspective view of a patient support apparatus.

Referring to FIGS. 1-3B, a patient support apparatus 30 is shown for supporting a patient in a health care setting. The patient support apparatus 30 illustrated throughout the drawings is realized as a hospital bed. In other embodiments, however, the patient support apparatus 30 may be a stretcher, a cot, a table, a wheelchair, a chair, or a similar apparatus utilized in the care of a patient.

A support structure 32 provides support for the patient. In the representative embodiment illustrated herein, the support structure 32 comprises a base 34, an intermediate frame 36, and a patient support deck 38. The intermediate frame 36 and the patient support deck 38 are spaced above the base 34 in FIG. 1. As is described in greater detail below, the intermediate frame 36 and the patient support deck 38 are arranged for movement relative to the base 34 between a plurality of vertical configurations 38A, 38B.

The patient support deck 38 has at least one deck section 40 arranged for movement relative to the intermediate frame 36 between a plurality of section positions 40A, 40B. The deck sections 40 of the patient support deck 38 provide a patient support surface 42 upon which the patient is supported. More specifically, in the representative embodiment of the patient support apparatus 30 illustrated herein, the patient support deck 38 has four deck sections 40 which cooperate to define the patient support surface 42: a back section 44, a seat section 46, a leg section 48, and a foot section 50 (see FIGS. 3A and 3B). Here, the seat section 46 is fixed to the intermediate frame 36 and is not arranged for movement relative thereto. However, it will be appreciated that the seat section 46 could be movable relative to other deck sections 40 in some embodiments. Conversely, the back section 44 and the leg section 48 are arranged for independent movement relative to each other and to the intermediate frame 36, as described in greater detail below, and the foot section 50 is arranged to move partially concurrently with the leg section 48. Other configurations and arrangements are contemplated.

A mattress 52 is disposed on the patient support deck 38 during use. The mattress 52 comprises a secondary patient support surface upon which the patient is supported. The base 34, the intermediate frame 36, and the patient support deck 38 each have a head end and a foot end corresponding to designated placement of the patient's head and feet on the patient support apparatus 30. It will be appreciated that the specific configuration of the support structure 32 may take on any known or conventional design, and is not limited to that specifically illustrated and described herein. In addition, the mattress 52 may be omitted in certain embodiments, such that the patient can rest directly on the patient support surface 42 defined by the deck sections 40 of the patient support deck 38.

Side rails 54, 56, 58, 60 are coupled to the support structure 32 and are supported by the base 34. A first side rail 54 is positioned at a right head end of the intermediate frame 36. A second side rail 56 is positioned at a right foot end of the intermediate frame 36. A third side rail 58 is positioned at a left head end of the intermediate frame 36. A fourth side rail 60 is positioned at a left foot end of the intermediate frame 36. The side rails 54, 56, 58, 60 are advantageously movable between a raised position in which they block ingress and egress into and out of the patient support apparatus 30, one or more intermediate positions, and a lowered position in which they are not an obstacle to such ingress and egress. It will be appreciated that there may be fewer side rails for certain embodiments, such as where the patient support apparatus 30 is realized as a stretcher or a cot. Moreover, it will be appreciated that in certain configurations, the patient support apparatus 30 may not include any side rails. Similarly, it will be appreciated that side rails may be attached to any suitable component or structure of the patient support apparatus 30. Furthermore, in certain embodiments the first and third side rails 54, 58 are coupled to a deck section 40 for concurrent movement between section positions 40A, 40B (for example, see FIGS. 7A-7B and FIGS. 13A-13B). In FIGS. 3A, 3B, 5A-8B, 12A, and 12B, which each depict right-side views of the patient support apparatus, the first and second side rails 54, 56 are omitted for clarity.

As shown in FIG. 1, a headboard 62 and a footboard 64 are coupled to the intermediate frame 36 of the support structure 32. However, it will be appreciated that the headboard 62 and/or footboard 64 may be coupled to other locations on the patient support apparatus 30, such as the base 34, or may be omitted in certain embodiments.

One or more caregiver interfaces 66, such as handles, are shown in FIG. 1 as being integrated into the first and third side rails 54, 58 to facilitate movement of the patient support apparatus 30 over floor surfaces. Additional caregiver interfaces 66 may be integrated into the headboard 62, the footboard 64, and/or other components of the patient support apparatus 30, such as the second and/or fourth side rails 56, 60, the intermediate frame 36, and the like. The caregiver interfaces 66 are shaped so as to be grasped by a caregiver as a way to position or otherwise manipulate the patient support apparatus 30 for movement. It will be appreciated that the caregiver interfaces 66 could be integrated with or operatively attached to any suitable portion of the patient support apparatus 30, or may be omitted in certain embodiments.

Wheels 68 are coupled to the base 34 to facilitate transportation over floor surfaces. The wheels 68 are arranged in each of four quadrants of the base 34, adjacent to corners of the base 34. In the embodiment shown in FIG. 1, the wheels 68 are caster wheels able to rotate and swivel relative to the support structure 32 during transport. Here, each of the wheels 68 forms part of a caster assembly 70 mounted to the base 34. It should be understood that various configurations of the caster assemblies 70 are contemplated. In addition, in some embodiments, the wheels 68 are not caster wheels. Moreover, it will be appreciated that the wheels 68 may be non-steerable, steerable, non-powered, powered, or combinations thereof. While the representative embodiment of the patient support apparatus 30 illustrated herein employs four wheels 68, additional wheels are also contemplated. For example, the patient support apparatus 30 may comprise four non-powered, non-steerable wheels, along with one or more additional powered wheels. In some cases, the patient support apparatus 30 may not include any wheels. In other embodiments, one or more auxiliary wheels (powered or non-powered), which are movable between stowed positions and deployed positions, may be coupled to the support structure 32. In some cases, when auxiliary wheels are located between caster assemblies 70 and contact the floor surface in the deployed position, they cause two of the caster assemblies 70 to be lifted off the floor surface, thereby shortening a wheel base of the patient support apparatus 30. A fifth wheel may also be arranged substantially in a center of the base 34.

Figure 5A:
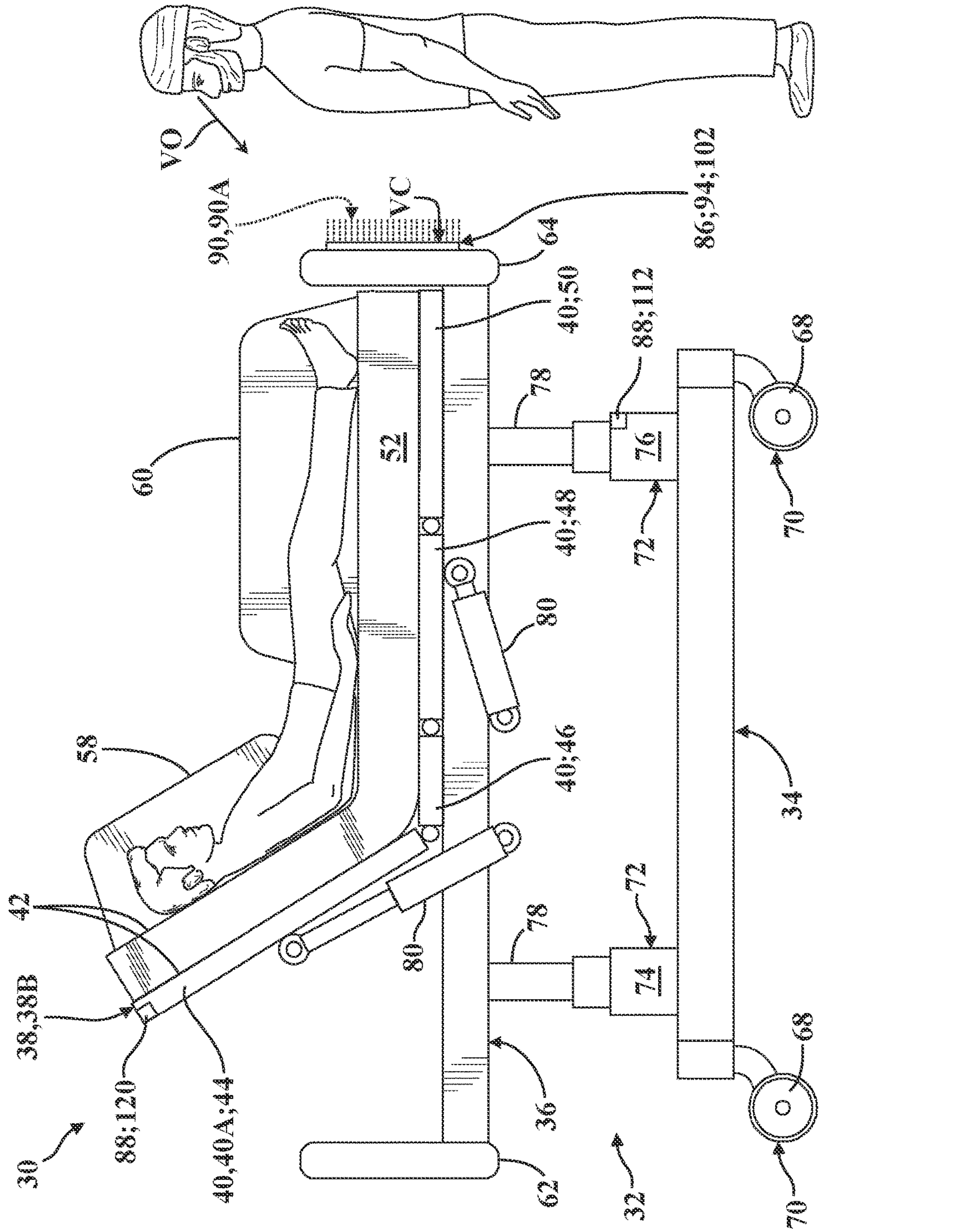
FIG. 5A is a right-side view of a patient support apparatus shown having a base, a patient support deck in a raised vertical configuration relative to the base, and caregiver-accessible user interface with a screen illuminated at a first illumination level.
Figure 5B:
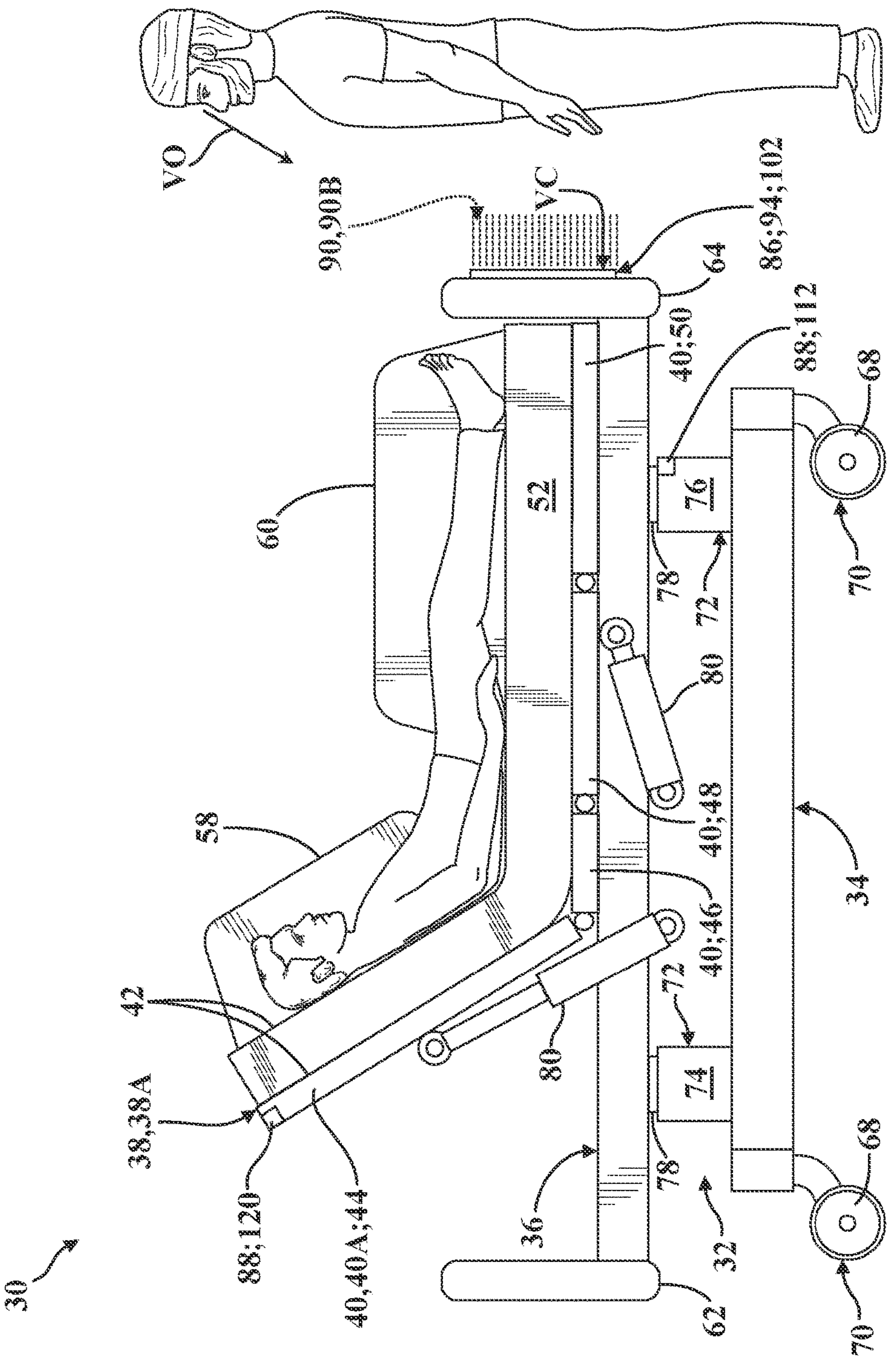
FIG. 5B is another right-side view of the patient support apparatus of FIG. 5A, shown with the patient support deck in a lowered vertical configuration relative to the base, and shown with the screen illuminated at a second illumination level.

The patient support apparatus 30 further comprises a lift mechanism, generally indicated at 72, which operates to lift and lower the intermediate frame 36 relative to the base 34 which, in turn, moves the patient support deck 38 between a first vertical configuration 38A (for example, a "lowered" vertical position as depicted in FIG. 5B), a second vertical configuration 38B (for example, a "raised" vertical position as depicted in FIG. 5A), or to any desired vertical position in between. To this end, the lift mechanism 72 comprises a head end lift member 74 and a foot end lift member 76 which are each arranged to facilitate movement of the intermediate frame 36 with respect to the base 34 using one or more lift actuators 78 (see FIG. 2; not shown in detail). The lift actuators 78 may be realized as linear actuators, rotary actuators, or other types of actuators, and may be electrically operated and/or may be hydraulic. It is contemplated that, in some embodiments, only one lift member and one associated lift actuator may be employed, e.g., to raise only one end of the intermediate frame 36, or one central lift actuator to raise and lower the intermediate frame 36. The construction of the lift mechanism 72, the head end lift member 74, and/or the foot end lift member 76 may take on any known or conventional design, and is not limited to that specifically illustrated. By way of non-limiting example, the lift mechanism 72 could comprise a "scissor" linkage arranged between the base 34 and the intermediate frame 36 with one or more actuators configured to facilitate vertical movement of the patient support deck 38.

Figure 7A:
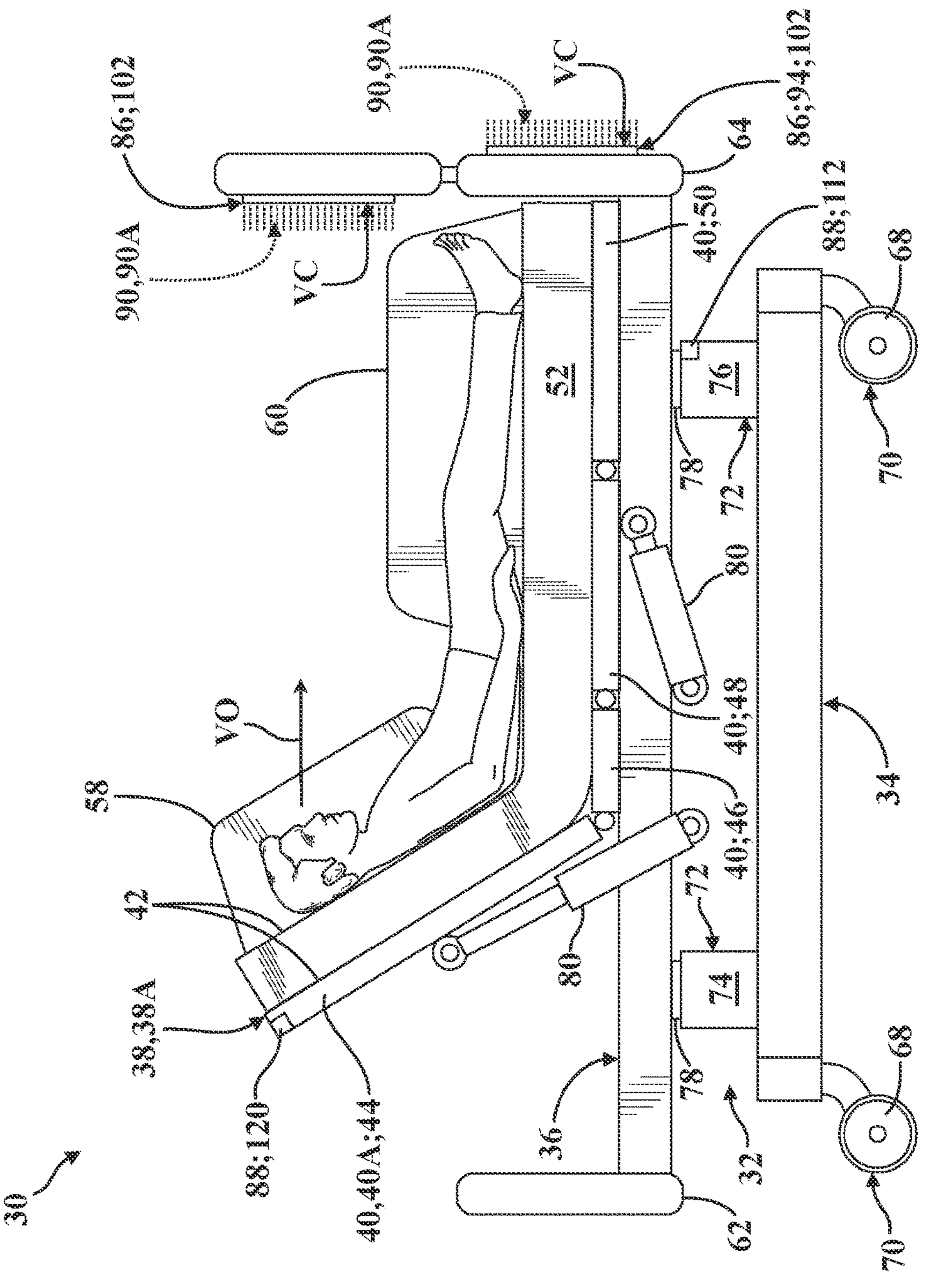
FIG. 7A is a right-side view of a patient support apparatus shown having a base, a patient support deck with a deck section arranged in a first section position, and an illuminated screen of a patient-accessible user interface shown with the screen illuminated at a first illumination level.
Figure 7B:
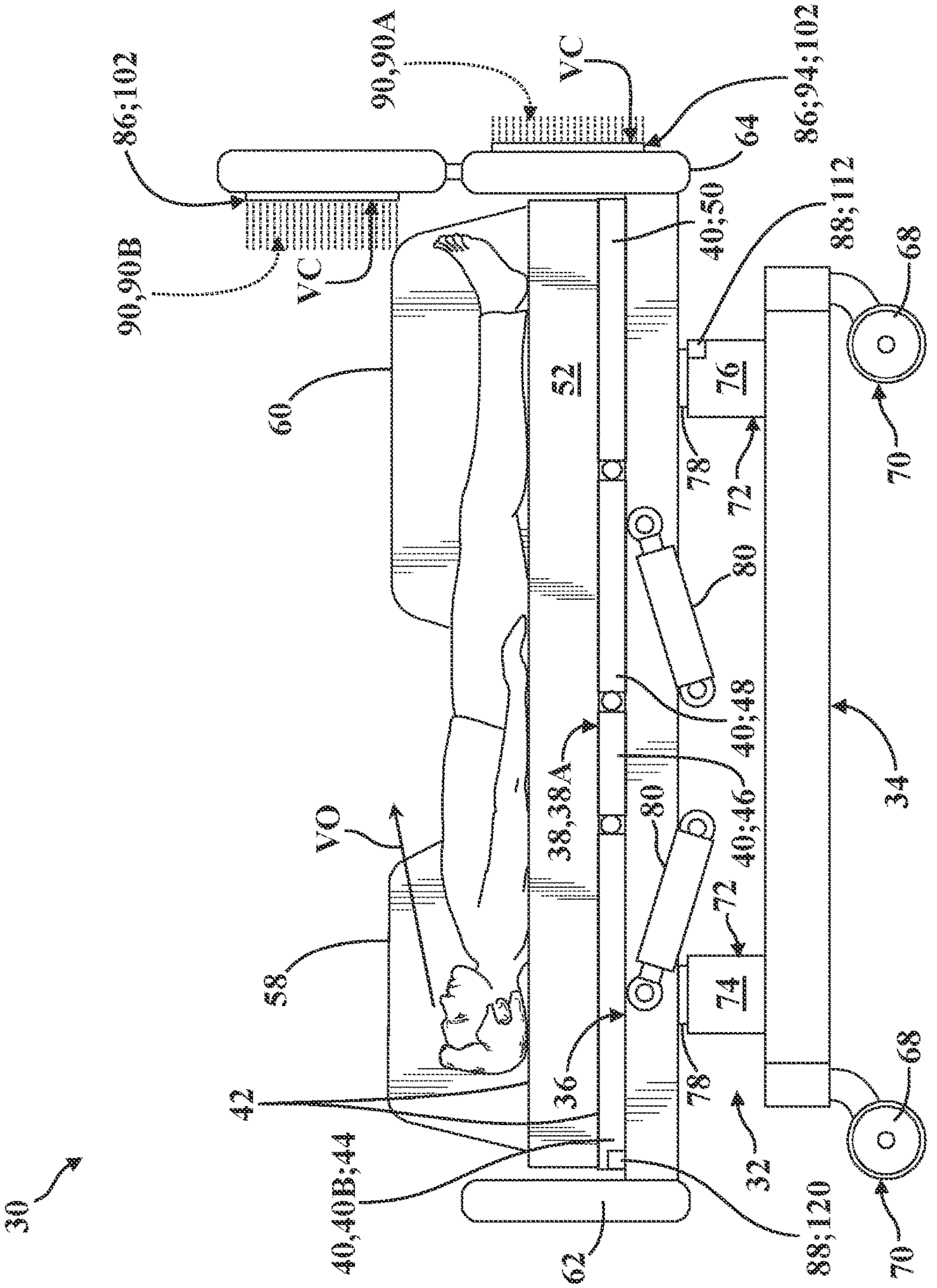
FIG. 7B is another right-side view of the patient support apparatus of FIG. 7A, shown with the deck section arranged in a second section position, and shown with the screen illuminated at a second illumination level.

As noted above, the patient support deck 38 is operatively attached to the intermediate frame 36, and the deck section 40 is arranged for movement between a first section position 40A (see FIG. 7A) and a second section position 40B (see FIG. 7B). To this end, one or more deck actuators 80 are interposed between the deck section 40 and the intermediate frame 36 to move the deck section 40 between the first section position 40A (see FIG. 7A), the second section position 40B (see FIG. 7B), and any other suitable section position. In the representative embodiment illustrated herein, the deck actuator 80 is realized as a linear actuator disposed in force-translating relationship between the deck section 40 and the intermediate frame 36. More specifically, one deck actuator 80 is provided between the intermediate frame 36 and the back section 44, and another deck actuator 80 is provided between the intermediate frame 36 and the leg section 48, and each of the deck actuators 80 is arranged for independent movement to position the respective deck sections 40 to adjust the shape of the patient support surface 42 between a plurality of patient support configurations (for example, a flat configuration, a raised fowler configuration, a seated configuration, etc.).

Those having ordinary skill in the art will appreciate that the patient support apparatus 30 could employ any suitable number of deck actuators 80, of any suitable type or configuration sufficient to effect selective movement of the deck section 40 relative to the support structure 32. By way of non-limiting example, the deck actuator 80 could be a linear actuator or one or more rotary actuators driven electronically and/or hydraulically, and/or controlled or driven in any suitable way. Moreover, the deck actuator 80 could be mounted, secured, coupled, or otherwise operatively attached to the intermediate frame 36 and to the deck section 40, either directly or indirectly, in any suitable way. In addition, one or more of the deck actuators 80 could be omitted for certain applications.

Referring now to FIGS. 1-13B, the patient support apparatus 30 employs a control system, generally indicated at 82, to effect operation of various functions of the patient support apparatus 30, as described in greater detail below. To this end, and as is best shown schematically in FIG. 2, the control system 82 generally comprises a controller 84 disposed in communication with one or more user interfaces 86 adapted for use by the patient and/or the caregiver to facilitate operation of one or more functions of the patient support apparatus 30. In certain embodiments, the controller 84 is also disposed in communication with the lift actuators 78, the deck actuators 80, one or more sensors 88, one or light modules 90, and/or one or more speakers 92. Each of these components will be described in greater detail below.

Figure 2:
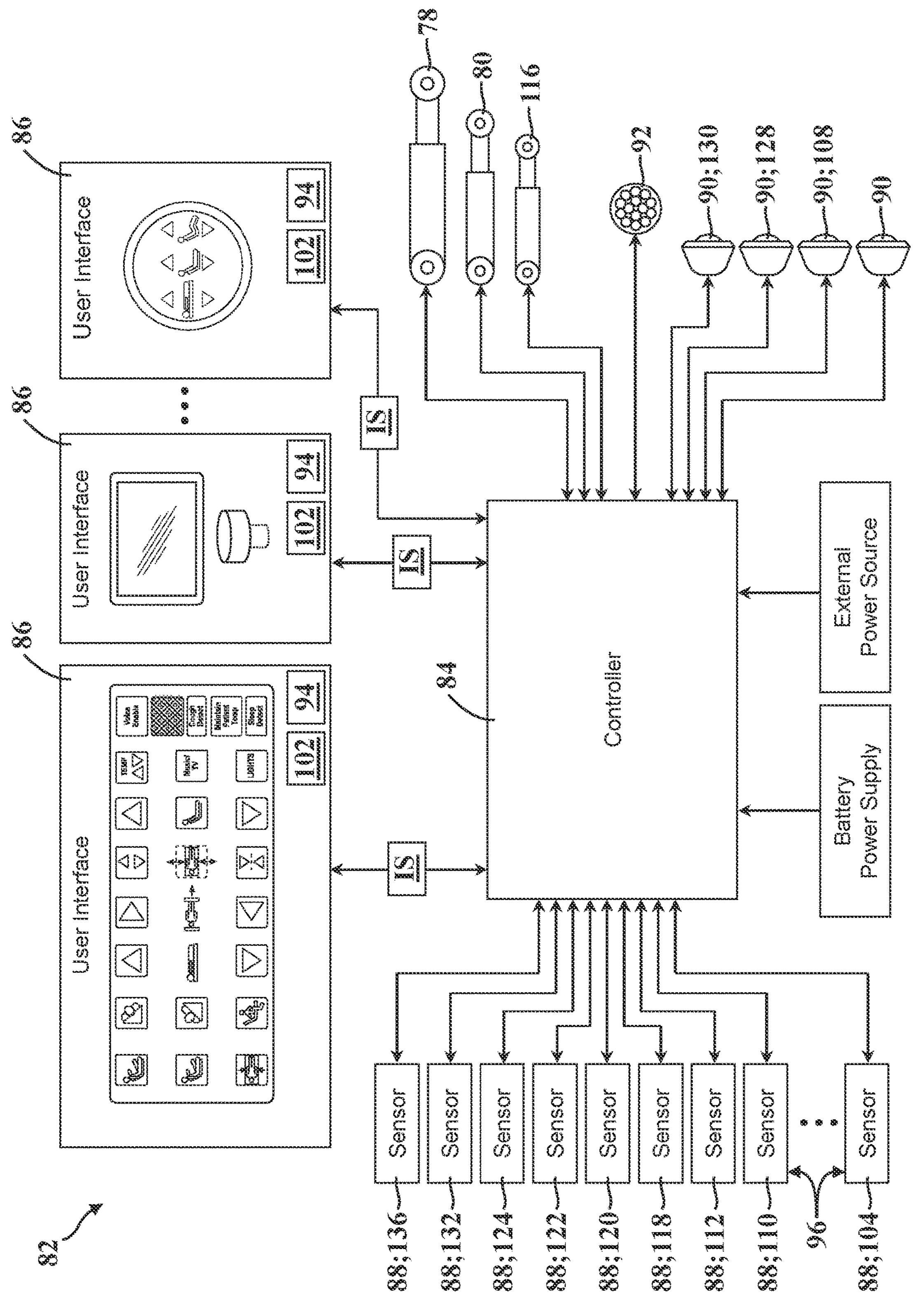
FIG. 2 is a schematic view of a control system of the patient support apparatus of FIG. 1.

As noted above, the controller 84 is best depicted schematically FIG. 2, and has been omitted from certain drawings for the purposes of clarity and consistency. It will be appreciated that the controller 84 and/or the control system 82 can be configured or otherwise arranged in a number of different ways. The controller 84 may have one or more microprocessors for processing instructions or for processing an algorithm stored in memory to control operation of the actuators 78, 80, generation or interpretation of an input signal IS, communication with the user interfaces 86, and the like. Additionally or alternatively, the controller 84 may comprise one or more microcontrollers, field programmable gate arrays, systems on a chip, discrete circuitry, and/or other suitable hardware, software, or firmware that is capable of carrying out the various functions and operations described herein. The controller 84 may be carried on-board the patient support apparatus 30, such as on the base 34, or may be remotely located. The controller 84 may comprise one or more subcontrollers configured to control all of the actuators 78, 80 and/or user interfaces 86 or one or more subcontrollers for each actuator 78, 80 and/or user interface 86. The controller 84 may communicate with the actuators 78, 80 and/or the user interfaces 86 via wired or wireless connections.

In the representative embodiment illustrated in FIG. 1, the patient support apparatus 30 comprises a plurality of user interfaces 86 which may be accessible by the patient, the caregiver, or by both the caregiver and the patient. Each user interface 86 of the patient support apparatus 30 generally comprises an input device 94 configured to generate an input signal IS in response to activation by a user which, in turn, is communicated to the controller 84. The controller 84, in turn, is responsive to the input signal IS and can control or otherwise carry out one or more functions of the patient support apparatus 30 in response to receiving the input signal IS. Put differently, the controller 84 is configured to perform a function of the patient support apparatus 30 in response to receiving the input signal IS from the input device 94. By way of non-limiting example, the input device 94 could be realized as a "lift bed" button, activation of which causes the controller 84 to drive the lift actuators 78 to move the patient support deck 38 and the intermediate frame 36 from the first vertical configuration 38A (see FIG. 5B) vertically away from the base 34 towards the second vertical configuration 38B (see FIG. 5A). Moreover, as is described in greater detail below, the controller 84 may be configured to facilitate navigation of visual content VC of the user interface 86 in response to receiving the input signal IS from the input device 94. Thus, it will be appreciated that the user interface 86 could be configured in a number of different ways sufficient to generate the input signal IS. Moreover, it will be appreciated that the user interfaces 86 could be of a number of different styles, shapes, configurations, and the like.

Figure 3A:
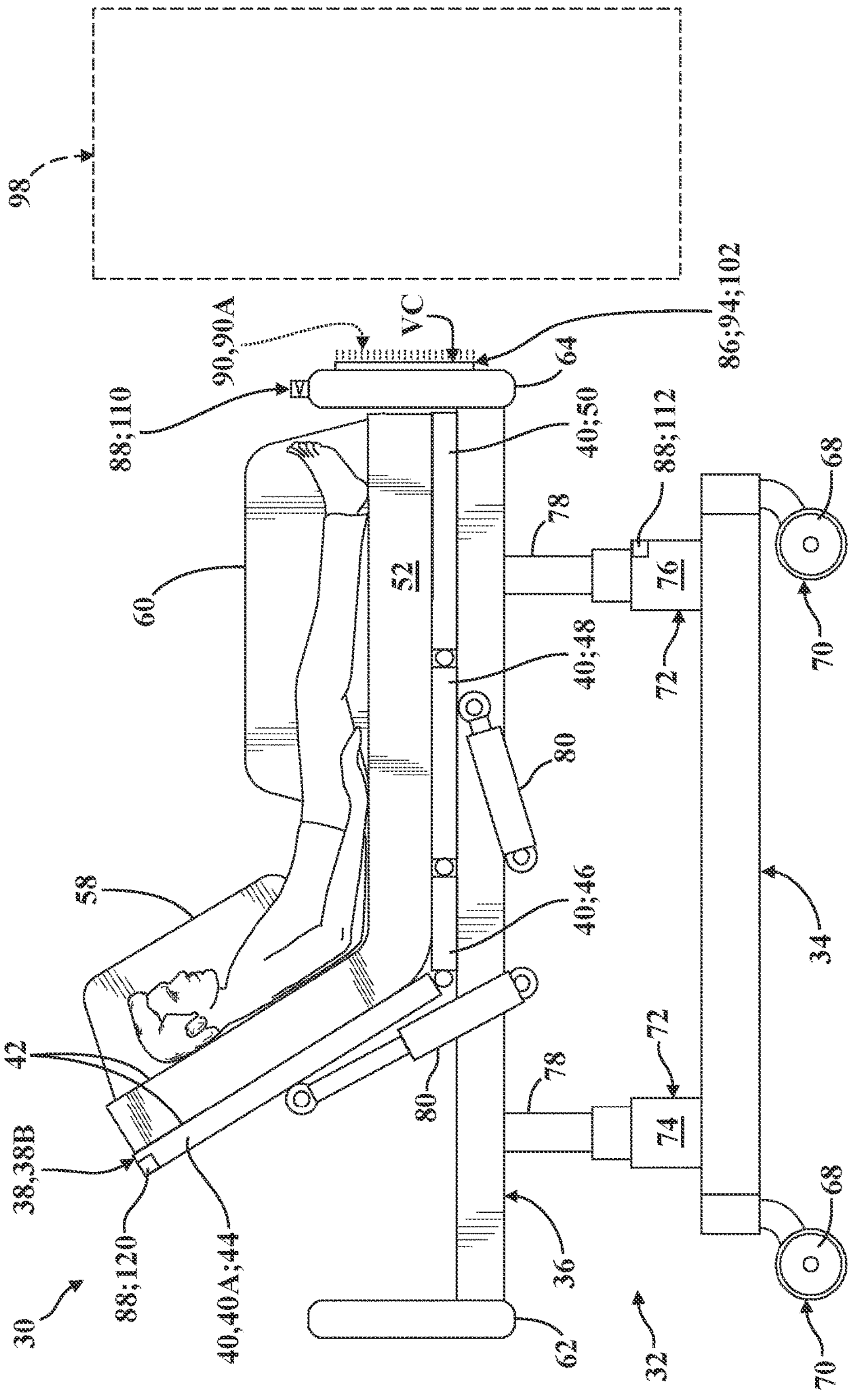
FIG. 3A is a right-side view of a patient support apparatus shown having a caregiver-accessible user interface illuminated at a first illumination level.

Referring now to FIGS. 3A-4H, in one embodiment, the patient support apparatus 30 comprises a caregiver sensing arrangement, generally indicated at 96, which is adapted to effect variable illumination of a caregiver-accessible user interface 86 via one or more light modules 90 under certain operating conditions. As shown in FIG. 3A, an envelope 98 is defined adjacent to a caregiver-accessible user interface 86 coupled to the footboard 64 of the patient support apparatus 30, and the controller 84 is configured to respond to movement occurring within the envelope 98, as described in greater detail below. During an absence of movement within the envelope 98, the controller 84 is configured to control the light module 90 to illuminate the input device 94 at a first illumination level 90A. When movement is sensed within the envelope 98, the controller is configured to control the light module 90 to illuminate the input device 94 at a second illumination level 90B. Thus, the input device 94 is illuminated differently as a caregiver approaches the user interface 86 (compare FIG. 3A with FIG. 3B).

Figure 3B:
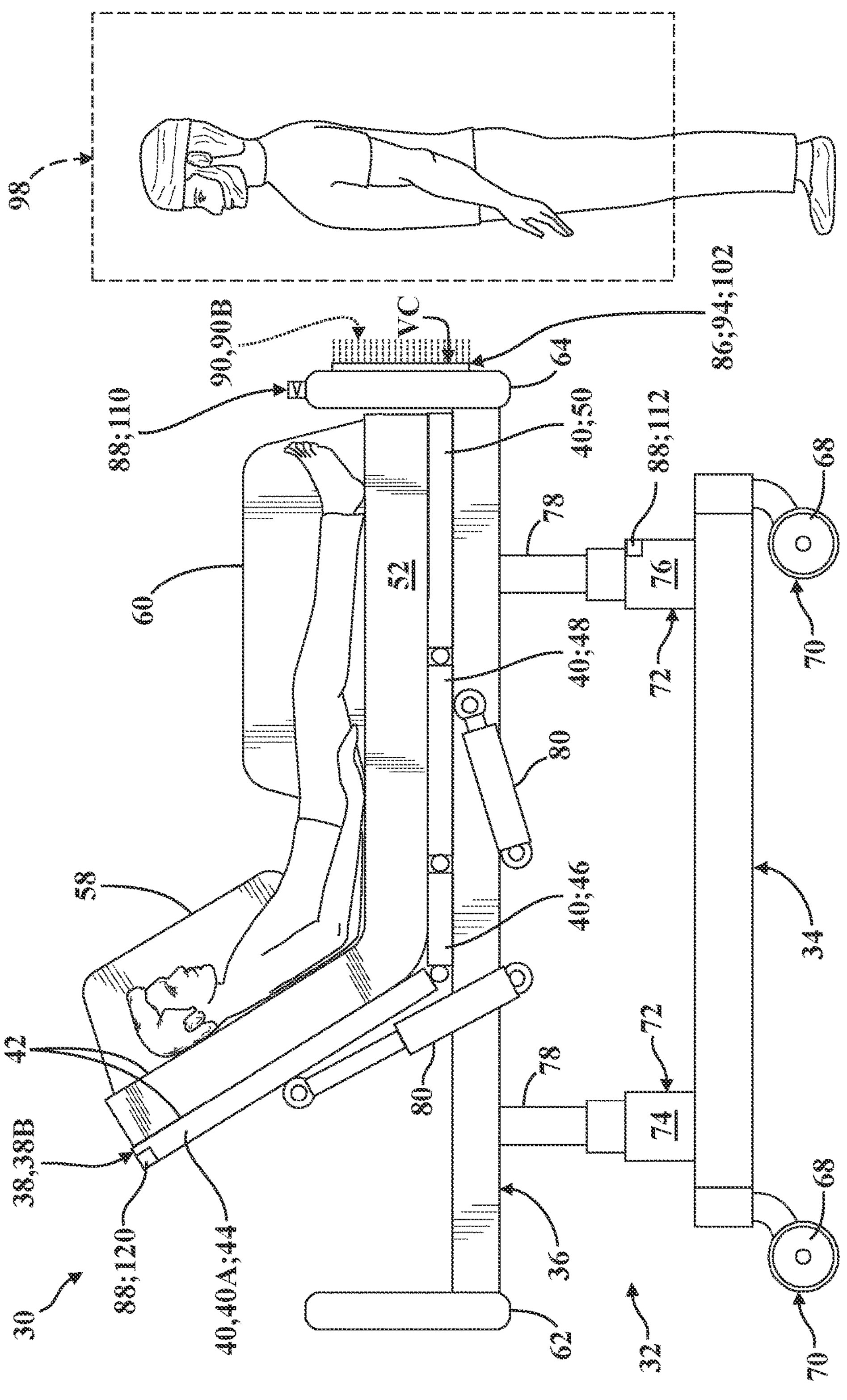
FIG. 3B is another right-side view of the patient support apparatus of FIG. 3A shown with the user interface illuminated at a second illumination level in response to the presence of a caregiver.

In one embodiment, the second illumination 90B is greater than the first illumination level 90A. Here, the first illumination level 90A could represent a relatively "dim" light emission by the light module 90, and the second illumination level 90B could represent a conversely "bright" light emission by the light module 90B. It will be appreciated that this configuration reduces power consumption by the light module 90 during periods of non-use while, at the same time, ensuring sufficient illumination of the user interface 86 during periods of use. While the representative embodiment illustrated in FIGS. 3A-3B depicts some light emission by the light module 90 at both the first illumination level 90A and at the second illumination level 90B, it will be appreciated that the first illumination level 90A could represent an absence of light emission in certain embodiments, depending on application requirements and the specific type and configuration of the user interface 86.

As noted above, controller 84 is configured to sense movement occurring within the envelope 98. Here, the controller 84 can sense movement within the envelope 98 in different ways, and can likewise effect illumination of the user interface 86 in different ways to accommodate different types of input devices 94 and/or light modules 90.

Figure 4A:
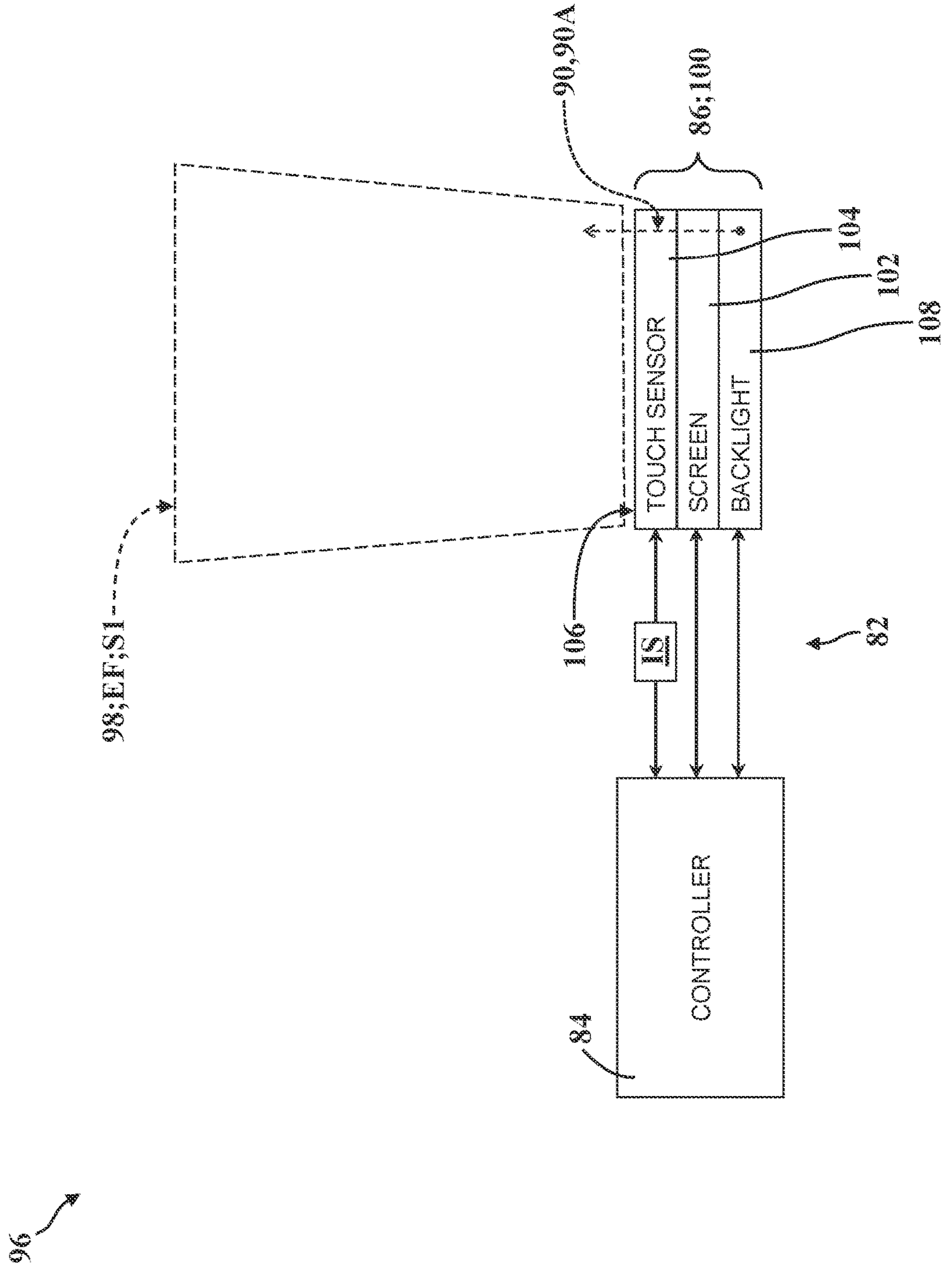
FIG. 4A is a partial schematic view of a caregiver sensing arrangement comprising a controller disposed in communication with a touch sensor, a screen, and a backlight, shown with the touch sensor operating at a first sensitivity level and with the backlight emitting light through the screen and the touch sensor at a first illumination level.
Figure 4B:
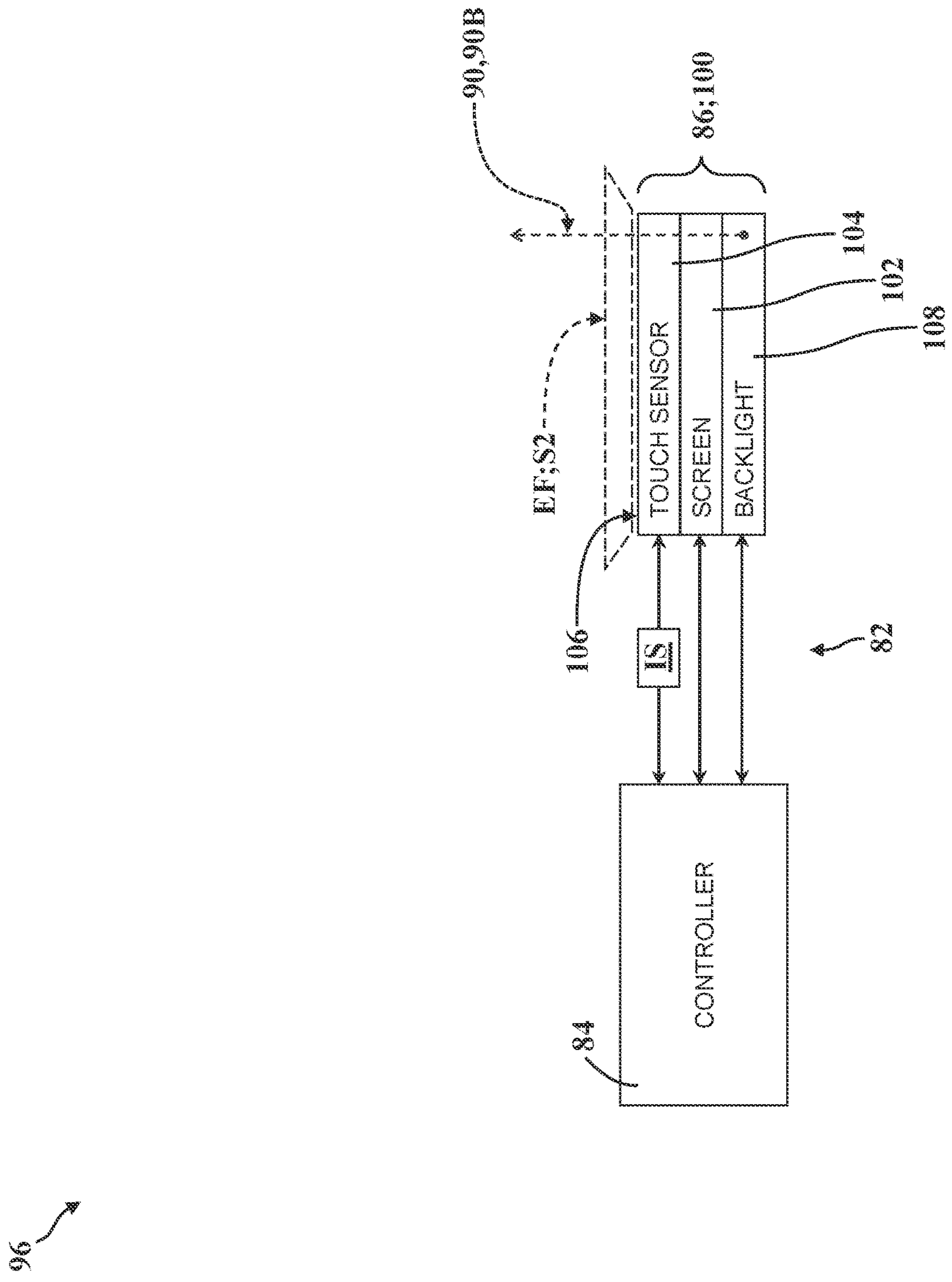
FIG. 4B is another partial schematic view of the caregiver sensing arrangement of FIG. 4A, shown with the touch sensor operating at a second sensitivity level, and shown with the backlight emitting light through the screen and the touch sensor at a second illumination level.
Figure 4C:
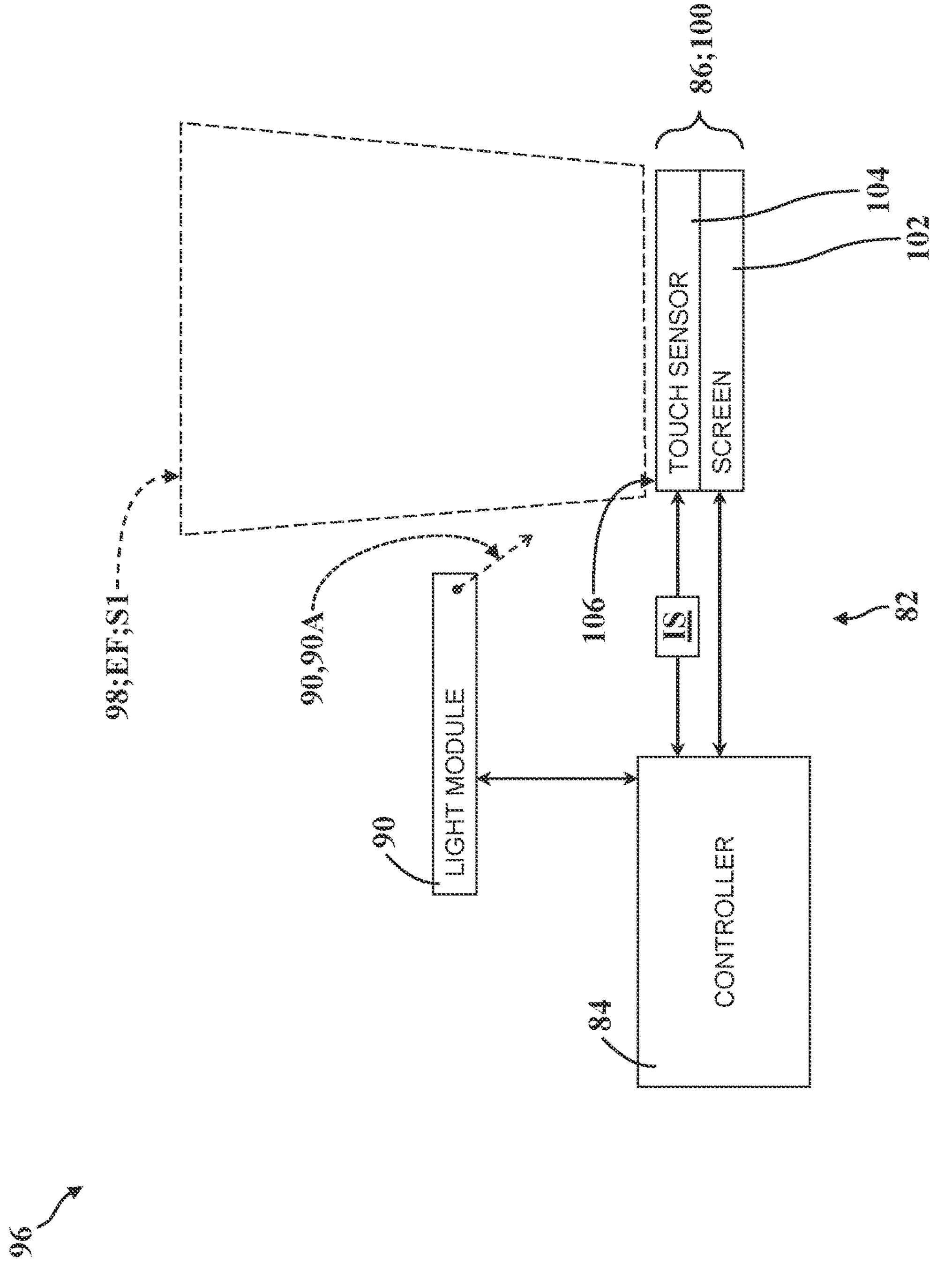
FIG. 4C is a partial schematic view of a caregiver sensing arrangement comprising a controller disposed in communication with a touch sensor, a screen, and a light module, shown with the touch sensor operating at a first sensitivity level and with the light module emitting light towards the screen and the touch sensor at a first illumination level.
Figure 4D:
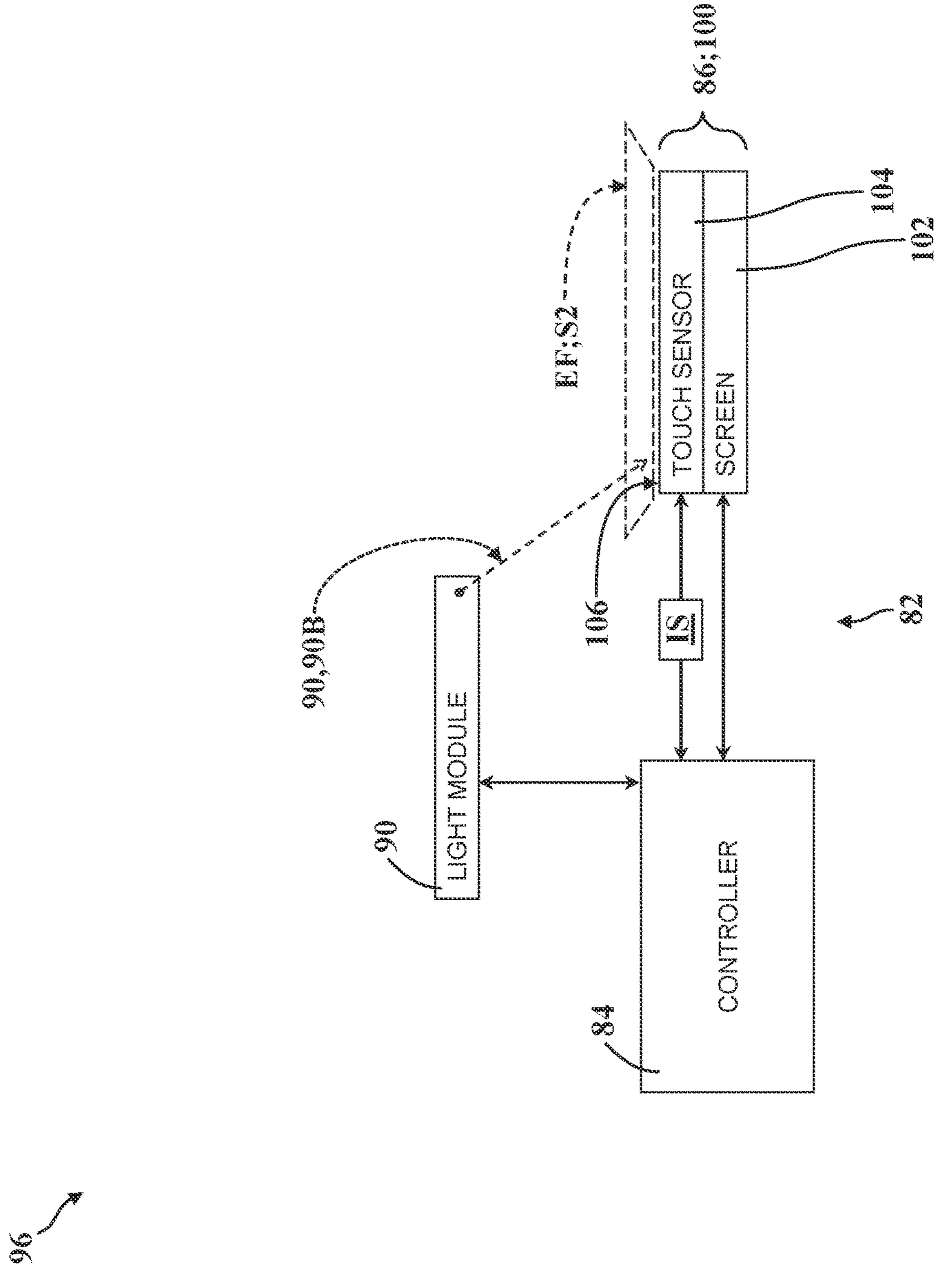
FIG. 4D is another partial schematic view of the caregiver sensing arrangement of FIG. 4C, shown with the touch sensor operating at a second sensitivity level, and shown with the light module emitting light towards the screen and the touch sensor at a second illumination level.

Referring now to FIGS. 4A-4D, two embodiments of the caregiver sensing arrangement 96, the user interface 86, and the light module 90 are depicted schematically; one embodiment in FIGS. 4A-4B and another embodiment in FIGS. 4C-4D. In each of these embodiments, the user interface 86 is realized as a touchscreen 100 comprising a screen 102 and a touch sensor 104. As is described in greater detail below, the screen 102 is configured to display visual content VC to the user, and may be of any suitable size, shape, and/or orientation sufficient to display visual content VC. By way of non-limiting example, the screen 102 could be realized as a curved LCD panel extending along the length or width of the patient support apparatus 30. The touch sensor 104 is operatively attached to the screen 102, defines an input surface 106 arranged adjacent to the screen 102, and is configured to generate an electric field EF within the envelope 98 which, in turn, is defined adjacent to the input surface 106.

In the embodiments of the caregiver sensing arrangement 96 illustrated in FIGS. 4A-4D, the touch sensor 104 serves as the input device 94 of the user interface 86 and acts to sense conductive objects interacting with the electric field EF. In order to sense conductive objects interacting with the electric field EF, the touch sensor 104 is operable at a first sensitivity level S1 to detect movement of conductive objects within the envelope 98 approaching the input surface 106 (see FIGS. 4A and 4C; compare to FIG. 3A).

In order to serve as the input device 94 of the user interface 86 in these embodiments, the touch sensor 104 is further operable at a second sensitivity level S2 to detect conductive objects engaging the input surface 106 (see FIGS. 4B and 4D; compare to FIG. 3B). Here, the controller 84 is in communication with the touchscreen 100 and is configured to operate the touch sensor 104 at the first sensitivity level S1 during an absence of conductive objects interacting with the electric field EF, and is further configured to operate the touch sensor 104 at the second sensitivity level S2 in response to conducive objects interacting with the electric field EF within the envelope 98. Here too in these embodiments, the electric field EF generated by the touch sensor 104 may be configured to project away from the input surface 106 within the envelope 98 when operating at the first sensitivity level S1, and may be configured to project along the input surface 106 when operating at the second sensitivity level S2. Thus, those having ordinary skill in the art will appreciate that the electric field EF generated by the touch sensor 104 may be of the type associated with conventional capacitive touchscreen interfaces, whereby touchscreen operation occurs at the second sensitivity level S2 when the user touches the input surface 106.

As noted above, the light module 90 employed to illuminate the input device 94 of the user interface 86 can be configured in a number of different ways. In the embodiment illustrated in FIGS. 4A-4B, the light module 90 is realized as a backlight, generally indicated at 108, which is disposed in communication with the controller 84 and which is arranged to emit light through both the screen 102 and the touch sensor 104 at the first and second illumination levels 90A, 90B. Here, the controller 84 is configured to control the backlight 108 to emit light at the first illumination level 90A when operating the touch sensor 104 at the first sensitivity level S1, and to control the backlight 108 to emit light at the second illumination level 90B when operating the touch sensor 104 at the second sensitivity level S1. In one embodiment, the controller 84 is further configured to subsequently control the backlight 108 to emit light at the first illumination level 90A and to operate the touch sensor 104 at the first sensitivity level Si in response to a subsequent absence of conductive objects interacting with the electric field EF persisting over a predetermined period of time (for example, 5 minutes of time lapsing since movement was detected within the envelope 98 or since the input surface 106 was engaged). Thus, during periods of non-use, the controller 84 can dim the backlight 108 and adjust the touch sensor 104 sensitivity to detect subsequent motion within the envelope.

As noted above, the controller 84 is configured to sense movement occurring within the envelope 98 in a number of different ways, and is configured to control illumination of the user interface 86 in different ways to accommodate different types of input devices 94 and/or light modules 90. Referring now to FIGS. 4E-4H, two additional embodiments of the caregiver sensing arrangement 96, the user interface 86, and the light module 90 are depicted schematically; one embodiment in FIGS. 4E-4F and another embodiment in FIGS. 4G-4H. In each of these embodiments, the user interface 86 comprises a screen 102 configured to display visual content VC to the user, an input device 94 spaced from the screen 102 to generate the input signal IS, a light module 90 positioned adjacent to and spaced from the input device 94 to emit light towards the input device 94 at the first and second illumination levels 90A, 90B, and a proximity sensor 110 spaced from the input device 94 and arranged to sense movement within the envelope 98 defined adjacent to the input device 94. Here, the controller 84 is disposed in communication with the proximity sensor 110 and the light module 90 and is configured to control the light module 90 to emit light towards the input device 94 at the first illumination level 90A during an absence of movement occurring within the envelope 98 sensed by the proximity sensor 110 (see FIGS. 4E and 4G; compare to FIG. 3A), and is configured to control the light module 90 to emit light towards the input device 94 at the second illumination level 90B in response to movement occurring within the envelope 98 sensed by the proximity sensor 110 (see FIGS. 4F and 4H; compare to FIG. 3B).

Figure 4E:
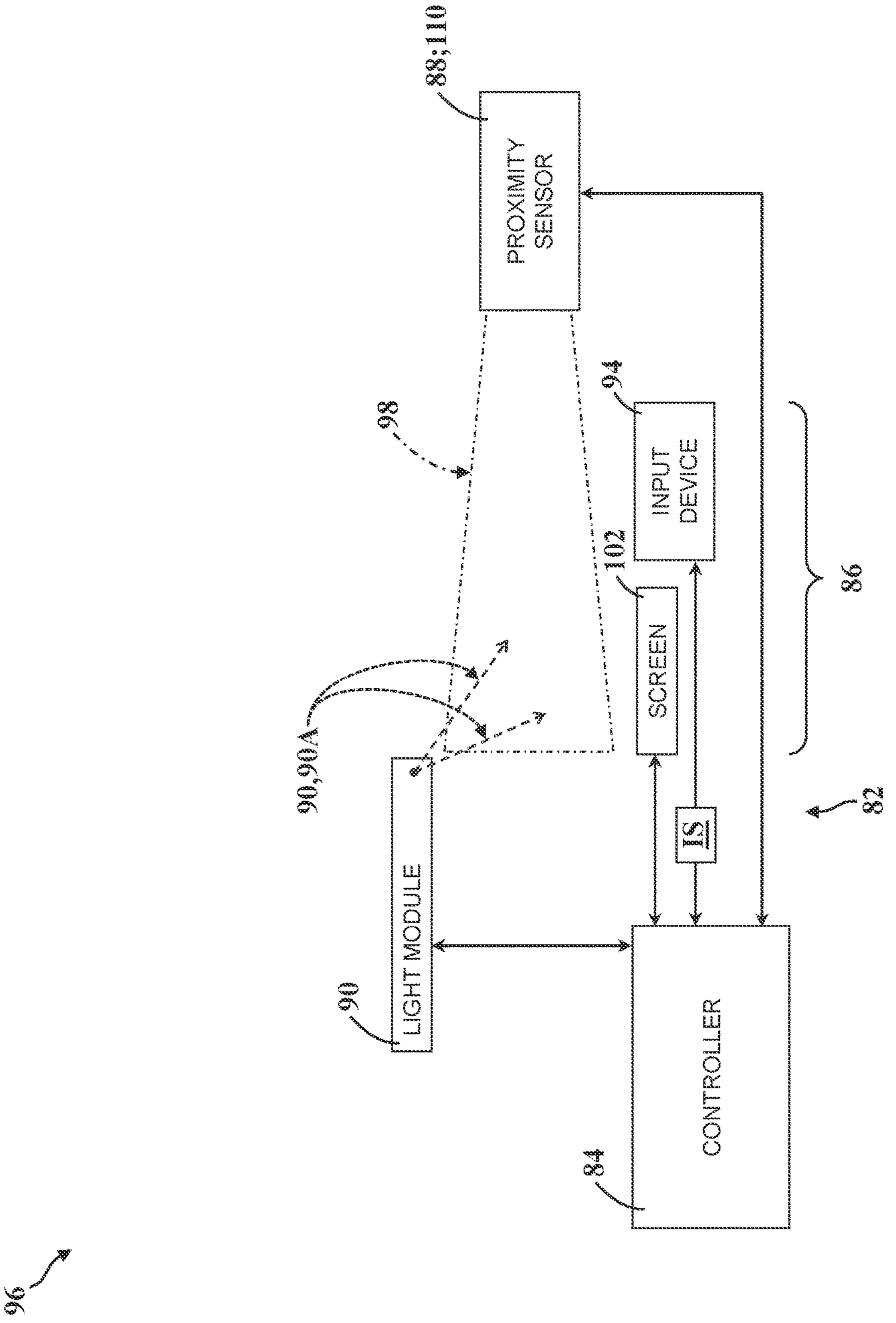
FIG. 4E is a partial schematic view of a caregiver sensing arrangement comprising a controller disposed in communication with a screen, an input device, a light module, and a proximity sensor, shown with the proximity sensor operating to sense movement adjacent to the screen and the input device, and shown with the light module emitting light towards the screen and the input device at a first illumination level.
Figure 4F:
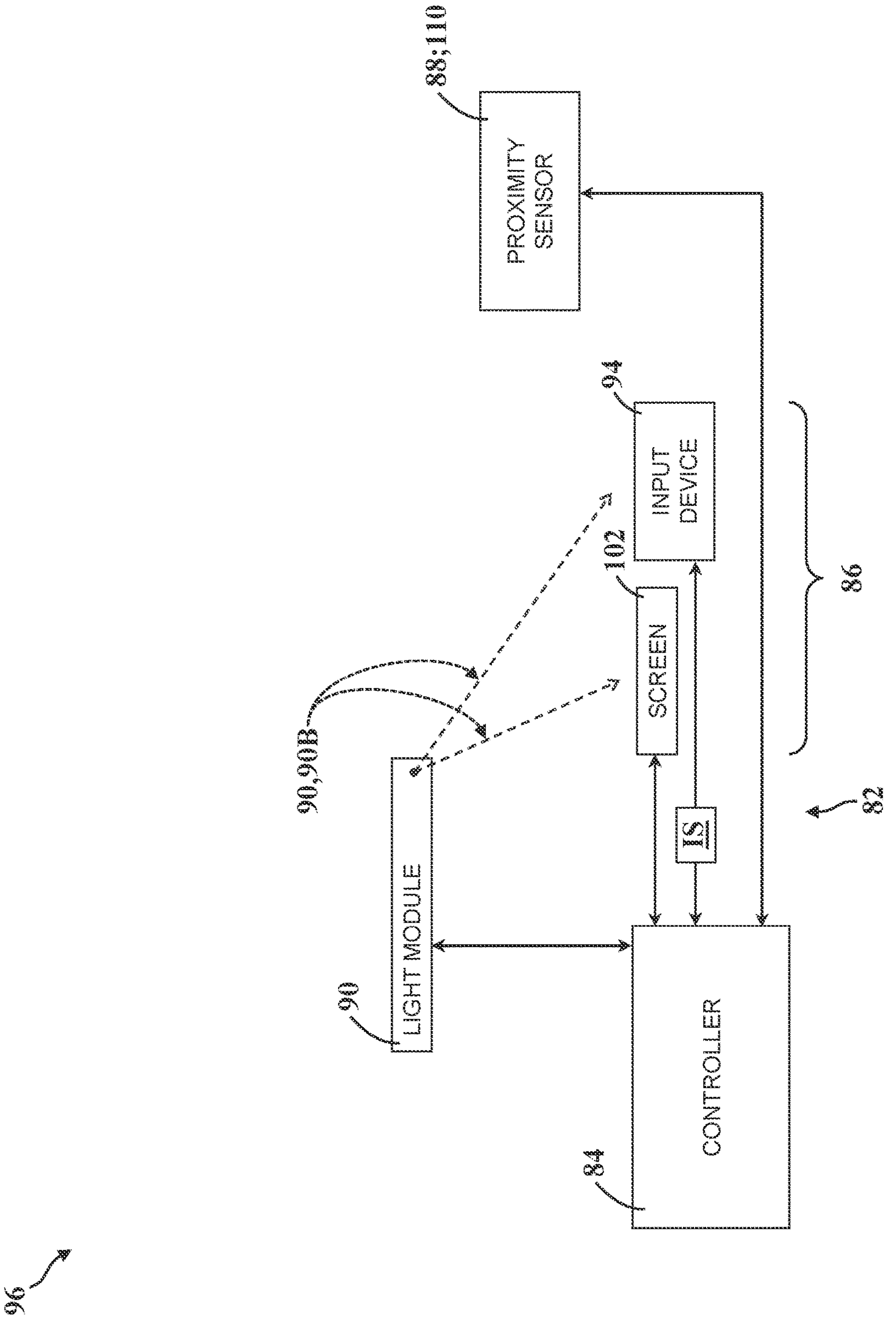
FIG. 4F is another partial schematic view of the caregiver sensing arrangement of FIG. 4E, shown with the light module emitting light towards the screen and the input device at a second illumination level.
Figure 4G:
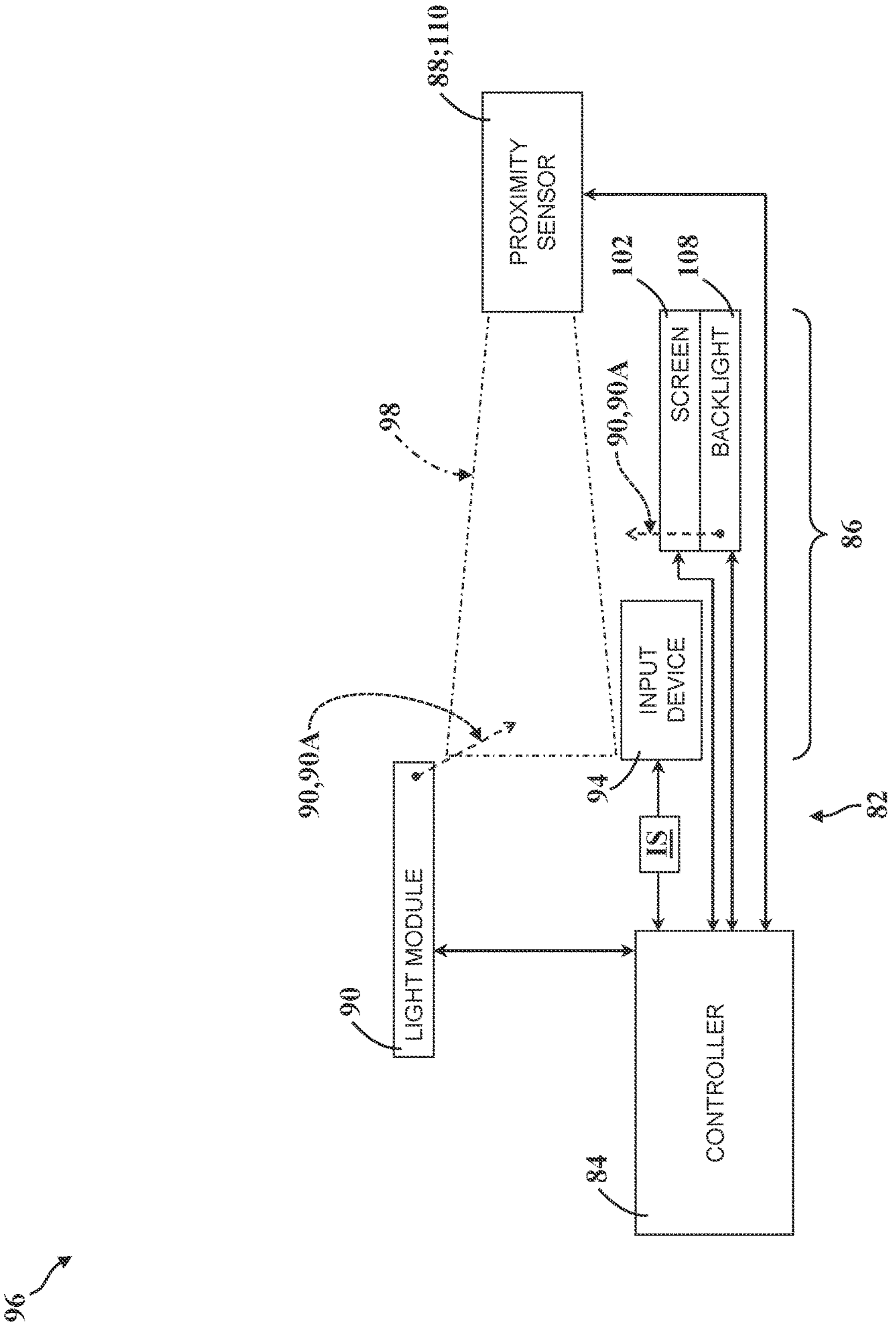
FIG. 4G is a partial schematic view of a caregiver sensing arrangement comprising a controller disposed in communication with a screen, a backlight, an input device, a light module, and proximity sensor, shown with the proximity sensor operating to sense movement adjacent to the screen and the input device, shown with the light module emitting light towards the input device at a first illumination level, and shown with the backlight emitting light through the screen at a first illumination level.
Figure 4H:
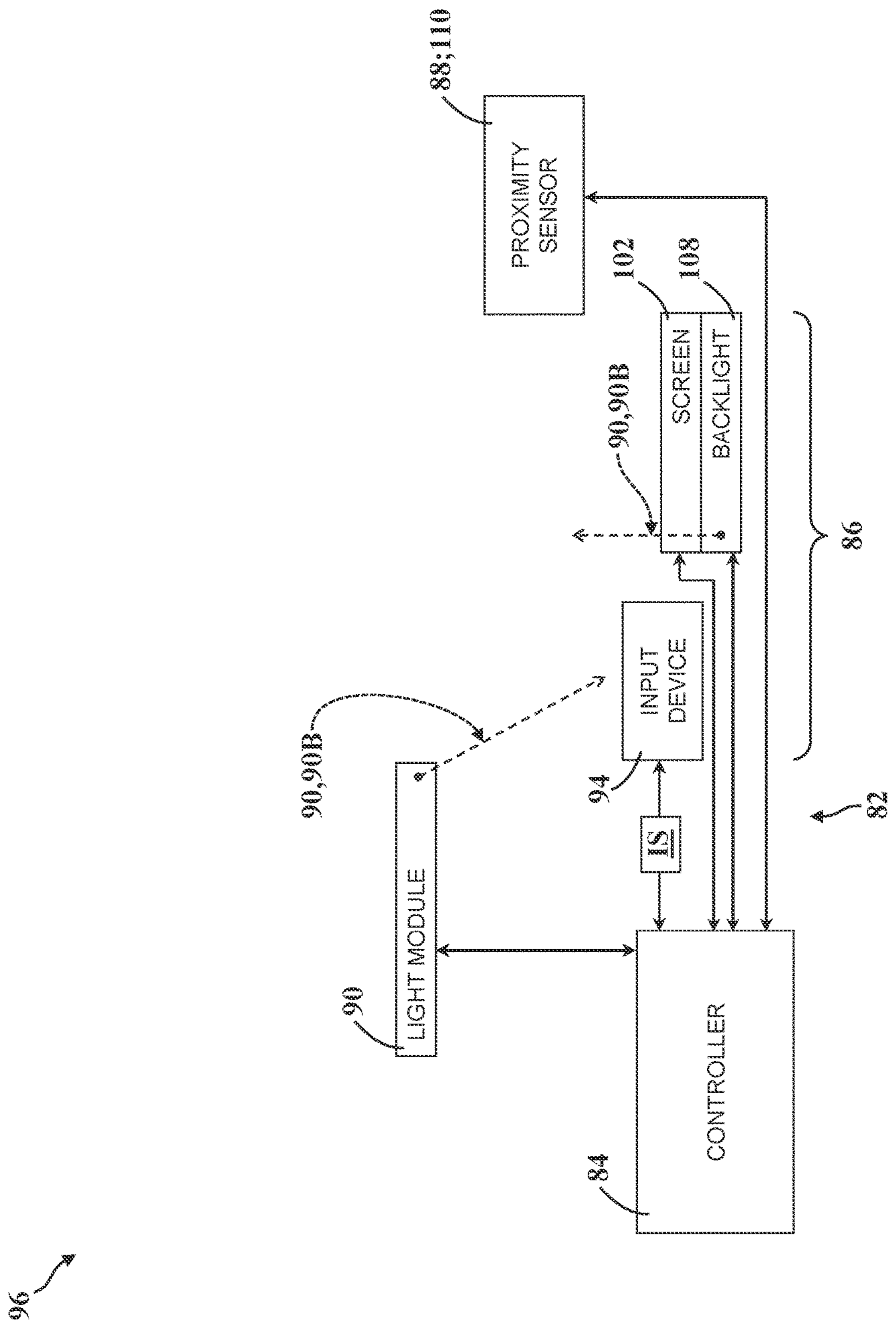
FIG. 4H is another schematic view of the caregiver sensing arrangement of FIG. 4G, shown with the light module emitting light towards the input device at a second illumination level, and shown with the backlight emitting light through the screen at a second illumination level.

In the embodiment illustrated in FIGS. 4E-4F, the light module 90 is also spaced from the screen 102 and is arranged to emit light towards the screen 102 at both the first and second illumination levels 90A, 90B. However, in the embodiment illustrated in FIGS. 4G-4H, the screen 102 further comprises a backlight 108 arranged to emit light through the screen 102. Thus, in the embodiment illustrated in FIGS. 4G-4H, the light module 90 illuminates the input device 94 but is not necessarily arranged to emit light towards the screen 102 which, as noted above, is independently illuminated via the backlight 108 disposed in communication with and controlled by the controller 84. Here, those having ordinary skill in the art will appreciate that screens 102 without backlights 108 and/or without touch sensors 104 may be suitable for certain applications. Moreover, it will be appreciated that the user interface 86 could be implemented without a discrete screen 102 for certain applications. In light of the foregoing, those having ordinary skill in the art will appreciate that the caregiver sensing arrangements 96 described and illustrated herein may be implemented in a number of different ways to suit different applications and differently-configured user interfaces 86.

As noted above, illumination of screens 102 can be achieved by using light modules 90 arranged to emit light towards the screen 102, and/or by using backlights 108 arranged to emit light through the screen 102. As such, for the purposes of clarity and consistency, subsequent discussion of screen 102 illumination which is made with reference to light modules 90 also applies to backlights 108, unless specifically indicated otherwise.

Referring now to FIGS. 5A-5B, one embodiment of the patient support apparatus 30 is shown having a caregiver-accessible screen 102 to display visual content VC. As noted above, the screen 102 generally forms part of one or more of the user interfaces 86 for operating the patient support apparatus 30, such as where activation or manipulation of the input device 94 (for example, a touch sensor 104 operatively attached to the screen 102) generates the input signal IS used by the controller 84 to facilitate navigation of the visual content VC. However, it will be appreciated that the screen 102 could be located remotely from the input device 94. In some embodiments, the user interface 86 is configured to generate a haptic signal, such as vibration from a motor adjacent to the screen 102, in response to activation of the input device 94. Other arrangements and configurations are contemplated.

In this embodiment, the screen 102 is operatively attached to the patient support apparatus 30 for concurrent movement. More specifically, the screen 102 is coupled to the footboard 64 for concurrent movement with the patient support deck 38 between the vertical configurations 38A, 38B via the lift mechanism 72, as noted above. Here, the patient support apparatus 30 further comprises a lift sensor, generally indicated at 112, to determine movement of the patient support deck 38 between the vertical configurations 38A, 38B via the lift mechanism 72. As will be appreciated from the subsequent description below, the lift sensor 112 could be realized in a number of different ways. By way of non-limiting example, the lift sensor 112 could be realized as a discrete component such as a linear potentiometer, a range sensor, a hall-effect sensor, a limit switch, an accelerometer, a gyroscope, and the like generally configured or arranged to measure position, height, or movement. Further, the lift sensor 112 could be an encoder, a current sensor, and the like coupled to or in communication with one of the lift actuators 78. Moreover, the functionality afforded by the lift sensor 112 could be entirely or partially realized with software or code for certain applications.

The lift sensor 112 is disposed in communication with the controller 84 which, in turn, is configured to control the light module 90 to illuminate the screen 102 at the first illumination level 90A (see FIG. 5A) when the lift sensor 112 determines the patient support deck 38 is in the second vertical configuration 38B, and to control the light module 90 to illuminate the screen 102 at the second illumination level 90B (see FIG. 5B) when the lift sensor 112 determines the patient support deck 38 is in the first vertical configuration 38B.

In the representative embodiment illustrated in FIGS. 5A-5B, the patient support deck 38 is arranged closer to the base 34 in the first vertical configuration 38A (see FIG. 5B) than in the second vertical configuration 38B (see FIG. 5A). Moreover, in this embodiment, more light is emitted by the light module 90 at the second illumination level 90B (see FIG. 5B) than at the first illumination level 90A (see FIG. 5A). Put differently, the controller 84 increases the "brightness" of the screen 102 as the patient support deck 38 moves closer to the base 34. It will be appreciated that this configuration can help compensate for decreases in visual performance that can sometimes result from changes in screen viewing orientation VO caused by vertical movement of the screen 102 with respect to the caregiver's line of sight (compare FIGS. 5A and 5B). Thus, in certain embodiments, adjustment of the screen 102 brightness in response to movement between the vertical configurations 38A, 38B affords opportunities for increased visual performance and reduced component cost.

Figure 6A:
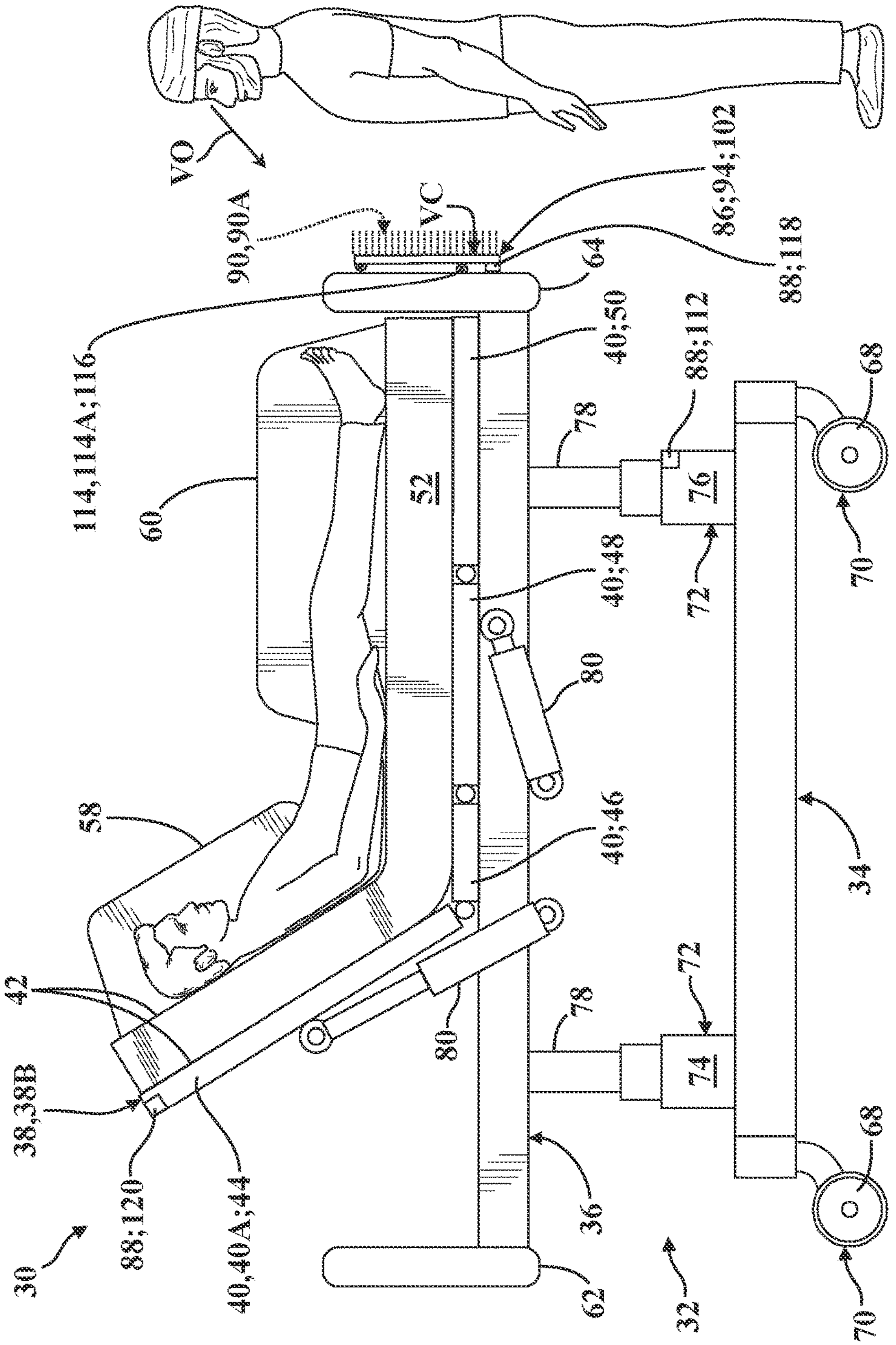
FIG. 6A is a right-side view of a patient support apparatus shown having a base, a patient support deck in a raised vertical configuration relative to the base, and an illuminated screen of a caregiver-accessible user interface shown mounted to a gimbal arranged in a first gimbal orientation.
Figure 6B:
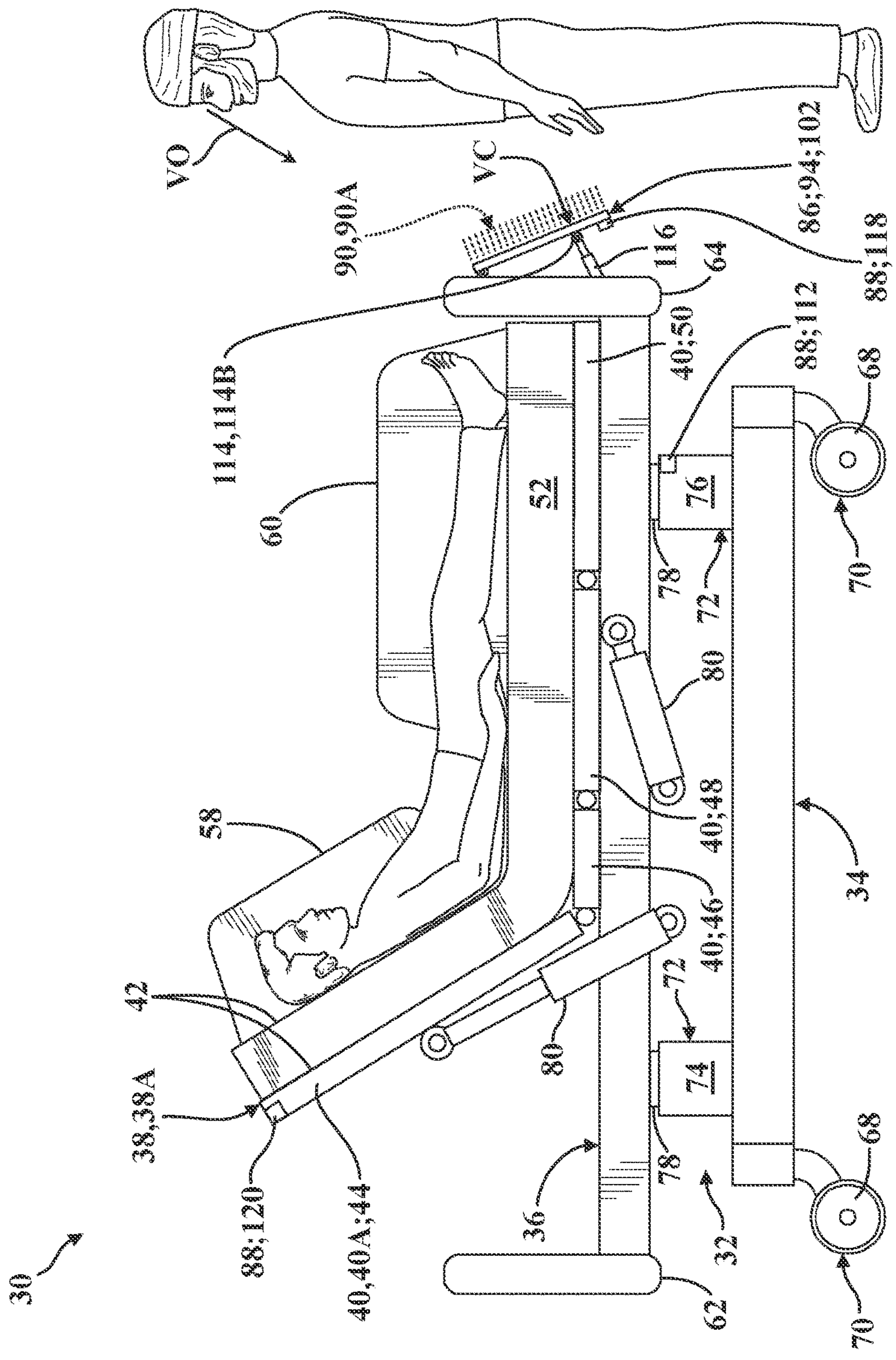
FIG. 6B is another right-side view of the patient support apparatus of FIG. 6A, shown with the patient support deck in a lowered vertical configuration relative to the base, and shown with the screen and the gimbal arranged in a second gimbal orientation.

Referring now to FIGS. 6A-6B, another embodiment of the patient support apparatus 30 is shown. Here too, like the embodiment described above in connection with FIGS. 5A-5B, the patient support apparatus 30 is equipped with a caregiver-accessible screen 102 to display visual content VC. In this embodiment, the patient support apparatus 30 further comprises a gimbal, generally indicated at 114, and a gimbal actuator 116. The screen 102 is coupled to the gimbal 114 which, in turn, is arranged to move with the patient support deck 38 between the vertical configurations 38A, 38B via the lift mechanism 72, as noted above. The gimbal actuator 116 is coupled to the gimbal 114 to move the gimbal 114 and the screen 102 between a first gimbal position 114A (see FIG. 6A) and a second gimbal position 114B (see FIG. 6B). As will be appreciated from the subsequent description below, the gimbal 114 and/or the gimbal actuator 116 can be configured in a number of different ways. By way of non-limiting example, the gimbal actuator 116 could be realized as a linear actuator, a motor, a linkage, and the like.

The controller 84 is disposed in communication with the gimbal actuator 116 and is configured to drive the gimbal actuator 116 to move the gimbal 114 and the screen 102 to the first gimbal orientation 114A when the lift sensor 112 determines that the patient support deck 38 is in the second vertical configuration 38B (see FIG. 6A), and to move the gimbal 114 and the screen 102 to the second gimbal orientation 114B when the lift sensor 112 determines that the patient support deck 38 is in the first vertical configuration 38A (see FIG. 6B).

In this embodiment, the controller 84 "tilts" or otherwise repositions the screen 102 via the gimbal 114 and the gimbal actuator 116 as the patient support deck 38 moves closer to the base 34. It will be appreciated that this configuration can help compensate for decreases in visual performance that can sometimes result from changes in screen viewing angle caused by vertical movement of the screen 102 with respect to the caregiver's line of sight (compare FIGS. 6A and 6B). To this end, in one embodiment, a screen sensor 118 is provided in communication with the controller 84 to determine a viewing orientation VO of the screen 102, such as may be predetermined or otherwise "set" for a particular caregiver based on one or more vertical configurations of the patient support deck 38 (e.g., based on how tall the caregiver is, where and how the screen 102 is positioned, and the like).

Here, the controller 84 is further configured to drive the gimbal actuator 116 so as to maintain or otherwise optimize the viewing orientation VO of the screen 102 as the patient support deck 38 moves between the vertical configurations 38A, 38B (compare FIGS. 6A and 6B). It will be appreciated that viewing orientation VO is affected by the angle of the screen 102 itself, as well as the relative location and/or position of the caregiver' s eyes with respect to the screen 102. Thus, the controller 84 may be configured to adjust the viewing orientation VO (and/or, in some embodiments, the visual content VC) based on the position and/or orientation of the caregiver relative to the patient support apparatus, based on the height of the caregiver, and the like.

While the forgoing examples described above in connection with FIGS. 6A-6B are generally directed toward adjusting the viewing orientation VO of the screen 102 via the gimbal actuator 116 to promote optimized presentation of visual content VC displayed on the screen 102 to the caregiver, it will be appreciated that other configurations are contemplated by the present disclosure. By way of non-limiting example, it is conceivable that the patient support apparatus 30 could be configured to scale or otherwise adjust certain aspects of one or more portions of visual content VC presented on the screen 102 in various ways, with or without using the gimbal actuator 116, based on one or more of: the relative position of the patient support deck 38 between the vertical configurations 38A, 38B; the position, orientation, and/or angle of the screen 102 on/about the patient support apparatus 30; the presence, proximity, and/or position of the caregiver relative to the patient support apparatus 30; and/or physical characteristics of the caregiver (e.g., the height of the caregiver).

Thus, in some embodiments, visual content VC may be displayed differently (e.g., at least partially scaled up/down) for a relatively tall caregiver as opposed to a relatively short caregiver (e.g., determined via one or more caregiver sensors), even for the same position of the patient support deck 38 between the vertical configurations 38A, 38B. To this end, caregiver sensors may comprise, without limitation, various arrangements of proximity sensors, optical sensors, ultrasonic or audio-based sensors, distance sensors, or any other suitable sensor sufficient to facilitate adjusting the screen 102 and/or the visual content VC displayed on the screen 102 so as to present visual content VC in different ways which correspond to the respective height of correspondingly different caregivers. Other configurations are contemplated.

It will be appreciated that the screen sensor 118 can be realized in a number of different ways, from any suitable number of components. By way of non-limiting example, the screen sensor 118 could be realized as a discrete component such as a linear potentiometer, a range sensor, a hall-effect sensor, a limit switch, an accelerometer, a gyroscope, and the like generally configured or arranged to measure position, height, or movement. Further, the screen sensor 118 could be an encoder, a current sensor, and the like coupled to or in communication with the gimbal actuator 116. Moreover, the functionality afforded by the screen sensor 118 could be entirely or partially realized with software or code for certain applications. In one embodiment, the screen sensor 118 is operatively attached to one of the gimbal 114 and the screen 102. Thus, in certain embodiments, adjustment of the screen 102 orientation via the gimbal 114 in response to movement between the vertical configurations 38A, 38B affords opportunities for increased visual performance and reduced component cost by effecting dynamic control of screen 102 polarization, which results in improved visibility of the screen 102 at different angles and orientations.

Referring now to FIGS. 7A-7B, one embodiment of the patient support apparatus 30 is shown having a patient-viewable screen 102 to display visual content VC. As noted above, the screen 102 generally forms part of one or more of the user interfaces 86 for operating the patient support apparatus 30. In this embodiment, the screen 102 is operatively attached to the patient support apparatus 30 for concurrent movement. More specifically, the screen 102 is coupled to the footboard 64 for concurrent movement with the patient support deck 38 between the vertical configurations 38A, 38B via the lift mechanism 72, as noted above.

In this embodiment, the patient support apparatus 30 further comprises a deck sensor, generally indicated at 120, to determine movement of the deck section 40 of the patient support deck 38 between the section positions 40A, 40B via the deck actuator 80, as noted above. As will be appreciated from the subsequent description below, the deck sensor 120 could be realized in a number of different ways. By way of non-limiting example, the deck sensor 120 could be realized as a discrete component such as a rotary potentiometer, a range sensor, a hall-effect sensor, a limit switch, an accelerometer, a gyroscope, and the like generally configured or arranged to measure position, height, or movement. Further, the deck sensor 120 could be an encoder, a current sensor, and the like coupled to or in communication with the deck actuator 80. Moreover, the functionality afforded by the deck sensor 120 could be entirely or partially realized with software or code for certain applications.

The deck sensor 120 is disposed in communication with the controller 84 which, in turn, is configured to control the light module 90 to illuminate the screen 102 at the first illumination level 90A (see FIG. 7A) when the deck sensor 120 determines the deck section 40 is in the first section position 40A, and to control the light module 90 to illuminate the screen 102 at the second illumination level 90B (see FIG. 7B) when the deck sensor 120 determines the deck section 40 is in the second section position 40B.

In the representative embodiment illustrated in FIGS. 7A-7B, the back section 44 is arranged "upright" to position the patient in a raised fowler position when the deck section 40 is in the first section position 40A (see FIG. 7A), and is arranged "flat" to position the patient in a supine position when the deck section 40 is in the second section position 40B (see FIG. 7B). Moreover, in this embodiment, more light is emitted by the light module 90 at the second illumination level 90B (see FIG. 7B) than at the first illumination level 90A (see FIG. 7A). Put differently, the controller 84 increases the "brightness" of the screen 102 as the back section 44 moves closer to the intermediate frame 36. It will be appreciated that this configuration can help compensate for decreases in visual performance that can sometimes result from changes in screen viewing orientation VO caused by movement of the patient's body with respect to the screen 102, which necessarily changes the patient's line of sight (compare FIGS. 7A and 7B). Thus, in certain embodiments, adjustment of the screen 102 brightness in response to movement between the section positions 40A, 40B affords opportunities for increased visual performance and reduced component cost.

Figure 8A:
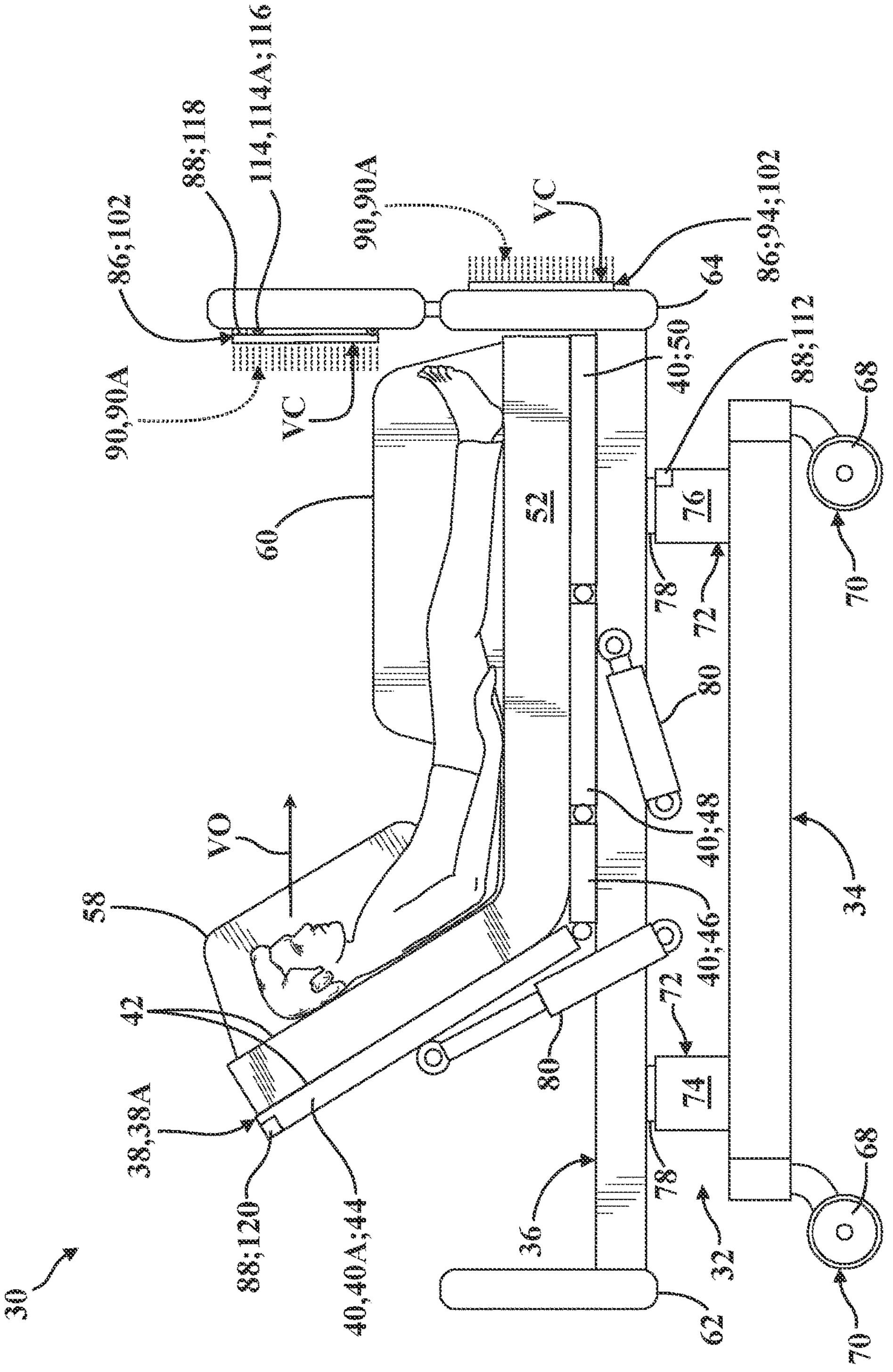
FIG. 8A is a right-side view of a patient support apparatus shown having a base, a patient support deck with a deck section arranged in a first section position, and an illuminated screen of a patient-accessible user interface shown mounted to a gimbal arranged in a first gimbal orientation.
Figure 8B:
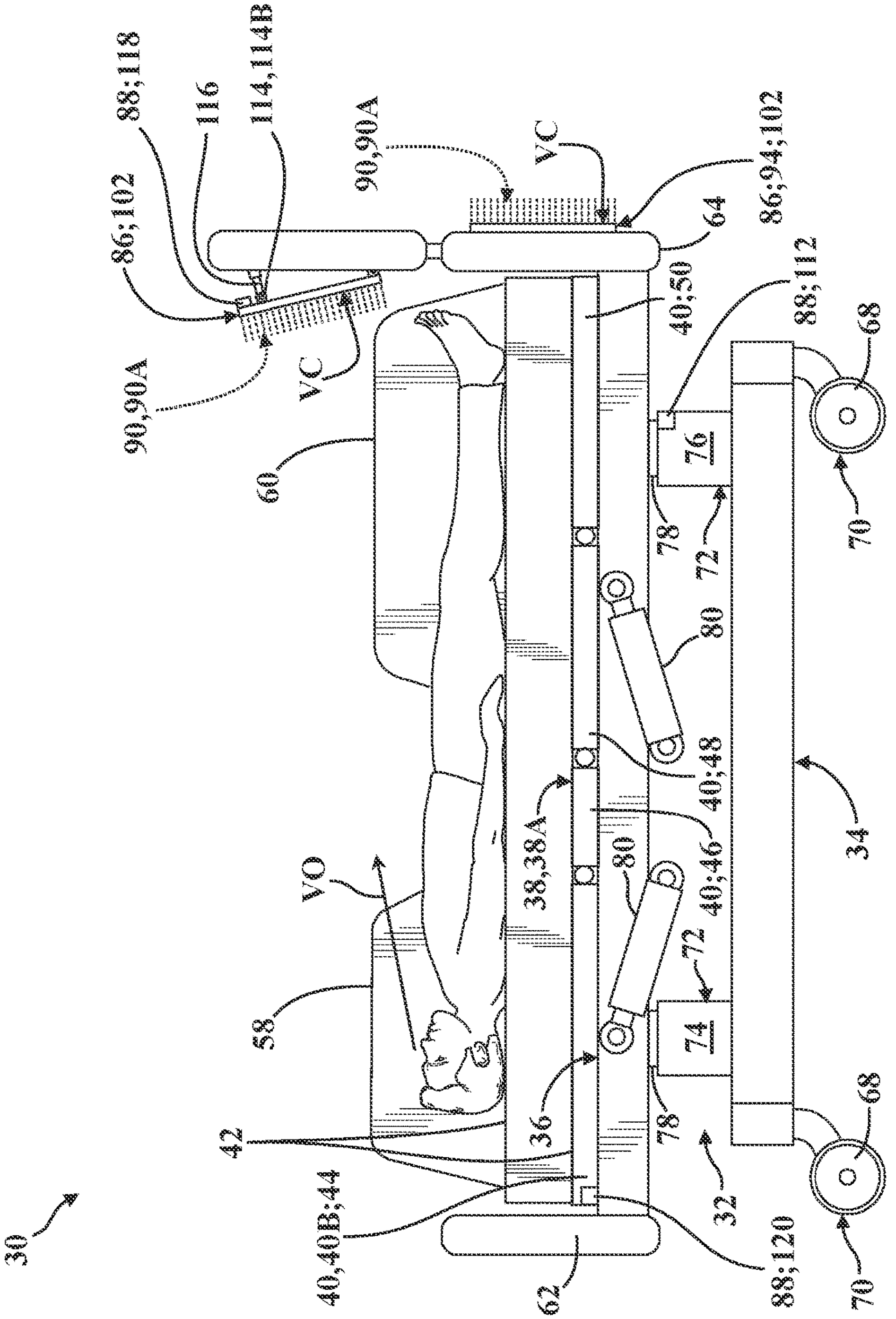
FIG. 8B is another right-side view of the patient support apparatus of FIG. 8A, shown with the deck section arranged in a second section position, and shown with the screen and the gimbal arranged in a second gimbal orientation.

Referring now to FIGS. 8A-8B, another embodiment of the patient support apparatus 30 is shown. Here too, like the embodiment described above in connection with FIGS. 7A-7B, the patient support apparatus 30 is equipped with a patient-accessible screen 102 to display visual content VC.

Moreover, like the embodiment described in connection with FIGS. 6A-6B, the screen 102 in this embodiment is coupled to a gimbal 114 which, in turn, is arranged to move with the patient support deck 38 between the vertical configurations 38A, 38B via the lift mechanism 72. Here too, the gimbal actuator 116 is coupled to the gimbal 114 to move the gimbal 114 and the screen 102 between the first gimbal position 114A (see FIG. 8A) and the second gimbal position 114B (see FIG. 8B). In this embodiment, the controller 84 is configured to drive the gimbal actuator 116 to move the gimbal 114 and the screen 102 to the first gimbal orientation 114A when the deck sensor 120 determines that the deck section 40 is in the first section position 40A (see FIG. 8A), and to move the gimbal 114 and the screen 102 to the second gimbal orientation 114B when the deck sensor 120 determines that the deck section 40 is in the second section position 40B (see FIG. 8B).

In this embodiment, the controller 84 "tilts" or otherwise repositions the screen 102 via the gimbal 114 and the gimbal actuator 116 as the back section 44 moves closer to the intermediate frame 36. It will be appreciated that this configuration can help compensate for decreases in visual performance that can sometimes result from changes in screen viewing orientation VO caused by movement of the patient's body with respect to the screen 102, which necessarily changes the patient's line of sight (compare FIGS. 8A and 8B). Here too in this embodiment, the screen sensor 118 may be provided to determine a viewing orientation VO of the screen 102, and the controller 84 may be configured to drive the gimbal actuator 116 so as to maintain or otherwise optimize the viewing orientation VO of the screen 102 as the back section 44 moves between the section positions 40A, 40B (compare FIGS. 8A and 8B).

Figure 9A:
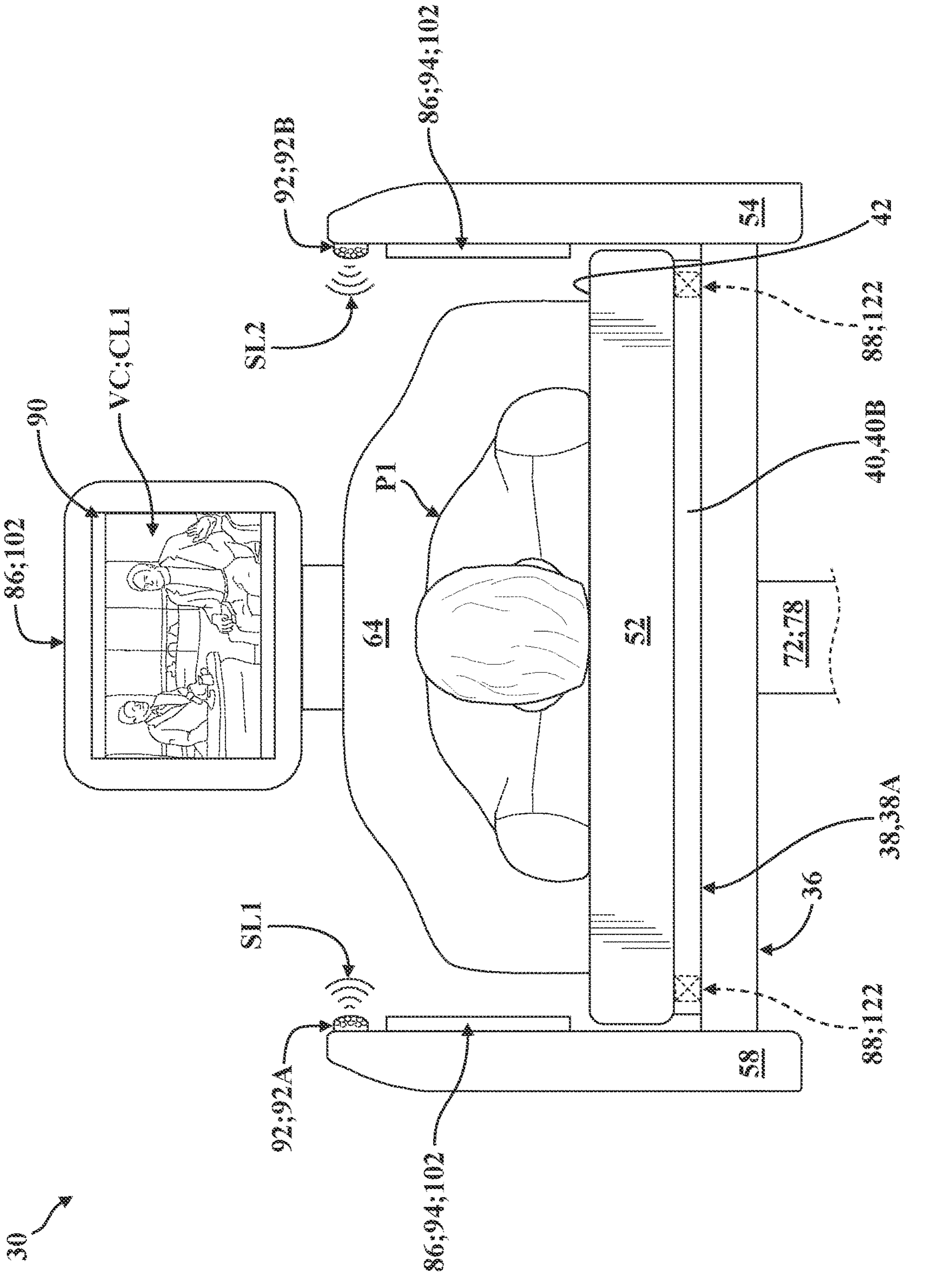
FIG. 9A is a head-side view of a patient support apparatus comprising a patient support deck supporting a patient in a first body position, a pair of side rail screens, a footboard screen displaying visual content in a first content layout, and speakers each radiating sound at respective speaker sound levels.
Figure 9B:
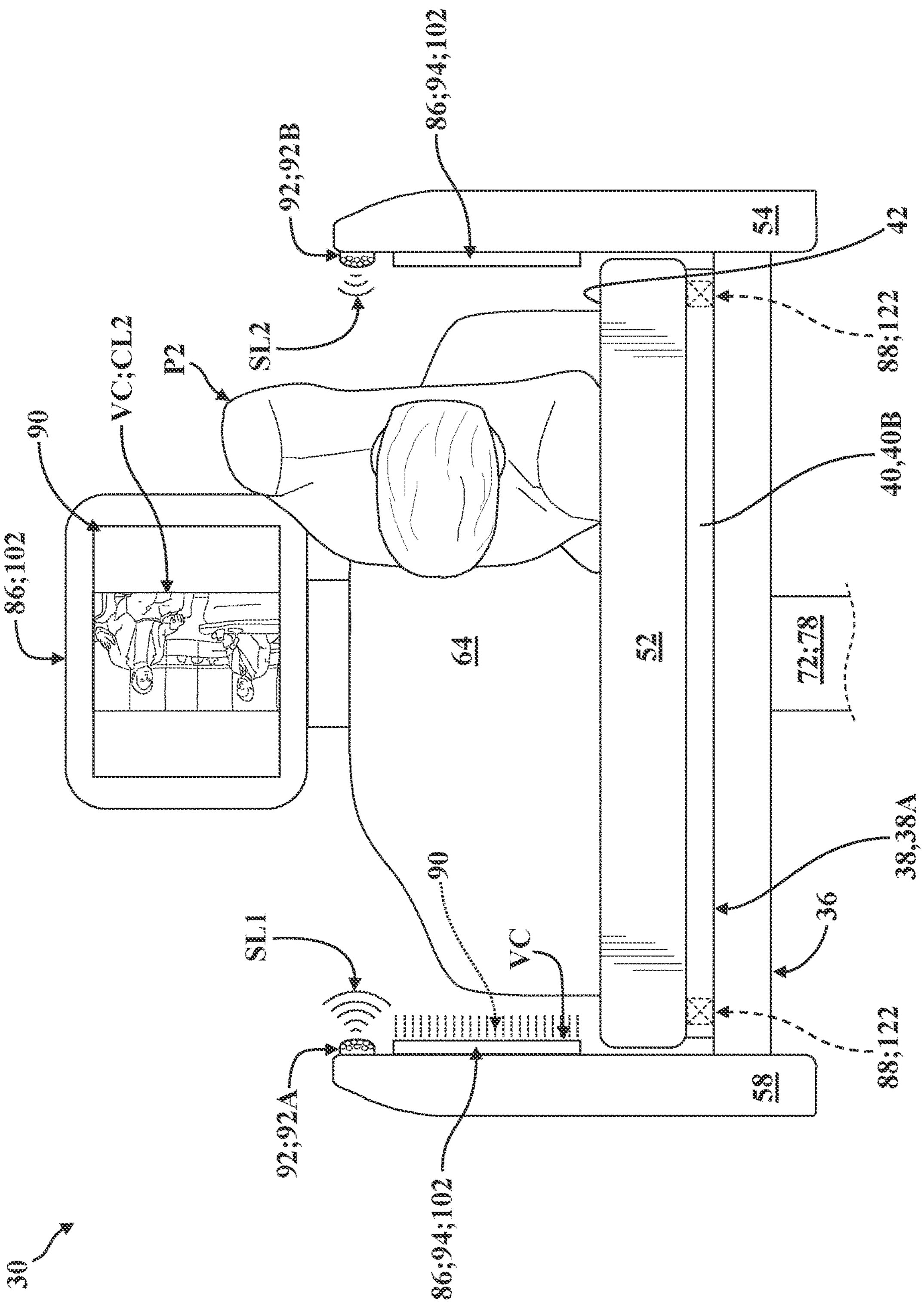
FIG. 9B is another head-side view of the patient support apparatus of FIG. 9A, shown with the patient in a second body position, shown with one of the side rail screens emitting light to display visual content, shown with the footboard screen displaying visual content in a second content layout, and shown with the speakers radiating sound at different speaker sound levels.

Referring now to FIGS. 9A-10B, in one embodiment, the patient support apparatus further comprises a patient sensor, generally indicated at 122, to detect movement of the patient on the patient support deck 38 (headboard 62 omitted from FIGS. 9A-9B for clarity). In addition to movement, the patient sensor 122 may be configured to determine the patient's relative position and/or orientation on the patient support surface 42, as well as the patient's distribution of weight. To this end, and in the representative embodiment illustrated herein, the patient sensor 122 is realized as a plurality of load cells arranged at the four corners of the patient support deck 38. However, as will be appreciated from the subsequent description below, the patient sensor could be realized in a number of different ways sufficient to detect movement of the patient on the patient support deck 38. By way of non-limiting example, the patient sensor 122 could be realized with fewer load cells, or as a different type of sensor such as an optical sensor or camera.

As noted above, the patient support apparatus 30 may be equipped with one or more patient-viewable screens 102 configured to display visual content VC to the patient occupying the patient support deck 38. It will be appreciated that a number of different types of visual content VC can be displayed on the screen 102 for the benefit of the patient. By way of non-limiting example, such visual content VC may include videos, movies, television broadcasts, or any other suitable type of visually-communicated information. Moreover, the visual content VC displayed on patient-viewable screens 102 could also include a navigable graphical user interface, controlled via one or more input devices 94 as a part of a user interface 86 specifically designed for patient use. As noted above, the patient support apparatus 30 may employ multiple user interfaces 86 adapted for patient and/or caregiver use. While caregiver-accessible user interfaces 86 generally allow for broad operation and control of the various features and functions of the patient support apparatus 30, patient-accessible user interfaces 86 are generally limited to controlling entertainment-related functions (for example: changing TV stations, adjusting volume output, activating nurse call, telephone operation, navigating websites, and the like) and certain limited positioning functions which may be enabled/disabled by the caregiver (for example: back and/or leg tilt, bed height adjustment, and the like).

With continued reference to the embodiment illustrated in FIGS. 9A-10B, the patient sensor 122 is disposed in communication with the controller 84 and is configured to detect movement of the patient between a first body position P1 and a second body position P2, and one or more screens 102 are configured to display visual content VC in a first content layout CL1 and in a second content layout CL2. While the body positions P1, P2 can be defined or otherwise determined in a number of different ways, in the representative embodiment illustrated herein, the first body position P1 represents a patient laying on their back (see FIGS. 9A and 10A), and the second body position P2 represent a patient laying on their side (see FIGS. 9B and 10B). Moreover, as will be appreciated from the subsequent description below, the content layouts CL1, CL2 can likewise be defined in a number of different ways.

Figure 10A:
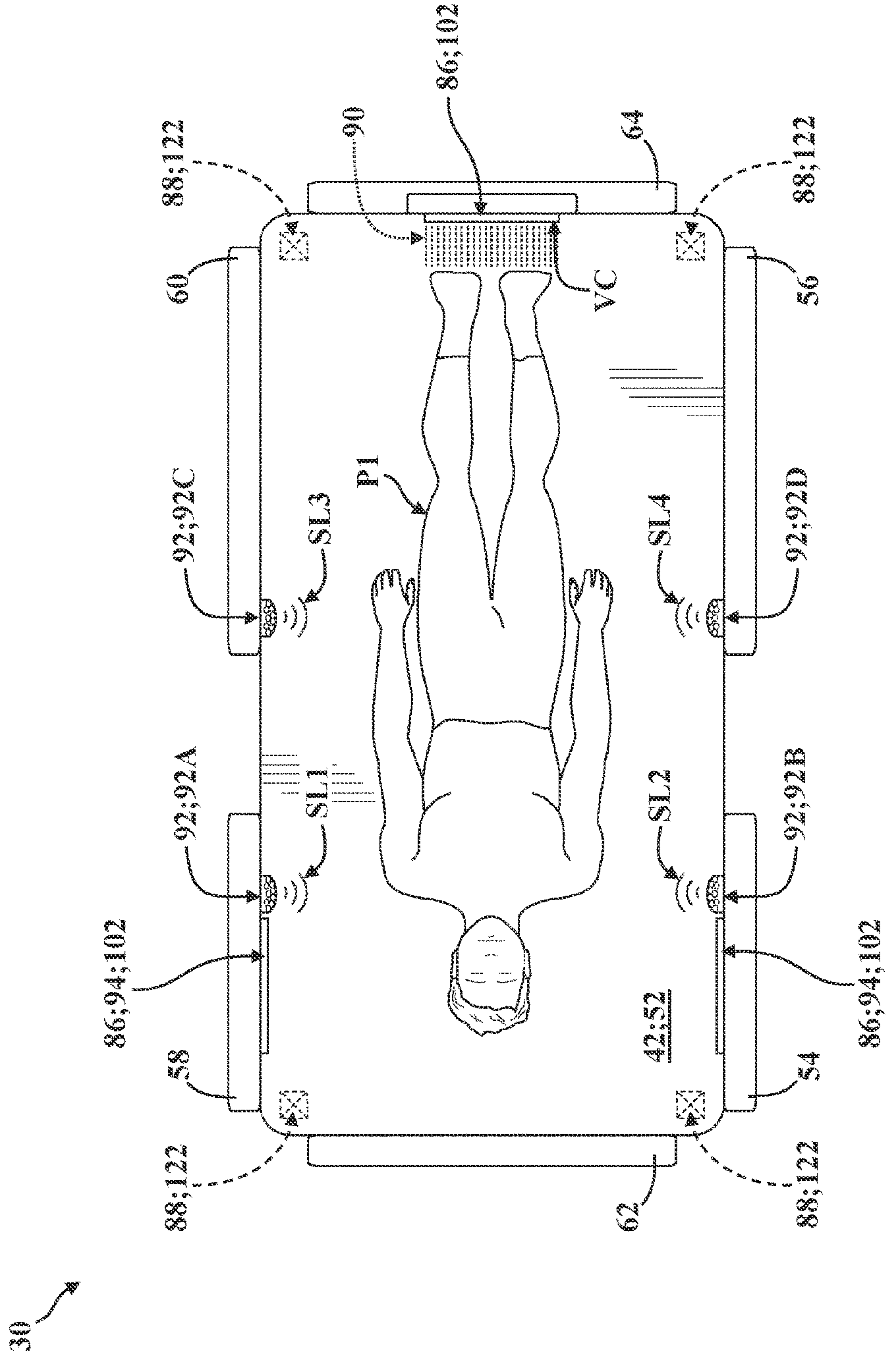
FIG. 10A is a top-side view of a patient support apparatus comprising a patient support deck supporting a patient in a first body position, a pair of side rail screens, a footboard screen emitting light to display visual content, and speakers each radiating sound at respective speaker sound levels.
Figure 10B:
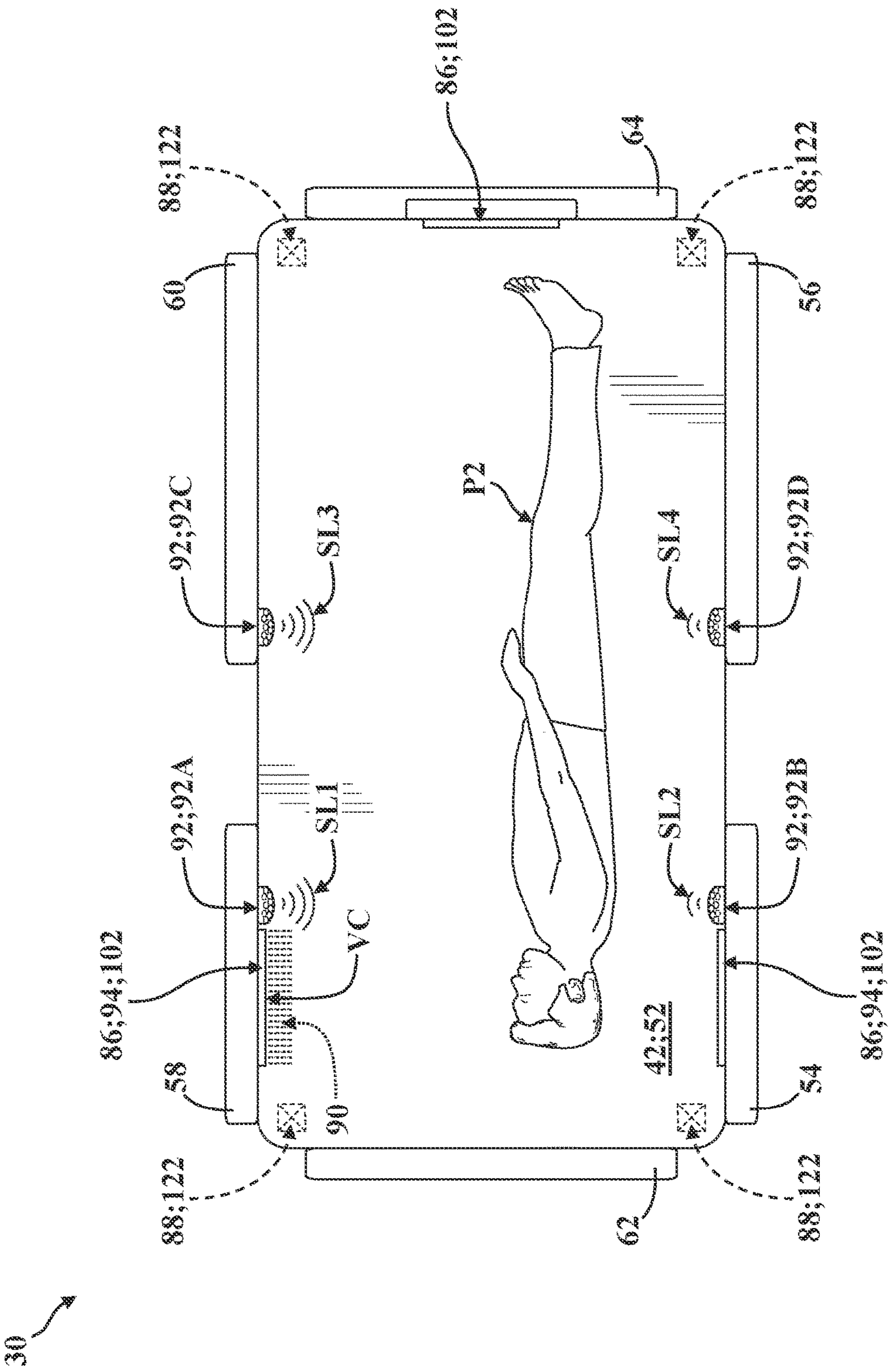
FIG. 10B is another top-side view of the patient support apparatus of FIG. 10A, shown with the patient in a second body position, shown with one of the side rail screens emitting light to display visual content, shown with the footboard screen emitting no light, and shown with the speakers radiating sound at different speaker sound levels.

The controller 84 is configured to display the visual content VC in the first content layout CL1 when the patient sensor 122 determines that the patient is in the first body position P1 (see FIGS. 9A and 10A), and to display the visual content VC in the second content layout CL2 when the patient sensor 122 determines that the patient is in the second body position P2 (see FIGS. 9B and 10B). As is best illustrated in FIGS. 9A-9B, in one embodiment, the screen 102 mounted to the footboard 64 displays visual content VC in the first content layout CL1 (see FIG. 9A) which is rotated at a predetermined angle with respect to visual content VC in the second content layout CL2 (see FIG. 9B). Put differently, in one embodiment the first content layout CL1 is further defined as a landscape orientation and the second content layout CL2 is further defined as a portrait orientation (compare visual content VC in FIGS. 9A and 9B). Thus, the visual content VC displayed by the screen 102 mounted on the footboard 64 can rotate as the patient changes body positions P1, P2. It will be appreciated that this configuration prevents the patient from straining their neck to view visual content VC from different body positions P1, P2. In some embodiments, the visual content VC can be skewed or de-skewed on the screen 102 to simulate a consistent "normal" image based on the viewing point, orientation, and/or angle of the patient and/or caregiver.

As noted above, the patient support apparatus 30 may comprise multiple patient-viewable screens 102. In the representative embodiment illustrated in FIGS. 9A-10B, a total of three patient-viewable screens 102 are provided: one mounted to the footboard 64, one mounted to the first side rail 54, and one mounted to the third side rail 58. In one embodiment, when the controller 84 determines via the patient sensor 122 that the patient has moved from the first body position P1 (see FIGS. 9A and 10A) to the second body position P2 (see FIGS. 9B and 10B), the controller 84 displays visual content VC on the screen 102 mounted to the third side rail 58 facing the patient's eyes. It will be appreciated that the controller 84 can simultaneously display visual content VC on both the screen 102 mounted to the footboard 64 and the screen 102 mounted to the third side rail 58 when the patient is in the second body position P2

(see FIG. 9B), or the controller 84 can be configured to display visual content VC on only one screen, such as by turning off (or dimming) the screen 102 mounted to the footboard 64 and displaying visual content VC on the screen 102 mounted to the third side rail 58 (see FIG. 10B).

With continued reference to FIGS. 9A-10B, in one embodiment, the patient support apparatus 30 comprises one or more speakers 92 arranged adjacent to the patient support deck 38 and disposed in communication with the controller 84 to radiate sound towards the patient. Here, the speakers 92 and controller 84 cooperate to provide the patient with a number of different types of audible content (for example, movie audio, music, telephone, intercom, audible alerts, and the like).

Referring specifically now to FIGS. 9A and 9B, in one embodiment, a first speaker 92A is operatively attached to the third side rail 58 and radiates sound at a first speaker sound level SL1, and the controller 84 is configured to automatically change the first speaker sound level SL1 when the patient sensor 122 determines that the patient has moved from the first body position P1 to the second body position P2 (compare FIGS. 9A to FIG. 9B). Further, in this embodiment, a second speaker 92B is operatively attached to the first side rail 54 and radiates sound at a second speaker sound level SL2, and the controller 84 is similarly configured to automatically change the second speaker sound level SL2 when the patient sensor 122 determines that the patient has moved from the first body position P1 to the second body position P2 (compare FIG. 9A to FIG. 9B). As will be appreciated from the subsequent description below, changes in speaker sound level can represent a number of different audio characteristics, such as changes in volume, stereo signal side, and the like. By way of non-limiting example, the controller 84 may change the first speaker sound level SL1 of the first speaker 92A from one volume when the patient is in the first body position P1 (see FIG. 9A) to a relatively higher volume when the patient moves to the second body position P2 (see FIG. 9B). Similarly, the controller 84 may also change the second speaker sound level SL2 of the second speaker 92B from one volume when the patient is in the first body position P1 (see FIG. 9A) to a relatively lower volume when the patient moves to the second body position P2 (see FIG. 9B). Put differently, when the patient is laying on their back (see FIG. 9A), the first and second speaker sound levels SL1, SL2 could be of substantially equivalent volume with the first speaker 92A carrying a left-side stereo signal and the second speaker 92B carrying a right-side stereo signal; and when the patient is laying on their side (see FIG. 9B), the first speaker sound level SL1 volume could be higher than second speaker sound level SL2 due to the patient's body being closer to the second speaker 92B than to the first speaker 92A.

Referring now to the embodiment depicted in FIGS. 10A-10B, the patient support apparatus 30 further comprises a third speaker 92C operatively attached to the fourth side rail 60 that radiates sound at a third speaker sound level SL3, and a fourth speaker 92D operatively attached to the second side rail 56 that radiates sound at a fourth speaker sound level SL4. Here too, the third and fourth speakers 92C, 92D are arranged in communication with the controller 84, which is similarly configured to automatically change the third and fourth speaker sound levels SL3, SL4 when the patient sensor 122 determines that the patient has moved from the first body position P1 to the second body position P2 (compare FIG. 10A to FIG. 10B). By way of illustration, when the patient is laying on their back in the first body position P1 (see FIG. 10A), the first, second, third, and fourth speaker sound levels SL1, SL2, SL3, SL4 could be of substantially equivalent volume with the first and third speakers 92A, 92C carrying a left-side stereo signal and with the second and fourth speakers 92B, 92D carrying a right-side stereo signal; and when the patient is laying on their side in the second body position P2 (see FIG. 10B), the first and third speaker sound level SL1, SL3 volume could be higher than second and fourth speaker sound level SL2, SL4 due to the patient's body being closer to the second and fourth speakers 92B, 92D than to the first and third speakers 92A, 92C. Here too, when the patient is laying on their side in the second body position P2 (see FIG. 10B), the controller 84 could change the first, second, third, and fourth speaker sound levels SL1, SL2, SL3, SL4 so that the first and second speakers 92A, 92B carry a left-side stereo signal and the third and fourth speakers 92C, 92D carry a right-side stereo signal, in order to simulate a mono audio signal from a stereo audio signal given that the patient's left ear is muffled by the mattress 52 when in the second body position P2 (see FIG. 10B). Those having ordinary skill in the art will appreciate that the controller 84 can be configured to control any suitable number of speakers 92, disposed in any suitable location, and could control the sound level, stereo channel, and the like of each speaker 92 independently.

Figure 11A:
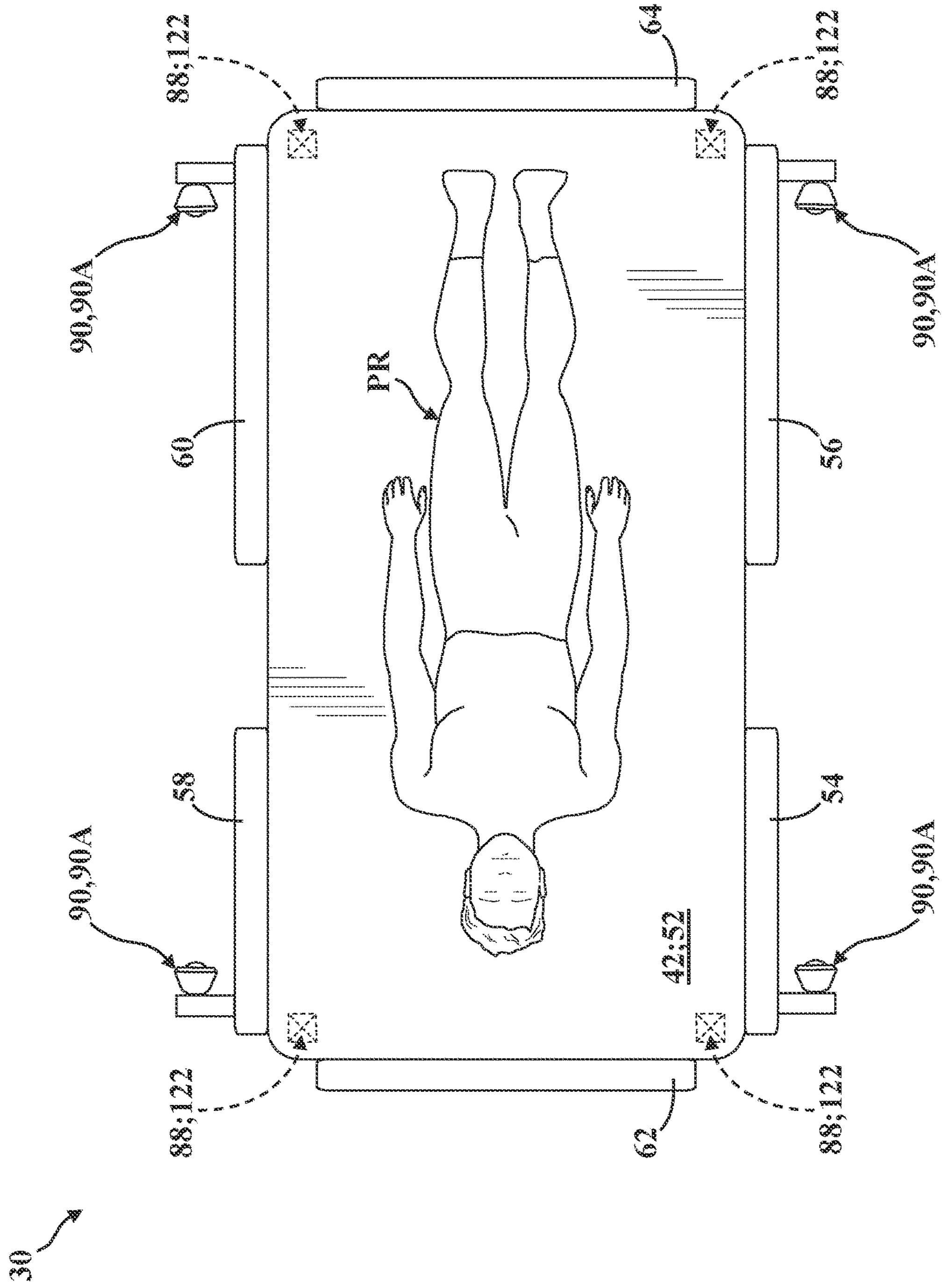
FIG. 11A is a top-side view of a patient support apparatus comprising a patient support deck supporting a patient in a repose body position, and light modules arranged to emit light towards the patient support deck.
Figure 11B:
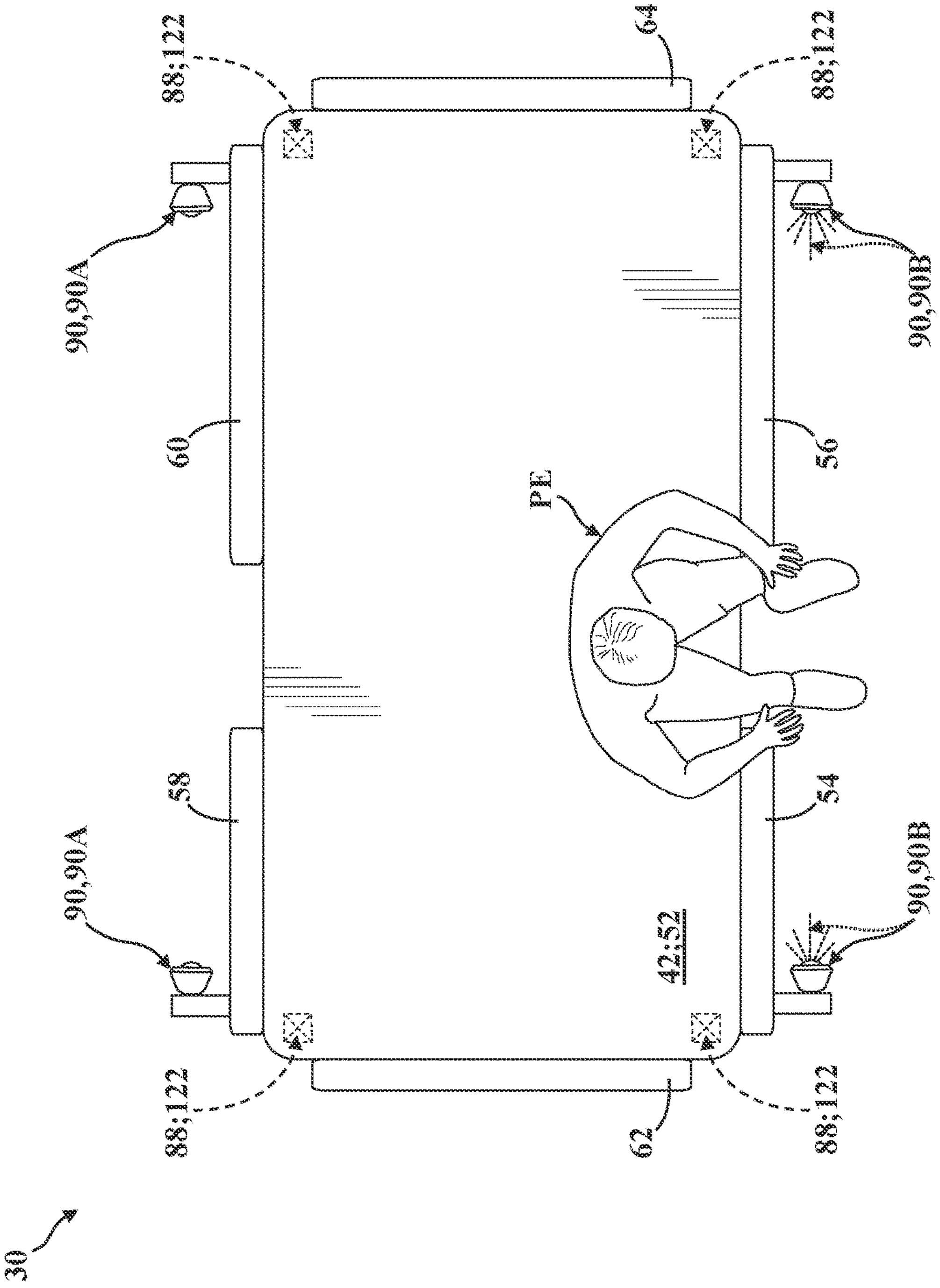
FIG. 11B is another top-side view of the patient support apparatus of FIG. 11A, shown with the patient in a pre-exit body position, and shown with the light modules emitting light towards the patient support deck.

Referring now to FIGS. 11A-11B, in one embodiment, the patient sensor 122 is configured to detect movement of the patient between a repose body position PR (see FIG. 11A) and a pre-exit body position PE (see FIG. 11B). Here, the controller 84 and patient sensor 122 cooperate to determine predetermined patient movement indicative of a pre-exit condition where the patient is attempting to exit the patient support apparatus 30. Here in this embodiment, one or more light modules 90 are arranged to emit light towards the patient support deck 38, other portions of the patient support apparatus 30, and/or the floor adjacent to the base 34 to provide the patient with adequate illumination before exiting the patient support apparatus 30. By way of non-limiting example, if the patient were to attempt to exit the patient support apparatus 30 unassisted in a dark room, it may be otherwise difficult to see objects on the floor or positioned near the patient support apparatus. Here, the controller 84 controls one or more of the light modules 90 to emit light towards the patient support deck 38 at the first illumination level 90A when the patient sensor 122 determines the patient is in the repose body position PR (see FIG. 11A), and controls the light modules 90 to emit light towards the patient support deck 38 at the second illumination level 90B when the patient sensor 122 determines the patient is in the pre-exit body position PE.

In the representative embodiment illustrated in FIGS. 11A-11B, the patient support apparatus 30 is provided with four light modules 90 arranged for illumination via the controller 84 in response to movement of the patient into the pre-exit body position PE detected by the patient sensor 122. As shown in FIG. 11B, the controller 84 illuminates whichever light modules 90 are nearest to the patient in the pre-exit body position PE, as may be determined by the patient sensor 122. However, it is conceivable that the controller 84 could illuminate additional light modules 90 when the patient moves to the pre-exit body position PE (for example, an ambient room light). Here too, the second illumination level 90B is greater than the first illumination level 90A, and it will be appreciated that the first illumination level 90A could correspond to no light emission or to dim light emission.

Figure 12A:
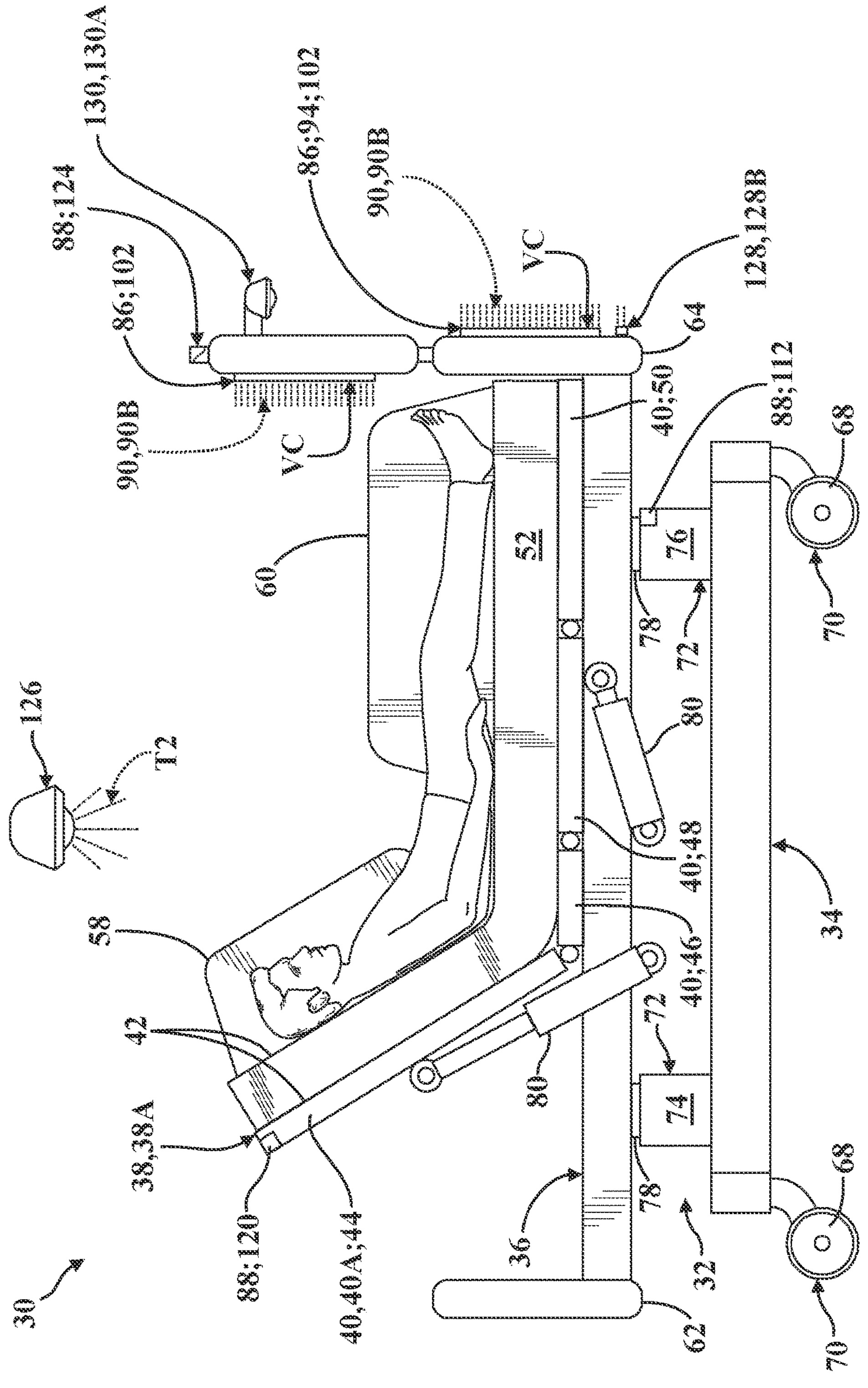
FIG. 12A is a right-side view of a patient support apparatus comprising screens illuminated at a second illumination level, an indicator light, and a light sensor arranged to sense ambient light, with a room light shown adjacent to the patient support apparatus emitting ambient light.
Figure 12B:
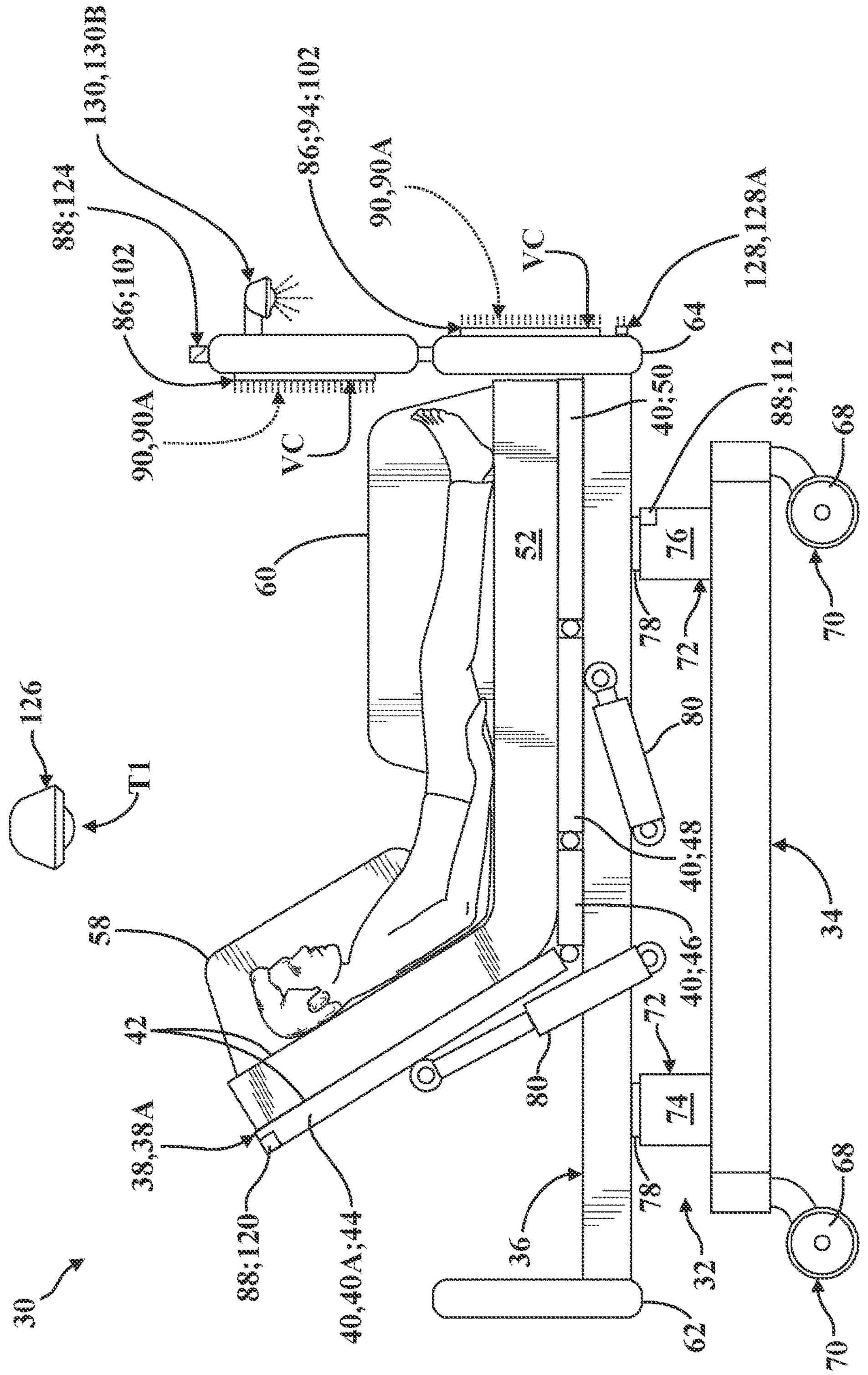
FIG. 12B is another right-side view of the patient support apparatus and room light of FIG. 12A, shown with the screens illuminated at a first illumination level, shown with the indicator light emitting light, and shown with the room light off.

Referring now to FIGS. 12A-12B, in one embodiment, the patient support apparatus 30 further comprises a light sensor 124 arranged to sense ambient light illuminating the input device 94 at a first ambient light threshold T1 and at a second ambient light threshold T2. It will be appreciated that ambient light can be emitted naturally, such as sunlight through a window, or can be emitted by one or more ambient room lights 126. In this embodiment, the controller 84 is disposed in communication with the light sensor 124 and is configured to control the light module 90 to adjust illumination of the input device 94 based on changes in ambient lighting. More specifically, the controller 84 is configured to control the light module 90 to illuminate the input device 94 at the first illumination level 90A when the light sensor 124 senses ambient light at the first ambient light threshold T1 (see FIG. 12B), and to control the light module 90 to illuminate the input device 94 at the second illumination level 90B when the light sensor 124 senses ambient light at the second ambient light threshold T2 (see FIG. 12A). In one embodiment, the light sensor 124 is spaced from the input device 94. Advantageously, the light sensor 124 and the input device 94 are subjected to substantially similar ambient light. However, it will be appreciated that the light sensor 124 could be arranged in any suitable location.

In one embodiment, the second ambient light threshold T2 is greater than the first ambient light threshold T1. By way of example, in the representative embodiment illustrated in FIGS. 12A-12B, the first ambient light threshold T1 represents ambient light experienced in a "dark" room such as where the ambient room light 126 has been turned off (see FIG. 12B), and the second ambient light threshold T2 represent ambient light experienced in a "lit" room such as where the ambient room light 126 has been turned on (see FIG. 12A).

In the embodiment depicted in FIGS. 12A-12B, the input device 94 is realized as a caregiver-accessible touchscreen having a touch sensor, a screen, and a backlight which serves as a light module 90, each of which are described in greater detail above. Thus, in this embodiment, the screen 102 of the caregiver-accessible touchscreen is illuminated by the light module 90 more brightly in a "lit" room (see FIG. 12A) than in a "dark" room (see FIG. 12B) via cooperation between the controller 84 and the light sensor 124. However, as noted above, the input device 94 could be realized in a number of different ways, such as without the use of a backlight where a light module 90 spaced from the input device 94 is employed to illuminate the input device 94.

In one embodiment, the patient support apparatus is provided with an indicator, generally indicated at 128, configured to emit light at a first indication illumination level 128A and at a second indicator illumination level 128B. One or more indicators 128 may be provided in a number of different locations on the patient support apparatus 30 to represent operating conditions of the patient support apparatus 30. By way of non-limiting example, an indicator 128 could illuminate when a certain status condition is met (for example, a "charging" indicator), or could change color based on certain criteria (for example, changing from red to yellow to green as a battery is charged). In one embodiment, the indicator 128 comprises a light emitting diode (LED).

The controller 84 is disposed in communication with the indicator 128 and is configured to control the indicator 128 to emit light at the first indicator illumination level 128A when the light sensor 124 senses ambient light at the first ambient light threshold T1 (see FIG. 12B), and to control the indicator 128 to emit light at the second indicator illumination level 128B when the light sensor 124 senses ambient light at the second ambient light threshold T2 (see FIG. 12A). Here, the second indicator illumination level 128B is greater than the first indicator illumination level 128A.

In one embodiment, the patient support apparatus 30 further comprises a caregiver reading light 130 configured to emit light at a first reading illumination level 130A and at a second reading illumination level 130B. The caregiver reading light 130 may advantageously be positioned so as to illuminate papers, charts, and the like which may be attached to the footboard 64 for viewing by the caregiver. Here, the controller 84 is disposed in communication with the caregiver light 130 and is configured to control the caregiver light 130 to emit light at the first reading illumination level 130A when the light sensor 124 senses ambient light at the second ambient light threshold T2 (see FIG. 12A), and to control the caregiver light 130 to emit light at the second reading illumination level 130B when the light sensor 124 senses ambient light at the first ambient light threshold T1 (see FIG. 12B). Here, the second reading illumination level 130B is greater than the first reading illumination level 130A. Thus, in this embodiment, the caregiver reading light 130 is illuminated more brightly in a "dark" room (see FIG. 12B) than in a "lit" room (see FIG. 12A) via cooperation between the controller 84 and the light sensor 124. It will be appreciated that the patient support apparatus 30 could also comprise a patient reading light similar to the caregiver reading light 130 described above.

Figure 13A:
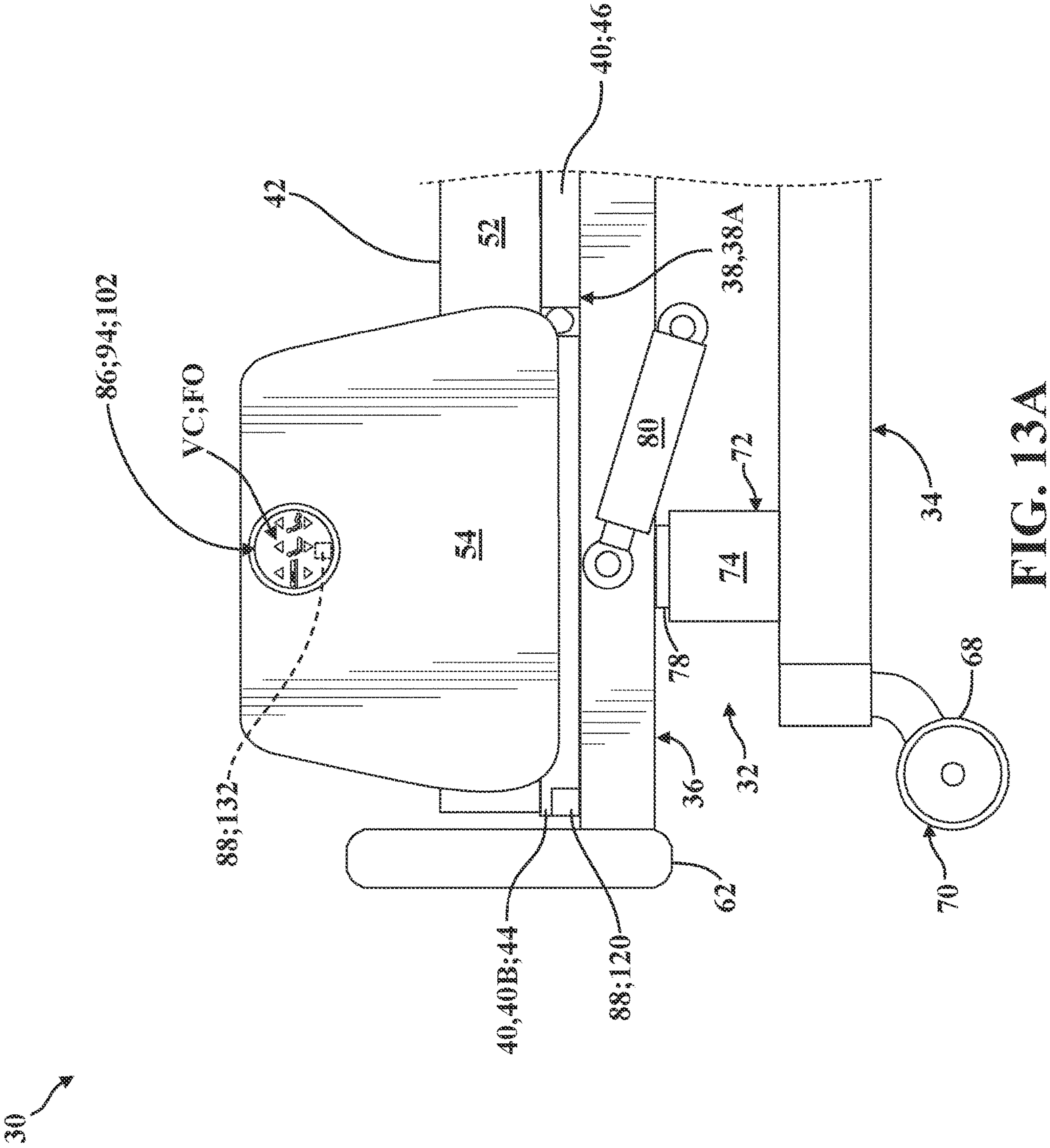
FIG. 13A is a partial right-side view of a patient support apparatus shown having a base, a patient support deck comprising a deck section arranged for movement relative to the base and shown in a first section position, a screen operatively attached to the patient support deck for concurrent movement and configured to display visual content in a fixed predetermined orientation.
Figure 13B:
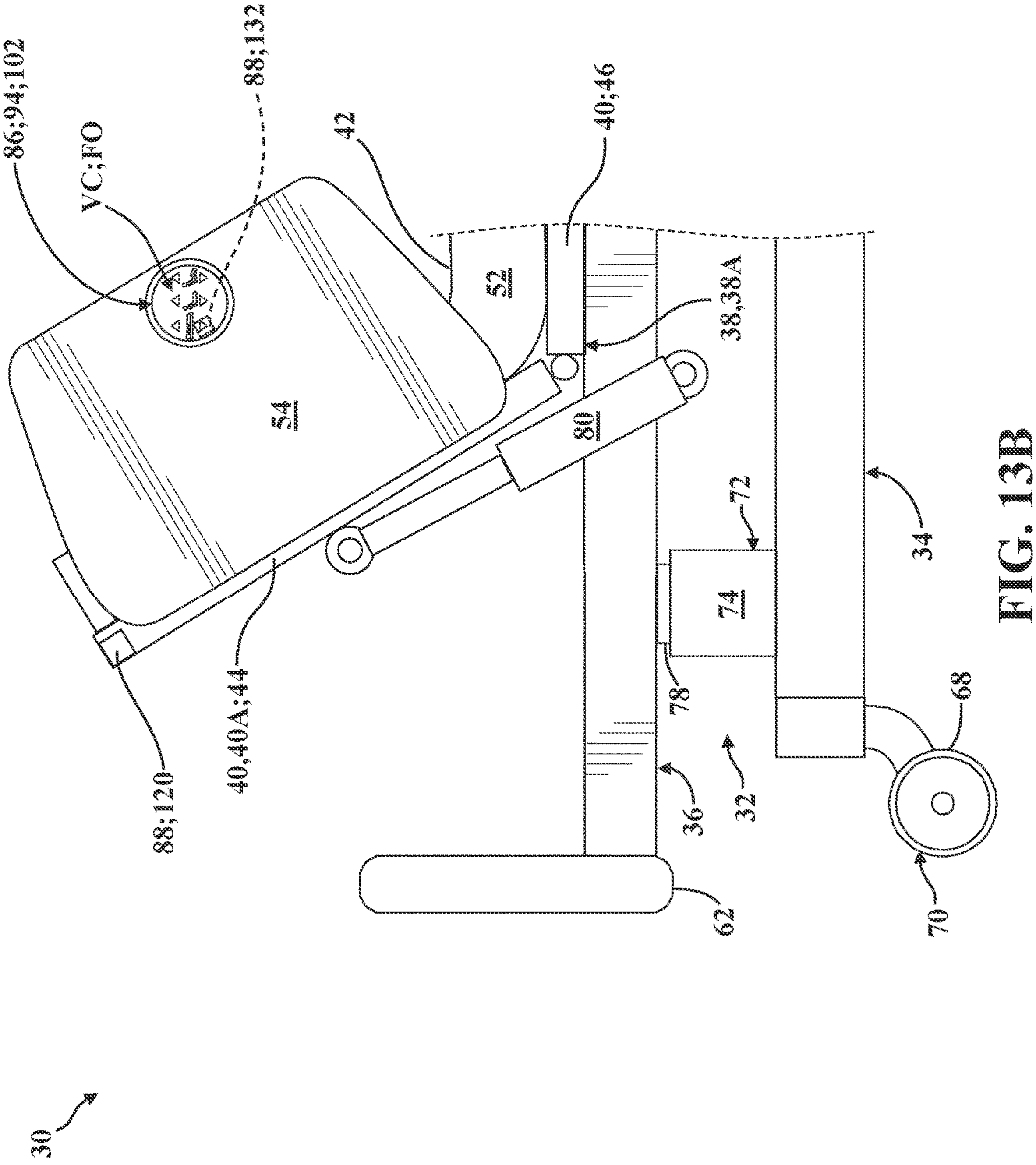
FIG. 13B is another partial right-side view of the patient support apparatus of FIG. 13A, shown with the screen and the deck section arranged in a second section position, and shown with the screen displaying visual content in the fixed predetermined orientation.

Referring now to FIGS. 13A-13B, in one embodiment, a screen 102 of a user interface 86 is coupled to the deck section 40 of the patient support deck 38 for concurrent movement between the section positions 40A, 40B, as described in greater detail above. As shown in FIGS. 13A-13B, the screen 102 is coupled to the first side rail 54 for concurrent movement with the back section 44. In this embodiment, the controller 84 is configured to maintain a fixed predetermined orientation FO of visual content VC displayed by the screen 102 as the screen 102 and the deck section 40 move concurrently between the section positions 40A, 40B (compare FIG. 13A with FIG. 13B).

With continued reference to FIGS. 13A-13B, the screen 102 in this embodiment has a round profile. More specifically, visual content VC displayed by this screen 102 is arranged about a circular area. Here, because the screen 102 is coupled to the first side rail 54, which articulates as the deck section 40 moves between the section positions 40A, 40B, the controller 84 maintains the fixed predetermined orientation FO of the visual content VC displayed on the screen 102. Thus, the caregiver can view the visual content VC aligned to the fixed predetermined orientation FO irrespective of the position of the deck section 40, as well as during movement of the deck section 40 between the section positions 40A, 40B. To this end, in one embodiment, the patient support apparatus further comprises an orientation sensor 132 disposed in communication with the controller 84 to determine an orientation of the screen 102 relative to the base 34, gravity, or any other suitable reference. In one embodiment, the orientation sensor 132 is operatively attached to the screen 102 for concurrent movement. It will be appreciated that the orientation sensor 132 could be realized in a number of different ways sufficient to determine an orientation of the screen 102. By way of non-limiting example, the orientation sensor 132 could be realized as a discrete component such as a potentiometer, an accelerometer, a gyroscope, and the like generally configured or arranged to measure position, height, or movement. Further, the orientation sensor 132 could be an encoder, a current sensor, and the like coupled to or in communication with the deck actuator 80. Moreover, the functionality afforded by the orientation sensor 132 could be entirely or partially realized with software or code for certain applications.

In the representative embodiment illustrated in FIGS. 13A-13B, an input device 94 is coupled to the round screen 102 to define a round user interface 86. Here, the input device 94 could be realized in a number of different ways to facilitate navigation of visual content VC displayed by the round screen 102. By way of non-limiting example, the input device 94 could be a button spaced from the round screen 102, a touch sensor 104 coupled to the round screen 102, an orientation sensor 132 coupled to the round screen 102 and realized as an accelerometer or gyroscope, and the like.

While the round screen 102 depicted in FIGS. 13A-13B is coupled to an outside surface of the first side rail 54 for concurrent movement with the deck section 40 between the section positions 40A, 40B, those having ordinary skill in the art will appreciate that the controller 84 could be configured to maintain the fixed predetermined orientation FO of the visual content VC displayed by screens 102 mounted, coupled, or otherwise attached to any suitable part of the patient support apparatus 30 that could move relative to a known reference. By way of non-limiting example, the orientation sensor 132 could be a gyroscope and the controller 84 could maintain the fixed predetermined orientation FO of the visual content VC displayed by the screen 102 based on gravity, such as where the patient support apparatus 30 is moved along an incline. Further, while the round screen 102 depicted in FIGS. 13A-13B forms part of a user interface 86 arranged for access by the caregiver, those having ordinary skill in the art will appreciate that the patient support apparatus 30 could also include one or more patient-accessible user interfaces 86 which employ round screens 102 to display visual content VC at the fixed predetermined orientation FO (for example, see FIG. 1).

In addition to maintaining the fixed predetermined orientation FO of the visual content VC displayed by the screen 102 as the deck section 40 moves between the section positions 40A, 40B, in some embodiments the visual content VC could change based on the relative position of the deck section 40. By way of non-limiting example, the visual content VC could change between content layouts CL1, CL2 in response to movement between the section positions 40A, 40B, such as to enable, disable, or otherwise limit certain controls, features, and functionality of the patient support apparatus 30 depending on the orientation of the deck section 40. Here too, the controller 84 could turn off the screen 102 and/or disable the use of a touch sensor 104 when the deck section 40 is in certain positions. Similarly, the controller 84 could adjust the illumination of the screen 102 based on the orientation of the deck section 40, such as to brighten the screen 102 when the screen 102 is positioned closer to the floor.

Figure 14:
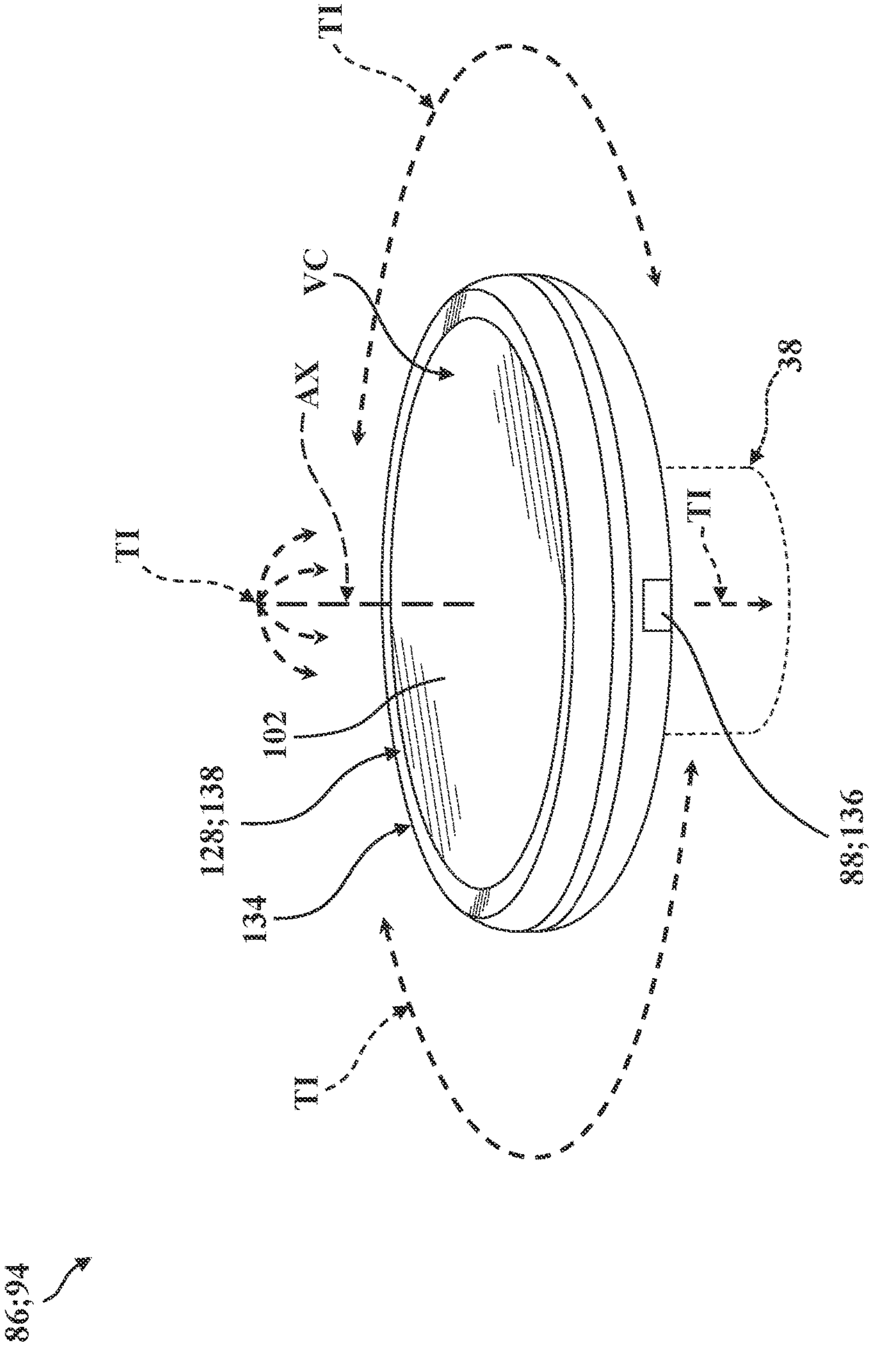
FIG. 14 is a perspective view of user interface of a patient support apparatus, comprising a control element arranged for movement with respect to a control element axis, an inertial sensor coupled to the control element, a screen operatively attached to the control element for displaying visual content, and a light ring arranged adjacent to the screen.
Figure 15A:
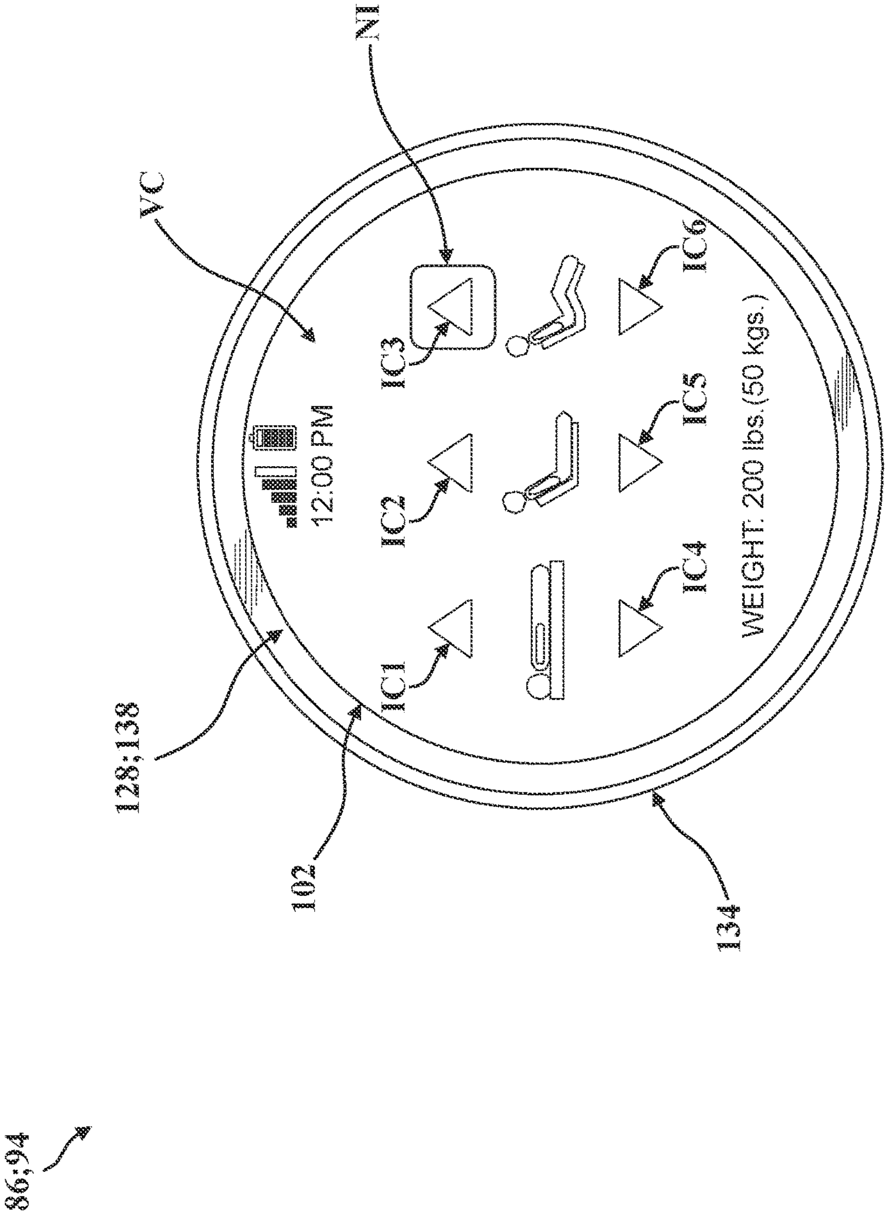
FIG. 15A is a top-side view of the user interface of FIG. 14, depicting navigable visual content displayed by the screen with a navigation indicia shown in a first indicia position to select a first input control.
Figure 15B:
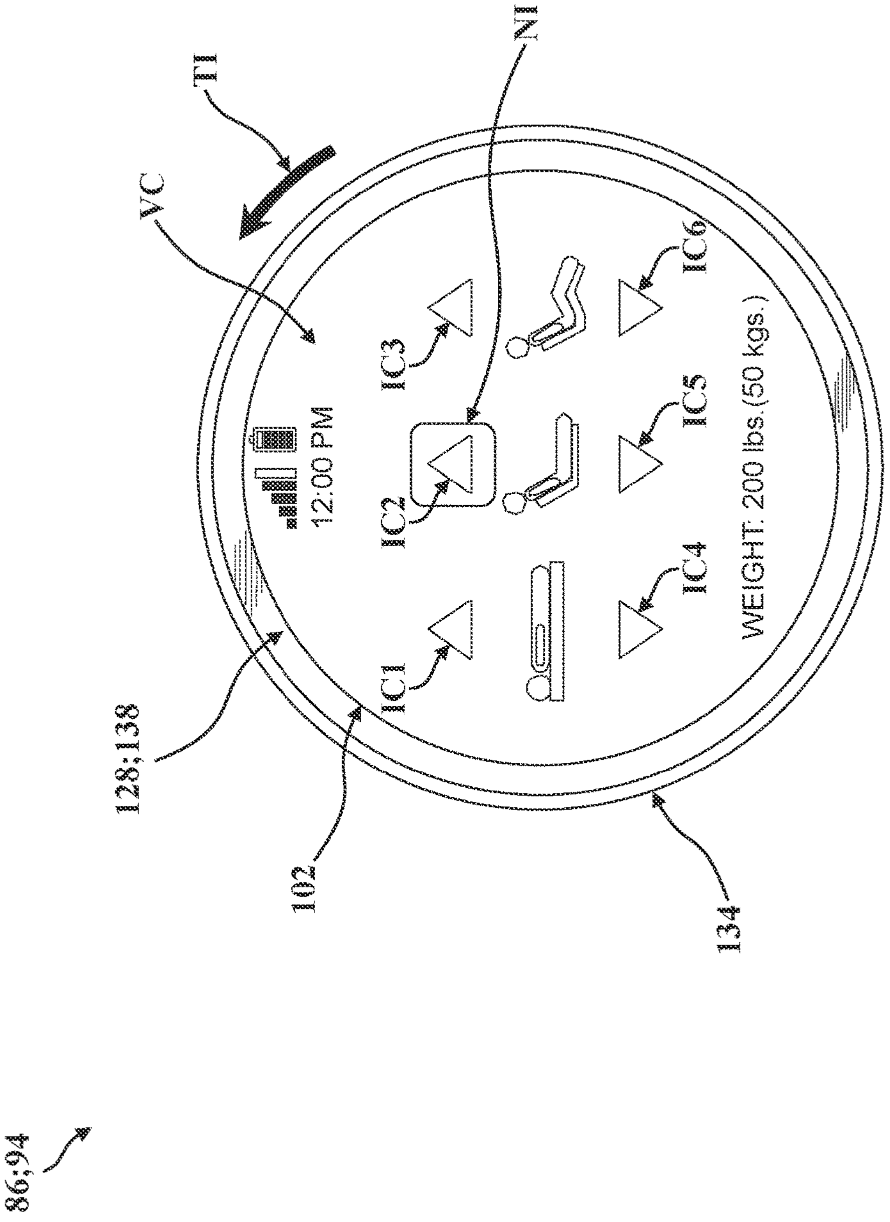
FIG. 15B is another top-side view of the user interface of FIG. 15A, illustratively depicting a first rotational tactile input to move the navigation indicia to a second indicia position to select a second input control.
Figure 15C:
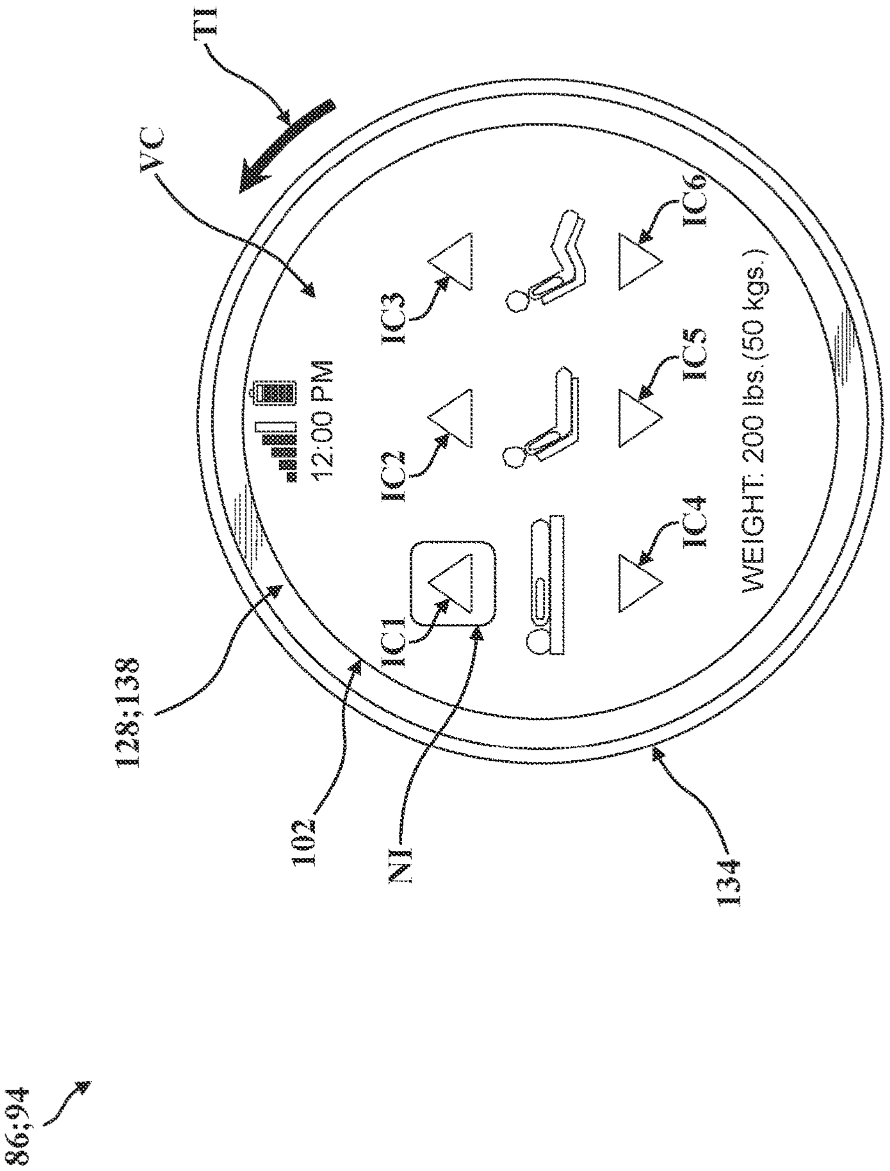
FIG. 15C is another top-side view of the user interface of FIG. 15B, illustratively depicting a second rotational tactile input to move the navigation indicia to a third indicia position to select a third input control.
Figure 15D:
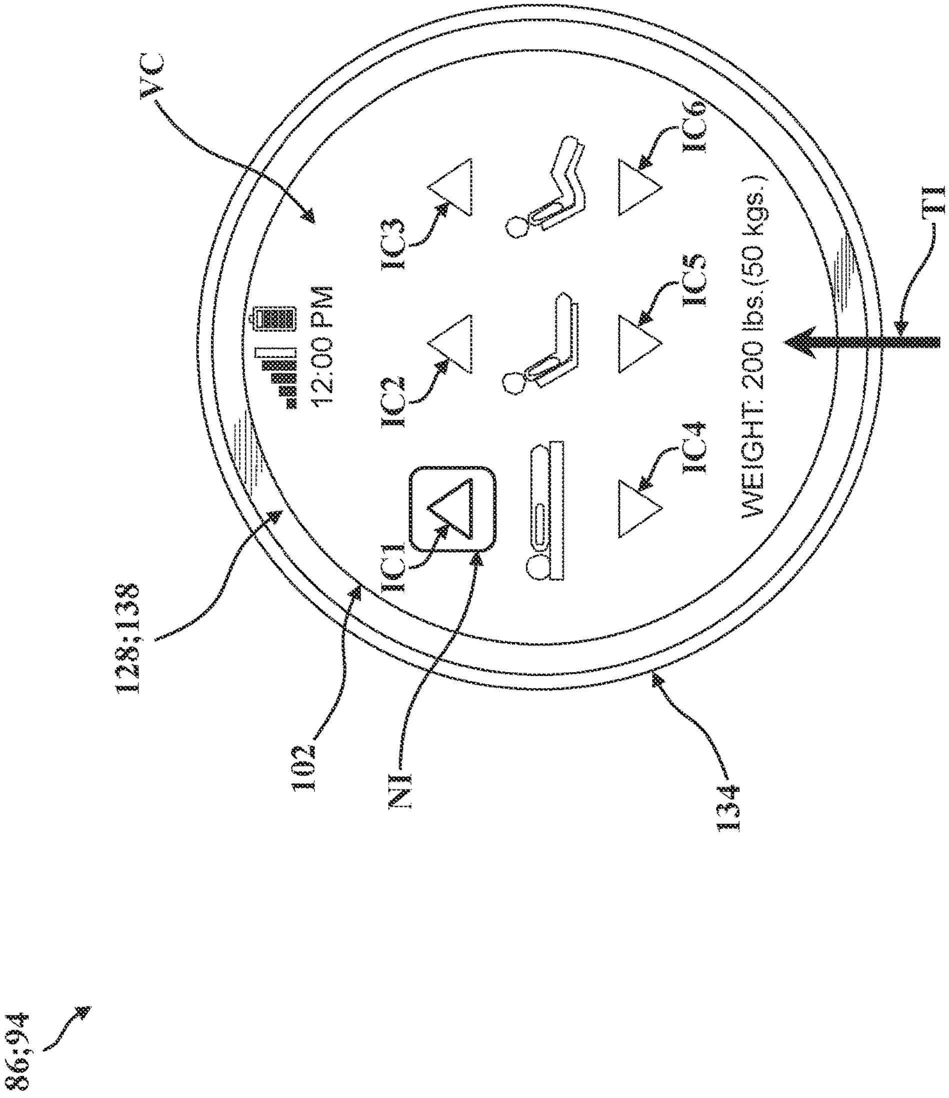
FIG. 15D is another top-side view of the user interface of FIG. 15C, illustratively depicting a first depressed tactile input to activate the third input control.
Figure 15E:
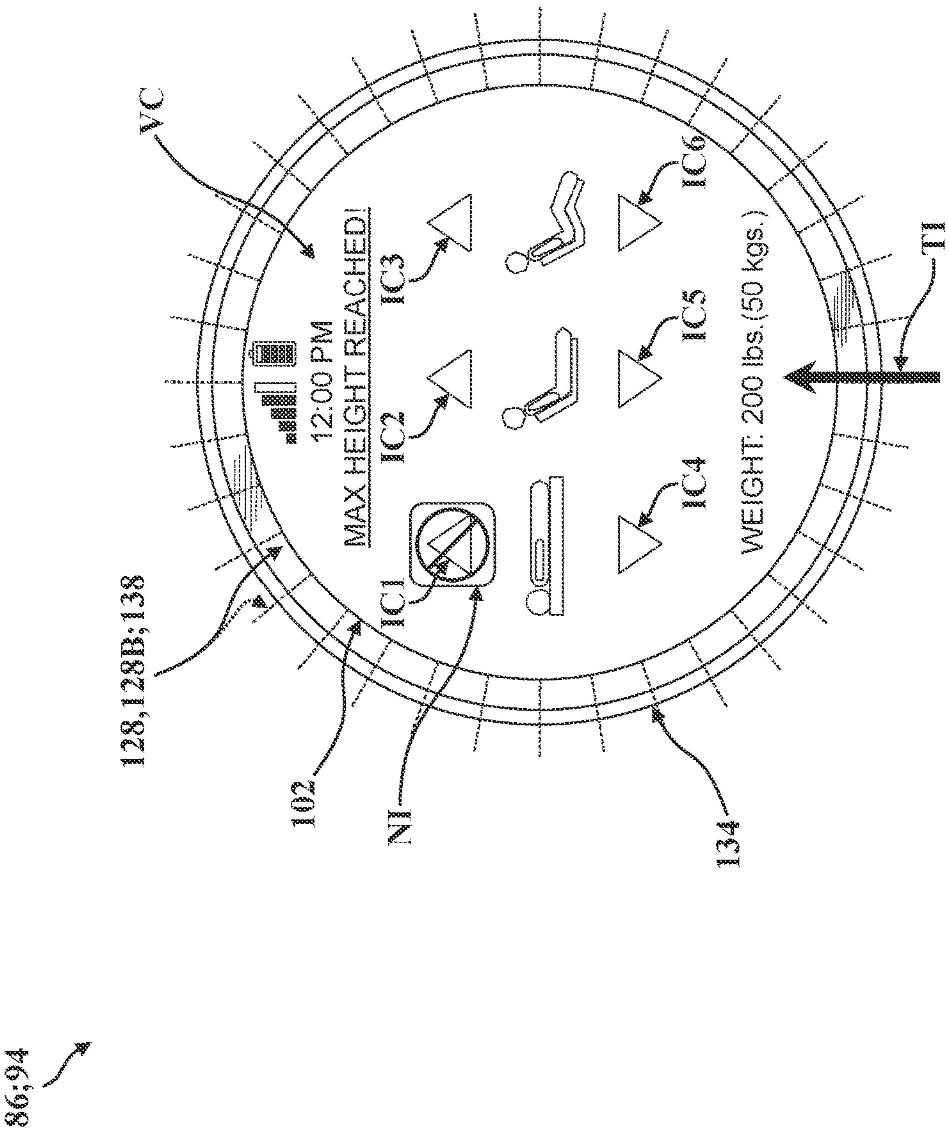
FIG. 15E is another top-side view of the user interface of FIG. 15D, illustratively depicting a maximum position of the third input control selected with the navigation indicia with the light ring illuminated.
Figure 15F:
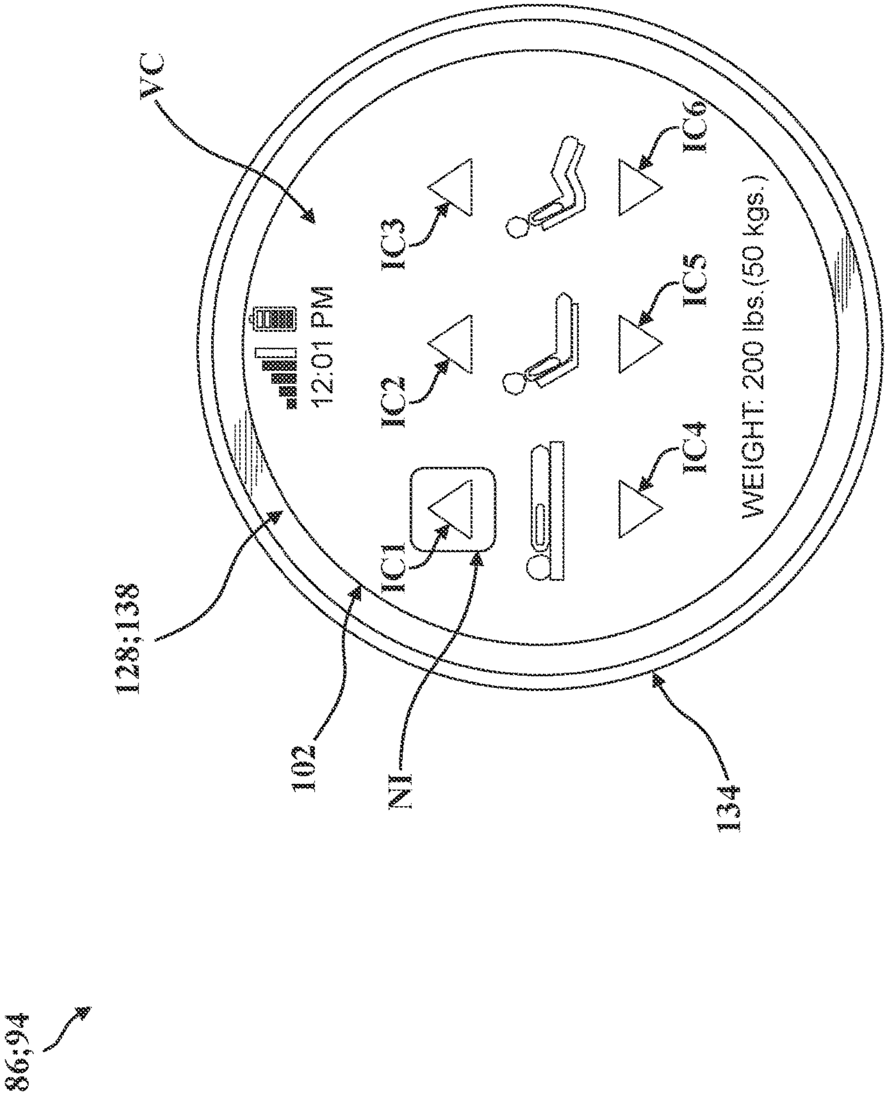
FIG. 15F is another top-side view of the user interface of FIG. 15E, illustratively depicting the navigation indicia shown in the third indicia position.
Figure 16:
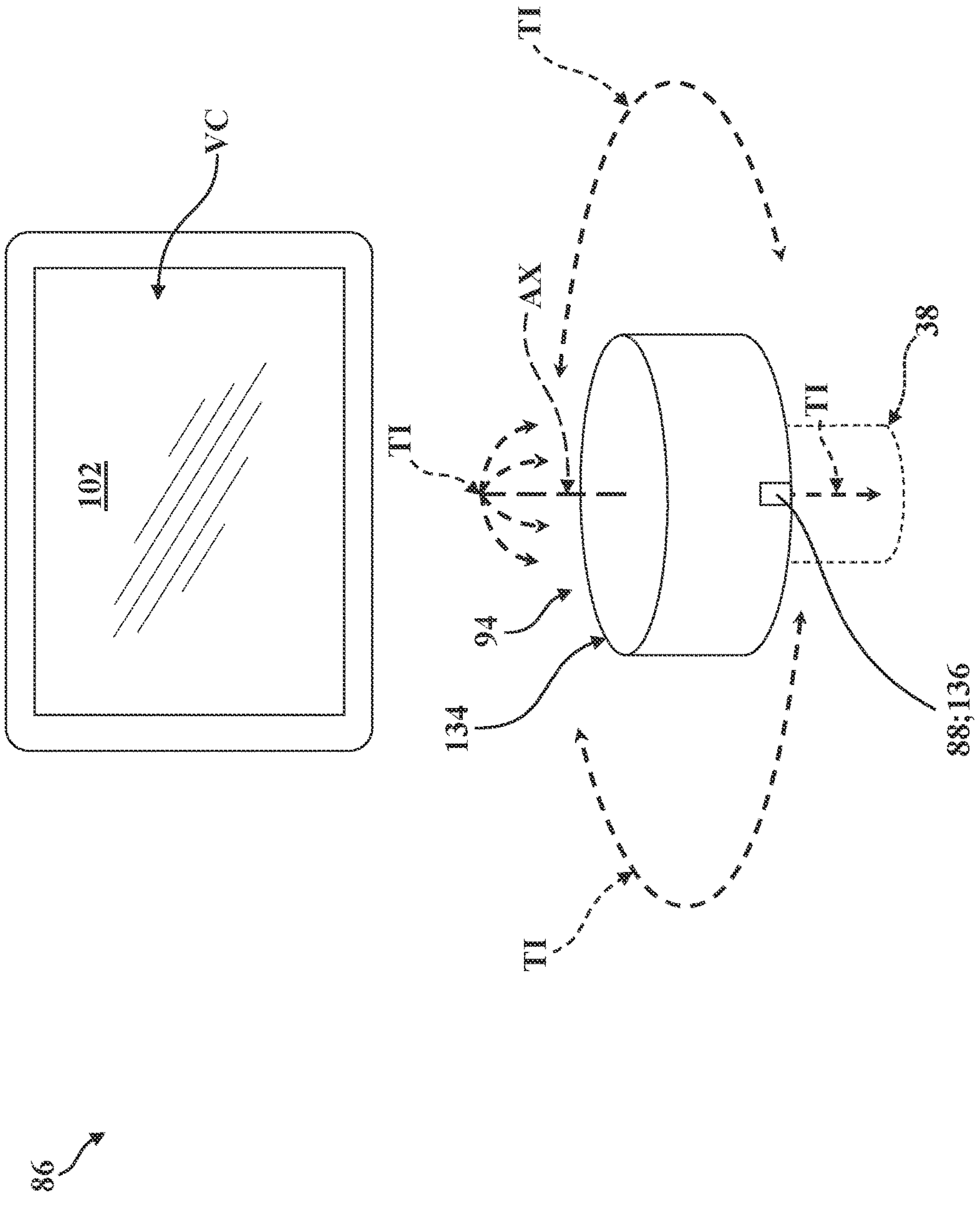
FIG. 16 is a perspective view of user interface of a patient support apparatus, comprising a control element arranged for movement with respect to a control element axis, an inertial sensor coupled to the control element, and a screen spaced from the control element for displaying visual content.

Referring now to FIGS. 14-16, two embodiments of a control element 134 are shown. As is described in greater detail below, the control element 134 is operatively attached to the patient support deck 38 and is configured to receive tactile user input from the caregiver and/or the patient. As is depicted illustratively in FIGS. 14 and 16, with dashed arrows, the control element 134 is at least partially arranged for movement between a plurality of control element positions defined with respect to a control element axis AX: the control element 134 may be arranged for rotational movement about the control element axis AX, pivotal movement about the control element axis AX, and/or translation along the control element axis AX. To this end, an inertial sensor 136 is coupled to the control element 134 for concurrent movement, and is configured to generate the input signal IS in response to tactile input TI acting on the control element 134. Thus, in these embodiments, the control element 134 and the inertial sensor 136 serve as the input device 94 of the user interface 86. The controller is disposed in communication with the inertial sensor 136 and is configured to perform a function of the patient support apparatus 30 in response to receiving the input signal IS from the inertial sensor 136 when the inertial sensor determines the occurrence of tactile input TI acting on the control element 134.

In one embodiment, the inertial sensor 136 comprises an accelerometer or gyroscope configured to sense movement along or with respect to the control element axis AX. Because the inertial sensor 136 is coupled to the control element 134, movement of the control element 134 relative to the patient support deck 38 can be sensed by the inertial sensor 136 as tactile input TI acts on the control element 134. Thus, in one embodiment, the inertial sensor 136 can be implemented as a single multi-axis accelerometer sensitive to tapping, jogging, rocking, twisting, pressing, rotation, and the like of the control element 134 relative to the patient support deck 38. It will be appreciated that the inertial sensor 136 can also be implemented as a single-axis accelerometer for certain applications. In some embodiments, the inertial sensor 136 is configured to determine velocity, acceleration, and the like of the patient support apparatus 30, such as to facilitate recording or displaying a moving speed on the screen 102, an orientation of the patient support apparatus 30 such as on a ramp or other incline, and/or shocks and impacts caused by an irate patient hitting or otherwise violently contacting parts of the patient support apparatus 30.

It will be appreciated that the inertial sensor 136 can provide enhanced usability and reliability in certain applications. By way of non-limiting example, inertial sensors 136 of the type described herein operate consistently and reliably even when exposed to high humidity and fluids. Similarly, unlike certain types of input devices 94 which rely on conductivity to sense tactile input, inertial sensors 136 are unaffected by the use of gloves. Moreover, inertial sensors 136 are resistant to sensor fatigue, which could otherwise cause inaccurate operation. It will be appreciated that additional inertial sensors 136 may be employed for redundancy, to increase resolution, to improve sensitivity, and the like. In some embodiments, the control element 134 is coupled to the patient support deck 38 in a rigid or semi-rigid fashion such that the control element 134 returns to a nominal position along the control element axis AX in absence of applied tactile input TI. Here, the plurality of control element positions are defined as force vectors resulting from the application of tactile input TI to the control element 134, whereby the controller 84 can determine the direction and magnitude of the applied tactile input TI to facilitate corresponding navigation of visual content VC displayed by a screen 102.

In the embodiment illustrated in FIG. 16, the control element 134 and the inertial sensor 136 are spaced from a screen 102 which is configured to display visual content VC. Here, the visual content VC is navigable via manipulation of the control element 134, as described above. Thus, the remotely-mounted screen 102 cooperates with the control element 134 and the inertial sensor 136 to define a user interface 86. It will be appreciated that the screen 102 could be mounted in any suitable location.

In the embodiment illustrated in FIGS. 14-15F, a screen 102 is coupled to the control element 134 for concurrent movement. Here, the screen 102 and the control element 134 each have a round profile, but could be of any suitable shape or profile. Here too in this embodiment, a light ring 138 is provided adjacent to and surrounding the screen 102. The light ring 138 cooperates with one or more indicators 128, as described above, to alert the user of certain operational parameters, limits, and the like of the patient support apparatus 30 during use. The light ring 138, like the screen 102, could have any suitable shape or profile, and may be manufactured from a transparent or semi-transparent material so as to allow light emitted by the indicators 128 to pass through the light ring 138. Here too, the indicators 128 can be utilized to illuminate the light ring 138 in different colors, at different brightness levels, and the like, to correspond to certain status or operating conditions of the patient support apparatus.

With reference now to FIGS. 15A-15F, an illustrative example depicting navigation of visual content VC on the screen 102 via manipulation of the control element 134 is shown in six steps. In this exemplary embodiment, the visual content VC displayed by the screen 102 includes a navigation indicia NI movable between first, second, third, fourth, fifth, and sixth input controls IC1, IC2, IC3, IC4, IC5, IC6. FIG. 15A shows the navigation indicia NI positioned at the third input control IC3. FIG. 15B shows the navigation indicia NI positioned at the second input control IC2, having moved from the third input control IC3 (see FIG. 15A) in response to applied rotational tactile input TI acting on the control element 134. FIG. 15C shows the navigation indicia NI positioned at the first input control IC1, having moved from the second input control IC2 (see FIG. 15B) in response to subsequently applied rotational tactile input TI acting on the control element 134. FIG. 15D shows the first input control ICI and the navigation indicia NI bolded to indicate activation of the first input control IC1 in response to applied axial (for example, pushing or pulling) tactile input TI acting on the control element 134. FIG. 15E shows the first input control IC1 displaying a circle-backslash symbol, and illumination of the light ring 138 via an indicator 128 at the second indicator illumination level 128B, to indicate that a maximum position of the first input control ICI has been reached irrespective of the applied axial tactile input TI acting on the control element 134. FIG. 15F shows the navigation indicia NI still positioned at the first input control IC1 without any tactile force applied to the control element 134.

It will be appreciated that the visual content VC illustrated in FIGS. 15A-15F is exemplary and the indicia shown could be controlled, displayed, presented, or otherwise manipulated in a number of different ways. Specifically, manipulation of the control element 134 could facilitate navigation of visual content VC and/or control of various aspects of the patient support apparatus 30 via different types of tactile input TI. By way of non-limiting example, rather than applying rotational tactile input TI to move between input controls as described above, applied rotational tactile input TI in one direction (e.g., clockwise) could drive one or more actuators 78, 80 in one direction (e.g., to move toward the first vertical configuration 38A and/or the first section position 40A), and applied rotational tactical input TI another direction (e.g., counterclockwise), could drive one or more actuators 78, 80 in another direction (e.g., to move toward the second vertical configuration 38B and/or the second section position 40B). Furthermore, in addition to changing visual content VC represented by movement of the navigation indicia NI described above, it will be appreciated that embodiments of the user interface 86 may employ various types of alerts to the user when switching between different modes, input controls, and the like (e.g., by generating an audible sound or alert, flashing a light, and the like). Other configurations are contemplated.

In this way, the embodiments of the patient support apparatus 30 of the present disclosure afford significant opportunities for enhancing the functionality and operation of both caregiver-accessible and patient-accessible user interfaces 86. Specifically, visual content VC can be viewed by both caregivers and patients in ways which improve usability of the patient support apparatus 30, without necessitating the use of expensive or complex screens 102 and/or input devices 94. Moreover, visual content can be displayed by screens 102 in ways that contribute to enhanced patient satisfaction and that provide caregivers with convenient, easy-to-use features. Thus, the patient support apparatus 30 can be manufactured in a cost-effective manner while, at the same time, affording opportunities for improved functionality, features, and usability.

As noted above, the subject patent application is related to U.S. Provisional Patent Application No. 62/525,368 filed on Jun. 27, 2017. In addition, the subject patent application is also related to: U.S. Provisional Patent Application No. 62/525,353 filed on Jun. 27, 2017 and its corresponding Non-Provisional patent application Ser. No. 16/020,068 filed on Jun. 27, 2018; U.S. Provisional Patent Application No. 62/525,359 filed on Jun. 27, 2017 and its corresponding Non-Provisional patent application Ser. No. 16/020,052 filed on Jun. 27, 2018; U.S. Provisional Patent Application No. 62/525,363 filed on Jun. 27, 2017 and its corresponding Non-Provisional patent application Ser. No. 16/020,085 filed on Jun. 27, 2018; U.S. Provisional Patent Application No. 62/525,373 filed on Jun. 27, 2017 and its corresponding Non-Provisional patent application Ser. No. 16/020,003 filed on Jun. 27, 2018; and U.S. Provisional Patent Application No. 62/525,377 filed on Jun. 27, 2017 and its corresponding Non-Provisional patent application Ser. No. 16/019,986 filed on Jun. 27, 2018. The disclosures of each of the above-identified Provisional Patent Applications and corresponding Non-Provisional Patent Applications are each hereby incorporated by reference in their entirety.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention is intended to be defined in the independent claims, with specific features laid out in the dependent claims, wherein the subject-matter of a claim dependent from one independent claim can also be implemented in connection with another independent claim.

What is claimed is:

1. A patient support apparatus comprising:

a patient support deck comprising a patient support surface and a deck section configured to move between a first section position and a second section position;

a barrier to at least partially limit patient egress from the patient support surface, the barrier being operatively attached to the deck section of the patient support deck for concurrent movement between the first section position and the second section position;

a user interface coupled to the barrier and configured to receive input from a user, the user interface including a screen to display visual content to the user, and an input device to generate an input signal in response to receiving user input;

an orientation sensor to determine an orientation of the screen of the user interface based on movement of the deck section between the first section position and the second section position; and a controller in communication with the user interface and the orientation sensor, the controller being configured to:

perform a function of the patient support apparatus in response to receiving the input signal from the input device; and maintain a predetermined orientation of the visual content displayed on the screen based on the orientation of the screen determined by the orientation sensor as the screen moves with the deck section between the first section position and the second section position.

2. The patient support apparatus as set forth in claim 1, wherein the input device of the user interface includes a control element arranged to receive tactile input from the user.

3. The patient support apparatus as set forth in claim 2, wherein the control element has a round profile.

4. The patient support apparatus as set forth in claim 1, wherein the input device of the user interface includes an inertial sensor.

5. The patient support apparatus as set forth in claim 4, wherein the inertial sensor comprises an accelerometer.

6. The patient support apparatus as set forth in claim 4, wherein the inertial sensor comprises a gyroscope.

7. The patient support apparatus as set forth in claim 1, wherein the input device of the user interface includes a control element arranged for rotational movement about a control element axis.

8. The patient support apparatus as set forth in claim 1, wherein the input device of the user interface includes a control element arranged for pivotal movement about a control element axis.

9. The patient support apparatus as set forth in claim 1, wherein the input device of the user interface includes control element is arranged for translation along a control element axis.

10. The patient support apparatus as set forth in claim 9, wherein the controller is configured to facilitate navigation of the visual content in response to receiving the input signal from the input device.

11. The patient support apparatus as set forth in claim 1, wherein the orientation sensor comprises a potentiometer.

12. The patient support apparatus as set forth in claim 1, wherein the orientation sensor comprises an accelerometer.

13. The patient support apparatus as set forth in claim 1, wherein the orientation sensor comprises a gyroscope.

14. The patient support apparatus as set forth in claim 1, wherein the barrier comprises a side rail operatively attached to the deck section for concurrent movement between the first section position and the second section position.

* * * * *